United States Patent
Neiser

(10) Patent No.: US 11,260,330 B2
(45) Date of Patent: *Mar. 1, 2022

(54) FILTRATION APPARATUS AND METHOD

(71) Applicant: Paul Neiser, Mountain View, CA (US)

(72) Inventor: Paul Neiser, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,497

(22) Filed: May 3, 2019

(65) Prior Publication Data
US 2019/0299136 A1 Oct. 3, 2019

Related U.S. Application Data

(63) Continuation-in-part of application No. 16/273,139, filed on Feb. 11, 2019.

(Continued)

(51) Int. Cl.
*B01D 46/00* (2006.01)

(52) U.S. Cl.
CPC ..... *B01D 46/0002* (2013.01); *B01D 46/0047* (2013.01); *B01D 2201/02* (2013.01); *B01D 2201/18* (2013.01); *B01D 2201/325* (2013.01)

(58) Field of Classification Search
None
See application file for complete search history.

(56) References Cited

U.S. PATENT DOCUMENTS

| 1,329,559 | A | 2/1920 | Tesla |
| 1,424,932 | A | 8/1922 | Moreau |

(Continued)

FOREIGN PATENT DOCUMENTS

| EP | 2149710 A2 | 2/2010 |
| EP | 2681455 | 1/2014 |

(Continued)

OTHER PUBLICATIONS

Koks, D., What is the mass of a photon?, https://math.ucr.edu/home/baez/physics/ParticleAndNuclear/photon_mass.html#:~:text=Photons%20are%20traditionally%20said%20to,the%20language%20of%20special%20relativity.&text=When%20the%20particle%20is%20at,%22rest%20mass%22%20mrest (2008) (downloaded Mar. 9, 2021) (Year: 2008).*

(Continued)

*Primary Examiner* — Chester T Barry
(74) *Attorney, Agent, or Firm* — Sheppard, Mullin, Richter & Hampton LLP

(57) ABSTRACT

Provided is an apparatus and method for interacting with objects of interest. A filtering apparatus can comprise a channel system, through which objects of interest are able to diffuse. The channel system can comprise a channel of suitably configured non-uniform cross-sectional area along the length of the channel. In some embodiments, the channel system can be provided by a suitably configured porous bulk material. In some embodiments, channel system can comprise an interior chamber comprising filtered objects, where the filtered objects are contained on a first side by a first filtering surface, such as a semi-permeable membrane, and on a second side by second filtering surface, where the cross-sectional areas of a representative channel of the first and second filtering surfaces are not identical. The filtered objects can also be configured to interact with an externally applied body force, such as an electric field acting on charged filtered objects. The channel system is configured to interact with objects of interest on a scale which is smaller than a value several orders of magnitude larger than the mean free path of an object of interest. Some embodiments are configured to interact with particles, such as air molecules, water molecules, or aerosols. Other plate embodi- (Continued)

ments are configured to interact with waves or wavelike particles, such as electrons, photons, phonons or acoustic waves.

48 Claims, 15 Drawing Sheets

Related U.S. Application Data

(60) Provisional application No. 62/917,461, filed on Dec. 6, 2018, provisional application No. 62/917,459, filed on Dec. 6, 2018, provisional application No. 62/763,038, filed on May 31, 2018, provisional application No. 62/763,032, filed on May 30, 2018, provisional application No. 62/762,439, filed on May 3, 2018, provisional application No. 62/710,608, filed on Feb. 23, 2018, provisional application No. 62/710,224, filed on Feb. 12, 2018, provisional application No. 62/710,120, filed on Feb. 9, 2018.

(56) References Cited

U.S. PATENT DOCUMENTS

| | | | |
|---|---|---|---|
| 2,574,865 A * | 11/1951 | Edwards | B05B 1/3473 239/462 |
| 3,611,679 A | 10/1971 | Pall | |
| 3,790,829 A | 2/1974 | Roth | |
| 3,974,824 A | 8/1976 | Smith | |
| 3,993,564 A | 11/1976 | Novak | |
| 4,262,840 A | 4/1981 | Gronert et al. | |
| 4,285,704 A | 8/1981 | Zuzanov | |
| 4,482,365 A | 11/1984 | Roach | |
| 4,535,440 A | 8/1985 | Mannschke | |
| 4,850,806 A | 7/1989 | Morgan et al. | |
| 4,854,825 A | 8/1989 | Bez et al. | |
| 4,906,837 A | 3/1990 | Doneen et al. | |
| 5,174,113 A * | 12/1992 | Deville | F01N 1/08 60/309 |
| 5,441,576 A | 8/1995 | Bierschenk | |
| 5,454,472 A | 10/1995 | Benecke et al. | |
| 5,648,874 A | 7/1997 | Sawaki et al. | |
| 5,657,408 A | 8/1997 | Ferm et al. | |
| 5,738,731 A | 4/1998 | Shindo et al. | |
| 5,851,507 A * | 12/1998 | Pirzada | C01B 13/145 423/659 |
| 6,388,819 B1 | 5/2002 | Leidig | |
| 6,903,261 B2 | 6/2005 | Habraken et al. | |
| 7,170,112 B2 | 1/2007 | Ning | |
| 7,286,296 B2 | 10/2007 | Chaves et al. | |
| 7,444,961 B1 * | 11/2008 | Ellis | A01K 1/0613 119/840 |
| 7,879,123 B2 | 2/2011 | Lundquist et al. | |
| 7,993,051 B2 * | 8/2011 | Arnaud | B01D 21/2433 366/163.2 |
| 8,698,094 B1 | 4/2014 | Sears et al. | |
| 8,803,340 B2 | 8/2014 | Moddel | |
| 9,535,059 B2 | 1/2017 | Tai et al. | |
| 9,744,533 B2 * | 8/2017 | Breinlinger | B01L 3/502761 |
| 9,815,055 B2 | 11/2017 | West et al. | |
| 10,207,315 B2 * | 2/2019 | Appleby | B29C 33/38 |
| 2002/0102058 A1 | 8/2002 | Hulse | |
| 2002/0187560 A1 | 12/2002 | Pezzuto et al. | |
| 2003/0019807 A1 * | 1/2003 | Beard | B01D 27/103 210/323.2 |
| 2004/0022506 A1 | 2/2004 | Arkas | |
| 2005/0056311 A1 | 3/2005 | Son | |
| 2005/0088734 A1 | 4/2005 | Basu | |
| 2006/0033035 A1 | 2/2006 | Itzkovitch et al. | |
| 2007/0018764 A1 | 1/2007 | Martinez et al. | |
| 2007/0223867 A1 | 9/2007 | Hwang et al. | |
| 2008/0067396 A1 * | 3/2008 | Ohshima | H01J 37/143 250/396 ML |
| 2008/0078289 A1 | 4/2008 | Sergi et al. | |
| 2008/0106796 A1 | 5/2008 | Kawada | |
| 2008/0176174 A1 | 7/2008 | White et al. | |
| 2009/0093105 A1 | 4/2009 | Kobayashi et al. | |
| 2009/0152176 A1 | 6/2009 | Kipp et al. | |
| 2009/0272082 A1 * | 11/2009 | Nahey | B01D 46/0071 55/294 |
| 2010/0237198 A1 | 9/2010 | Cormier | |
| 2010/0265597 A1 | 10/2010 | Shyu | |
| 2011/0257675 A1 * | 10/2011 | Mackiewicz | A61F 2/01 606/200 |
| 2012/0125000 A1 | 5/2012 | Rodrigquez-Arango et al. | |
| 2012/0137652 A1 | 6/2012 | Asprey et al. | |
| 2012/0217876 A1 | 8/2012 | Diamant et al. | |
| 2012/0255913 A1 | 10/2012 | Tung et al. | |
| 2013/0087506 A1 | 4/2013 | Danov et al. | |
| 2013/0140468 A1 | 6/2013 | Chen | |
| 2013/0175171 A1 | 7/2013 | Aizel et al. | |
| 2013/0283797 A1 | 10/2013 | Bressi | |
| 2014/0003460 A1 | 1/2014 | Keyser et al. | |
| 2014/0137941 A1 | 5/2014 | Orsley | |
| 2014/0333514 A1 | 11/2014 | Dupont Skovsby | |
| 2015/0049491 A1 | 2/2015 | Venkataraman et al. | |
| 2015/0114305 A1 * | 4/2015 | Goodrick | A01K 63/00 119/219 |
| 2015/0231573 A1 * | 8/2015 | Sanderson | B01D 45/04 210/650 |
| 2015/0360237 A1 * | 12/2015 | Hayes | B01L 3/50273 204/451 |
| 2016/0158708 A1 | 6/2016 | Lee et al. | |
| 2016/0359212 A1 | 8/2016 | Houle | |
| 2017/0287977 A1 | 10/2017 | Moroz | |
| 2018/0323359 A1 | 11/2018 | Li et al. | |
| 2019/0120213 A1 * | 4/2019 | Pederson | F02K 7/10 |
| 2019/0186786 A1 | 6/2019 | Neiser | |
| 2019/0247863 A1 | 8/2019 | Neiser | |
| 2019/0247885 A1 * | 8/2019 | Neiser | F03G 7/00 |
| 2019/0299136 A1 * | 10/2019 | Neiser | B01D 46/0002 |
| 2019/0352022 A1 | 11/2019 | De Biase | |

FOREIGN PATENT DOCUMENTS

| | | |
|---|---|---|
| FR | 2741161 | 5/1997 |
| GB | 837391 | 6/1960 |
| WO | 2007016800 | 2/2007 |
| WO | 2012118991 | 9/2012 |
| WO | 2014106821 | 7/2014 |
| WO | 2016191606 | 12/2016 |
| WO | 2019161297 | 8/2019 |
| WO | 2019161346 | 8/2019 |
| WO | 2020117712 | 6/2020 |

OTHER PUBLICATIONS

MIT News, Explained: Phonons, https://math.ucr.edu/home/baez/physics/ParticleAndNuclear/photon_mass.html#:~:text=Photons%20are%20traditionally%20said%20to,the%20language%20of%20special%20relativity.&text=When%20the%20particle%20is%20at,%22rest%20mass%22%20mrest. (2010) (downloaded Mar. 9, 2021) (Year: 2010).*

Esposito, A., et al., Gravitational Mass Carried by Sound Waves, Phys. Rev., Letters, 122,084501 (Mar. 1, 2019), p. 084501-1-084501-6 (downloaded Sep. 3, 2021) (Year: 2019).*

Neumaier, Arnold, "Learn The Top Misconceptions About Virtual Particles", retrieved from the Internet: <URL: https://www.physicsforums.com/insights/misconceptions-virtual-particles/>, Apr. 6, 2016 (Apr. 6, 2016), XP055586550, 9 pages.

Strassler, Matt, "Virtual Particles: What Are They?", retrieved from the Internet: <URL: https://profmattstrassler.com/articles-and-posts/particle-physics-basics/virtual-particles-what-are-they/>, Nov. 10, 2011 (Nov. 10, 2011), XP055586547, 5 pages.

Wang, Xiang et al., "Concentration Gradient Generation Methods Based on Microfluidic Systems", Royal Society of Chemistry, Jul. 2017, pp. 29966-29984.

Goudie, Marcus J., et al., "Investigation of Diffusion Characteristics Through Microfluidic Channels for Passive Drug Delivery Appli-

(56) References Cited

OTHER PUBLICATIONS cations", Journal of Drug Delivery, vol. 2016, Article ID 7913616, Hindawi Publishing Corporation, May 4, 2016, 10 pages.
Abalde-Cela, Sara, et al., "Droplet Microfluidics for the Highly Controlled Synthesis of Branched Gold Nanoparticles", Scientific Reports, vol. 8, Jan. 22, 2018, pp. 1-6.
Abramowitz, Mortimer, et al., "Concepts in Digital Imaging Technology", Hamamatsu Learning Center: Microlens Arrays, http://hamamatsu.magnet.fsu.edu/articles/microlensarray.html, Jan. 17, 2019, pp. 1-4.
Elder, Ian F., et al., "A Hollow Waveguide Integrated Optic QCL Beam Combiner", http://proceedings.spiedigitallibrary.org/ on Nov. 15, 2012 Terms of Use: http://spiedl.org/terms, Proc. of SPIE vol. 8543, pp. 854306-1-854306-11.
Hehlen, Markus P., et al., "Solid-State Optical Refrigeration", Handbook on the Physics and Chemistry of Rare Earths, vol. 46, pp. 1-151.
Adbul-Majid, Sawsan et al., "Photonic Integrated Interferometer Based on Silicon-on-Insulator Nano-Scale MMI Couplers", IEEE, 2013, pp. 337-338.
Adams, Charles S., "Laser Cooling and Manipulation of Neutral Particles", to appear in: The New Optics Cambridge University Press, pp. 1-39.
Seletskiy, Denis V., et al., "Laser Cooling in Solids: Advances and Prospects", Reports on Progress in Physics, vol. 79, No. 096401, 2016, This Accepted Manuscript is © © 2016 IOP Publishing Ltd., pp. 1-51.
Chu, Jennifer, "Engineers Design 'Tree-on-a-Chip': Microfluidic Device Passive Hydraulic Power", Physic.org 2013-2019, Science X network, Mar. 20, 2017, https://phys.org/news/2017-03-tree-on-a-chip-microlluidic-device-passiv, pp. 1-5.
Weigl, Bernhard H., et al., "Microfluidic Diffusion-Based Separation and Detection", Science, vol. 283, Issue 5400, Jan. 15, 1999, http://science.sciencemag.org/content/283/5400/346, pp. 346-347.
Nguyen, Nam-Trung, "Micro-Optofluidic Lenses: A Review", Biomicrofluidics, vol. 4, No. 031501, American Institute of Physics, 2010, pp. 031501-1-031501-5.
Su, Tiehui, et al., "Experimental Demonstration of Interferometric Imaging Using Photonic Integrated Circuits", Optics Express, vol. 25, No. 11, May 29, 2017, pp. 12653-12665.
Paie, Petra, et al., "Particle Manipulation by Optical Forces in Microfluidic Devices", Micromachines, www.mdpi.com/journal/micromachines, 2018, pp. 1-21.
Wikipedia, Passive Transport, <https://en.wikipedia.org/wiki/Passive_transport>, Jan. 17, 2019, pp. 1-3.
Stanton, Eric J., et al., Multi-Octave Spectral Beam Combiner on Ultrabroadband Photonic Integrated Circuit Platform, Optics Express, vol. 23, No. 9, May 4, 2015, pp. 11272-11283.
Microlens Arrays, Thorlabs, <https://www.thorlabs.com/newgrouppage9.cfm?objectgroup_id=2861>, Jan. 17, 2019, pp. 1-3.
Ladislas Wiza, Joseph, "MicroChannel Plate Detectors", Nuclear Instruments and Methods, vol. 162, 3/08, 1979, pp. 587-601.
Boyd, John, "New Carbon Nanotube Sheets Claim World's Top Heat-Sink Performance", IEEE Spectrum, Dec. 7, 2017 (Year: 2017), 3 pages.
Chen, Liu, et al., "Effect of the Diffuser on Diesel Turbocharger Compression Performance and Noise Emission", Proceedings of the ASME 2017 Internal Combustion Engine Division Fall Technical Conference (ICEF2017), Oct. 15-18, 2017 (Year: 2017), 9 pages.
DeBiase, Robert, "Can Casimir Forces be Asymmetric?", Proceedings of the Seventh Conference on Future Energy, Albuquerque, New Mexico, Jul. 30-Aug. 1, 2015, <URL: https://web.archive.org/web/20170825135618/integrityresearchinstitute.org/cofe.html>, 16 pages.
Doering, Charles R., et al., "Nonequilibrium Fluctuation-Induced Transport", Physical Review Letters, vol. 72, No. 19, May 9, 1994, 4 pages.
Linke, H., et al., "A Quantum Dot Ratchet: Experiment and Theory", Europhysics Letters, vol. 44, No. 3, Nov. 1, 1998, <URL: https://www.researchgate.net/profile/P_Omling/publication/231007281_A_quantum_dot_ratchet_Experiment_and_theory/links/0deec52126cb350c59000000.pdf >, pp. 341-347.
Lorke, A., et al., "Far-Infrared and Transport Properties of Antidot Arrays with Broken Symmetry", Physica B 249-251, 1998, <URL: https://www.nano.physik.lmu.de/nanophysics/_assets/pdf/1998/98-12_Lorke_PhysicaB.pdf >, pp. 312-316.
Ninth International Conference on Future Energy—COFE9, Jul. 28-29, 2017, <URL: https://web.archive.org/web/20170825135618/integrityresearchinstitute.org/cofe.html>, 7 pages.
Sahai, R., "Membrane Separations / Filtration", Encyclopedia of Separation Science, Jan. 1, 2000 (Jan. 1, 2000), XP055627471, ISBN 978-0-12-226770-3, 001: 10.1016/BO-12-226770-2/05151-6, pp. 1717-1724.
Song, A. M., et al., "Nonlinear Electron Transport in an Asymmetric Microjunction: A Ballistic Rectifier", Physical Review Letters, vol. 80, No. 17, Apr. 27, 1998, <URL: https://www.nano.physik.uni-muenchen.de/nanophysics/_assets/pdf/1998/98-03_Song_BallRect_PRL.pdf>, pp. 3831-3834.
Springer, F., et al., "Study of the Effect of Geometry on Wall Shear Stress and Permeate Flux for Ceramic Membranes: CFD and Experimental Approaches", Engineering Applications of Computational Fluid Mechanics, vol. 4, No. 1, (Year: 2010), DOI: 10.1080/19942060.2010.11015296, published online Nov. 19, 2014, pp. 17-28.
Leff, Harvey S., "Teaching the Photon Gas in Introductory Physics", American Journey of Physics, vol. 70, No. 8, Aug. 2002, pp. 792-797.

\* cited by examiner

FILTRATION APPARATUS AND METHOD

CLAIM OF PRIORITY

The present patent application is a continuation-in-part of U.S. application Ser. No. 16/273,139 filed on Feb. 11, 2019, which claims the benefit of U.S. Provisional Patent Application No. 62/710,120, filed on Feb. 9, 2018, No. 62/917,459 filed on Dec. 6, 2018, No. 62/710,224 filed on Feb. 12, 2018, No. 62/917,461 filed on Dec. 6, 2018, and No. 62/710,608 filed on Feb. 23, 2018, each being incorporated herein by reference in its entirety.

The present patent application is also a non-provisional of, and claims the benefit of priority of U.S. Provisional Patent Application No. 62/762,439 filed on May 3, 2018, U.S. Provisional Patent Application No. 62/763,032 filed May 30, 2018, and U.S. Provisional Patent Application No. 62/763,038 filed on May 31, 2018, each of which is hereby incorporated by reference in its entirety.

FIELD

The invention relates to apparatuses and methods for filtering, pumping, and/or concentrating objects of interest.

BACKGROUND

Filtering, pumping or changing the concentration of objects of interest typically consumes useful energy. For example, in a typical desalination plant employing reverse osmosis, the separation of the solute from the solution consumes useful power in the form of electricity. Similarly, the pumping of fluid by a conventional aircraft engine during the production of thrust consumes useful energy provided separately in the form of hydrocarbon fuel or in the form of an electrical battery, for example.

SUMMARY

According to the present invention, methods of facilitating the diffusion of objects of interest from a first reservoir to a second reservoir, comprise providing a filtering apparatus comprising a channel system provided by the present disclosure, wherein the channel system is diffusively coupled to the first reservoir and the second reservoir.

A filtration apparatus for preferentially transmitting objects of interest is provided, wherein the filtration apparatus comprises: a channel system comprising at least one channel; a channel disposed within the channel system, extending from at least one first opening at a first reservoir to at least one second opening at a second reservoir, and facilitating the diffusion of objects of interest through the channel from the first reservoir to the second reservoir; a region of reduced cross-sectional area disposed within the channel, wherein the cross-sectional area is viewed along the length of the channel; and wherein the minimum characteristic width of the reduced cross-sectional area is measured perpendicular to the length of the channel and is less than 1000 times the mean free path of objects of interest at that location; a first gradient segment disposed within the channel, wherein the first gradient segment extends from the region of reduced cross-sectional area towards a region of increased cross-sectional area in the direction of the first reservoir; and a second gradient segment disposed within the channel, wherein the second gradient segment extends from the region of reduced cross-sectional area towards a region of increased cross-sectional area in the direction of the second reservoir, and wherein the increase in the cross-sectional area of the channel per unit length of the channel in the second gradient segment is less than the increase in the cross-sectional area of the channel per unit length of the channel in the first gradient segment. As described herein, the geometry of a channel in a filtering apparatus can be configured to preferentially transmit objects of interest from the first reservoir to the second reservoir. The transmissivity of objects of interest through the filtering apparatus from the first reservoir to the second reservoir can thus be configured to be larger than the transmissivity of objects of interest through the filtering apparatus from the second reservoir to the first reservoir.

This property of a filtering apparatus can be employed to generate a difference in the concentration of objects of interest in a second reservoir relative to a first reservoir for a static boundary condition. This property can also be employed to generate a net diffusion of objects of interest, through a filtering apparatus for a dynamic boundary condition. The energy of the net diffusion, i.e. the energy associated with the resulting bulk flow of objects of interest, is provided by the thermal energy of the objects of interest in some embodiments of the invention. The bulk flow of OI can be employed in the production of thrust in an aircraft propulsion unit, for example. The bulk flow of OI can also be employed in the conversion of thermal energy of a fluid into useful work, such as into mechanical work or electrical energy.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION OF THE DRAWINGS

Figure 1:
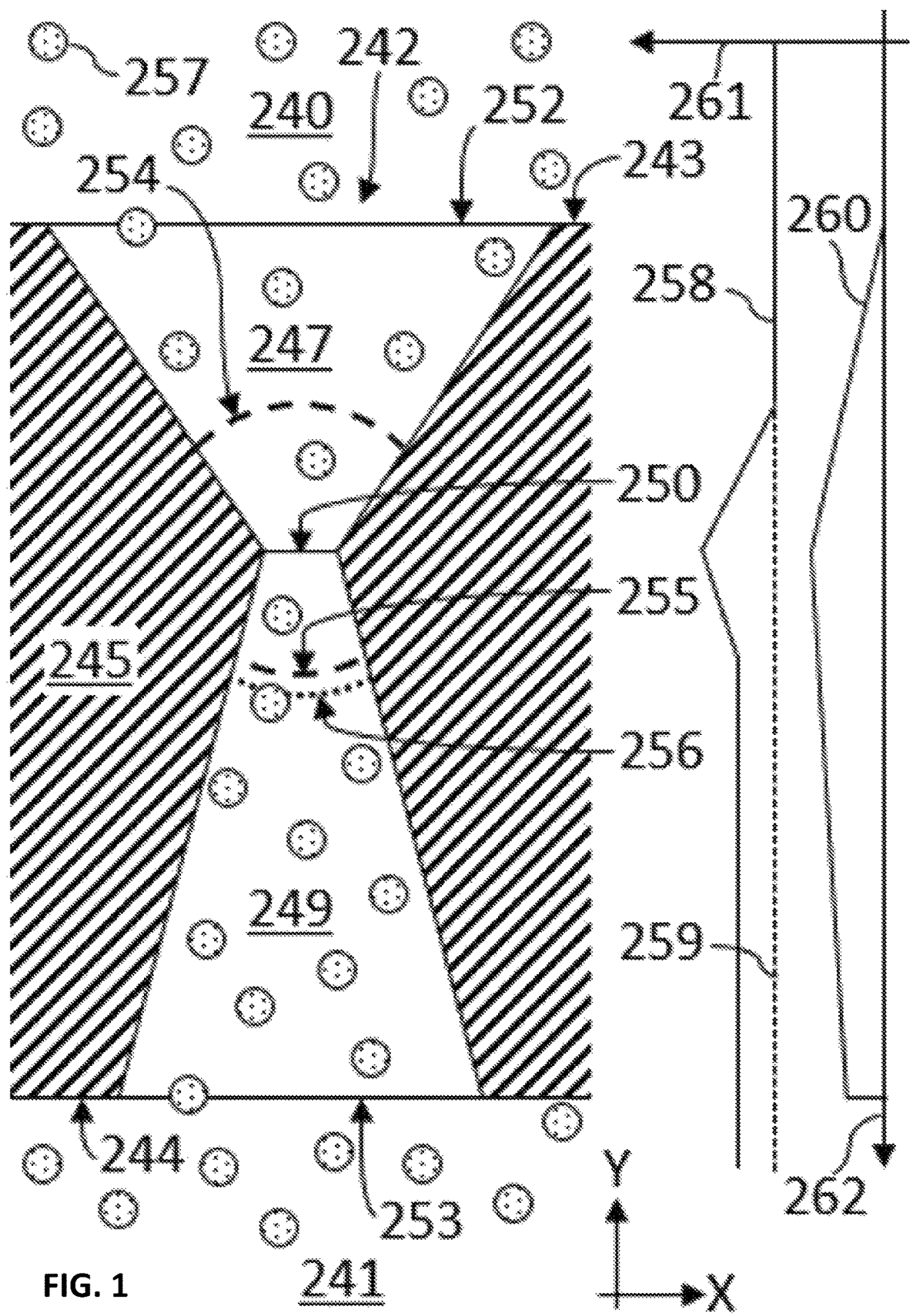
FIG. 1 is a cross-sectional view of one embodiment of the invention.

Provided is an apparatus and method for filtering objects based on a defining property of the objects.

The term "medium" used herein describes any material which is capable of containing, carrying, transporting, or transferring an object of interest. A medium can be a gas, liquid, solid, or vacuum, for example. By default, a medium refers to the collection of all objects which interact with a specified apparatus.

The term "object" used herein describes any component of a medium. An object can be described as a particle, such as a dust particle, a soot particle, a water droplet, or a water molecule. Other examples of objects are subatomic particles such as electrons or protons. An object can also be described as a wave, such as a photon, or phonon. Note that for embodiments of this invention, the OI need to be able to interact with each other, where an interaction can refer to a collision, a scattering event, or another modification of the properties of at least one OI brought about by at least one other OI. An object can have a property of interest, as well as a defining property, which can be used to distinguish an object from other objects of the medium. The invention applies to any medium which can be considered to comprise distinct objects.

One can define a "dynamic boundary condition" as a simplified scenario in which the properties of the medium at a first reservoir and a second reservoir are identical and uniform in time and space.

One can define a "static boundary condition" as a simplified scenario in which a first and second reservoir are finite in size and isolated from each other and any other reservoirs apart from an embodiment of the invention allowing the exchange of OI between the first and second reservoirs. In the static boundary condition, the macroscopic properties of interest of the medium in the first and second reservoirs have reached a steady state value, i.e. a value that is substantially constant in time and space, i.e. substantially uniform throughout a reservoir. Such macroscopic properties can refer to the pressure, temperature, or density of a medium, for example.

The "characteristic width" of a channel is the maximum collisional diameter of a theoretical, spherical object of interest which is able to diffuse through the channel.

A "default boundary condition" for an example plate embodiment may refer to a model scenario in which the properties of the medium at a first reservoir and a second reservoir are identical and uniform in time and space.

A "baseline scenario" may refer to a scenario in which an example embodiment comprising a filtering apparatus is replaced by a "baseline apparatus" comprising a solid, impermeable, possibly reflective, flat plate, and subjected to default boundary conditions.

A "baseline probability" may refer to the probability for any object which interacts with a baseline apparatus to be located at a specified side of the baseline apparatus after the interaction is completed in a baseline scenario. For example, the baseline probability may be 50% for any side of the baseline apparatus.

FIG. 1 is a cross-sectional view of another embodiment of the invention. Some features of the apparatus shown in FIG. 1, as well as some of the principles of operation of the apparatus share similarities with the apparatus shown in the other figures, and will therefore not be described in the same detail in the context of FIG. 1, and vice versa.

There is a first reservoir 240 and a second reservoir 241, in which the medium comprises objects of interest, or "OI", which are schematically represented by individual particles, such as the schematic representation of OI 257. OI are assumed to be spherical in shape in this simplified embodiment. In FIG. 1, for simplicity, the medium can be considered to be an ideal gas comprising monatomic molecules. In other embodiments the medium can consist of other types of objects, such as water molecules. In other embodiments, OI need not be spherical, but can take any shape. For example, OI can be a diatomic molecule, or a polyatomic molecule, or an aerosol particle like a dust particle or pollen, which can take a wide variety of shapes. A medium can also comprise several different types of objects, such as sodium and chlorine ions found in salt water, or electrons in a conductor. An OI can also be a subatomic particle such as an electron, positron, or photon. An OI can also be a virtual particle, or virtual object, such as a virtual photon, a virtual electron, or a virtual positron, as describe by quantum field theory. These virtual particles give rise to the zero point energy and associated effects, such as the Casimir effect.

In this example, the invention is embodied by a channel system 242, which comprises a first gradient segment 247 and a second gradient segment 249. OI are able to diffuse from the first reservoir 240 into the first gradient segment 247 via the first entrance 252, and from the first gradient segment 247 into the second gradient segment 249 via the interior channel opening 250, and from the second gradient segment 249 into the second reservoir 241 via the second entrance 253. An OI is also able to diffuse from the second reservoir 241 into the first reservoir 240 through the channel system 242. In other embodiments, there can also be a uniform segment, such as uniform segment 273 in FIG. 2, which connects the first gradient segment 247 and the second gradient segment 249.

An embodiment of the invention can comprise several channel systems, such as channel system 242. In some embodiments, the channel systems are located in close proximity to one another in the XZ-plane. For example, the first entrance 252 of one channel system can be adjacent to six other first entrances of six other channel systems. In this case, the first entrance 252 can have a hexagonal shape.

The channel system 242 is surrounded by bulk material 245, which comprises a first surface 243 and a second surface 244, both of which are planar, and parallel to the XZ-plane. Bulk material 245 can be made of any suitable material, such as metal, composite, or ceramic. In some embodiments, bulk material 245 can also be described as a fabric. Bulk material 245 can comprise graphene in some embodiments. Bulk material 245 is configured to be perfectly reflective to OI in this embodiment. Note that the reflections can be specular or diffuse in this embodiment and embodiments of this type. In other embodiments, bulk material 245 can have a reflectivity which is greater than zero.

In this embodiment, the cross-sectional geometry of channel system 242 is constant and circular when viewed along the Y-direction. In other embodiments, a channel can have any cross-section, such as square, rectangular, or polygonal cross-sections. In other embodiments, the cross-sectional geometry of channel system 242 need not be constant throughout the channel system. For instance, the cross-sectional geometry of the channel system 242 can change as a linear function of position along the Y-axis from a hexagonal shape at the first entrance 252 to a circular cross-section at the interior channel opening 250.

In in some embodiments, the size of the channel cross-sectional area decreases on average in the negative Y-direction throughout the first gradient segment 247. In the embodiment shown in FIG. 1, the decrease in the diameter of the channel cross-sectional area is a linear function of position along the Y-axis. The cross-sectional area of the channel decreases at a decreasing rate in the negative Y-direction. In other embodiments, the decrease in the cross-sectional area can be a linear function of position along the Y-axis. In some embodiments the cross-sectional area can decrease at an increasing rate in the negative Y-direction.

In this embodiment, the size of the channel cross-sectional area increases on average in the negative Y-direction throughout the second gradient segment 249. In the embodiment shown in FIG. 1, the increase in the diameter of the channel cross-sectional area is a linear function of position along the Y-axis. The cross-sectional area of the channel increases at an increasing rate in the negative Y-direction. In other embodiments, the increase in the cross-sectional area can be a linear function of position along the Y-axis. In some embodiments the cross-sectional area can increase at decreasing rate in the negative Y-direction.

The cross-sectional area of the interior channel 250, is four times larger than the cross-sectional area of an OI in FIG. 1, or equal to the collision area of an OI, where the collision area is the effective cross-sectional area of the effective swept volume of an OI. The effective swept volume is the volume associated with the motion of an OI, where the intersection of the swept volumes of two OI is associated with an interaction between two OI. In other embodiments, the channel area can be less than the collision area of an OI, but sufficiently large that least one OI is able to diffuse through interior channel 250. In other embodiments, the channel area can be less than ten times the collision area of an OI. In some embodiments, the size of an interior channel opening 250 is on the order of a mean distance of separation between OI in the medium in the first reservoir 240. In some embodiments, the size of an interior channel opening 250 is on the order of a mean free path of an OI in the first reservoir 240. In some embodiments, the size of an interior channel opening 250 is on the order of several orders of magnitude of the mean free path of an OI in the first reservoir 240. In some embodiments, the size of an interior channel opening 250 is less than 1000 times the mean free path of an OI in the first reservoir 240. In other embodiments, the channel area can be of any suitable size. In some embodiments, the channel width is constant in time. In other embodiments, this need not be the case. For instance, the width of a channel can be regulated to control the rate of diffusion of OI through the interior channel 250. The width of a channel at a given location along the Y-direction in channel system 242 can take any suitable value at any instant in time, where suitability depends on the particular application, and can be determined using methods known in the art.

The cross-sectional area of first channel entrance 252 and second channel entrance 253 is determined by the rate of increase of the cross-sectional area of the channel in the positive and negative Y-direction respectively, as well as the length of the first gradient segment 247 and the second gradient segment 249 along the Y-direction respectively.

The length of the first gradient segment 247 along the Y-direction in the depicted embodiment is sufficiently large, that the width of first channel entrance 252 is larger than 1000 times the mean free path of OI in the first reservoir 240. Note that the actual density of particles, such as particle 257, is much larger than is shown in FIG. 1. This discrepancy is due to clarity of description. In other embodiments, the width of first channel entrance 252 can be smaller than 1000 times the mean free path of OI in the first reservoir 240, provided that the principles of the invention described below still apply.

The length of the second gradient segment 249 along the Y-direction in the depicted embodiment is sufficiently large, that the width of second channel entrance 253 is larger than 1000 times the mean free path of OI in the second reservoir 241. In other embodiments, the width of the second channel entrance 253 can be smaller than 1000 times the mean free path of OI in the first reservoir 240, provided that the principles of the invention described below still apply.

The characteristic width of interior channel opening 250 is smaller than 1000 times the mean free path of objects of interest at that location in general. In some embodiments, the characteristic width of said channel is less than 10 times said mean free path. In some embodiments, the characteristic width of said channel is less than 1000 times the collision diameter of an object of interest. In some embodiments, the characteristic width of said channel is less than 10 times the collision diameter of an object of interest. In some embodiments, the characteristic width of said channel is less than 5 times the collision diameter of an object of interest.

The rate of change of the characteristic size of the cross-sectional area of the first gradient segment 247 along the Y-direction at a specified location along the Y-direction is denoted the "first gradient". The "second gradient" is the rate of change of the characteristic size of the cross-sectional area of the second gradient segment 249 along the Y-direction at a specified location along the Y-direction. In FIG. 1 the characteristic size of the cross-sectional area is the diameter of the channel. In other embodiments, the characteristic size can be the circumferential mean diameter of a channel. The average first gradient throughout the length of the first gradient segment 247 along the Y-direction is denoted the "average first gradient". The average second gradient throughout the length of the second gradient segment 256 along the Y-direction is denoted the "average second gradient". In FIG. 1 the magnitude of the average first gradient, denoted "MAG1", is larger than the magnitude of the average second gradient, denoted "MAG2". In other embodiments this need not be the case. In FIG. 1 the first gradient is positive and constant throughout the first gradient segment 247, and the second gradient is negative and constant throughout the second gradient segment 249.

For the default boundary condition, the probability of an object of the medium being located at the first reservoir 240 prior to interacting with the first surface of the control volume is 50%, with the other 50% applying to the second reservoir 241. Since the first capture area is larger than the second capture area, the probability of a particle entering the channel system from the first reservoir 240 is larger than the probability of a particle entering the channel system from the second reservoir 241. The fraction of particles which enter the channel system via the first capture area and exit via the second capture area may be referred to as the "first transmissivity", with the "second transmissivity" describing the fraction of particles which enter the channel system via the second capture area and exit via the first capture area. The value of a transmissivity is a function of the geometry of the apparatus, as well as properties of the medium. For the default boundary condition for a filtering apparatus configured as described herein, there will be a net flow rate of objects from the first reservoir 240 to the second reservoir 241 when the ratio of the first transmissivity to the second transmissivity multiplied by the ratio of the first capture are to the second capture area is greater than 1. The geometry of the channel system and the ratio of the first capture area to the second capture area are examples of parameters that can be optimized to maximize an objective subject to constraints. The objective may be the net flow rate of a property of interest from the first reservoir 240 to the second reservoir 241 for a dynamic boundary condition, or the ratio of the number density of objects of interest in the second reservoir 241 to the number density of objects of interest in the first reservoir 240 for a static boundary condition.

In the context of FIGS. 1-5, a generic capture area can be defined in several different ways. Note that a generic capture area defined on one way is not necessarily identical to a generic capture area defined in a different way, such as the way in which the generic capture area is defined in the context of other embodiments and other drawings. The notion of a generic capture area, however, is substantially the same for the different definitions of a generic capture area.

In the context of FIGS. 1-5, a generic capture area is defined by default as follows. For a given incremental area on the surface which describes a channel opening, and a given direction, one can define the average location of the last scattering event of an OI which passes through the channel opening from the specified direction and at the specified incremental area. In FIG. 1 a channel opening is defined to be a theoretical surface which is parallel to the XZ-plane and coincident with the indicated location of the channel opening 250. Consider the following, simplified example to illustrate the concept. Consider a planar channel opening which faces an infinite reservoir containing an ideal gas. There are no structures located on the side of the plane of the channel opening which faces the ideal gas. In other words, the channel opening can be considered to be a theoretical, planar surface embedded within an ideal gas located in an infinite reservoir. In this configuration, the average locations of the last scattering event for ideal gas molecules which pass through an incremental area within the planar channel opening from a specified direction form a three-dimensional surface when all possible directions are considered. This surface is denoted the "origin surface". In the simple example being described, the origin surface is a hemisphere which is centered on the center of the incremental area and protrudes into the reservoir. The radius associated with the hemisphere is a function of the mean free path of the ideal gas molecules. For each incremental surface area of the channel opening, such an origin surface can be found. The envelope of all of the origin surfaces of all of the incremental areas of a channel opening can be calculated. The envelope is the set of points of the origin surfaces which are furthest from any point on the surface which describes the channel opening. This envelope also describes a three-dimensional surface, which, together with the channel opening surface, encloses a volume. This volume can be referred to as the aforementioned generic capture area of a channel opening. The aforementioned definition is the default definition of a generic capture area.

A generic capture area can alternatively be defined as follows. The boundary of a generic capture area, i.e. the surface encompassing a generic capture area, can be considered to comprise three segments. A first segment is the surface describing the channel opening. A second segment is the surface which denotes the limit of the spatial extent of the specified reservoir. For example, the second segment can be the portion of the generic capture area which is in contact with the surface of bulk material associated with the specified channel. The third segment is the remaining boundary of the generic capture area. The third segment passes through the specified reservoir. Note that in some embodiments of the invention there need not be a second segment. The location and shape of the third segment can be defined as follows. Consider an object, such as an OI, diffusing from the specified reservoir into the generic capture area associated with a channel opening. Once within the generic capture area, the object can eventually diffuse to the channel opening. Once within the generic capture area, the object can also diffuse out of the generic capture area without having with the channel opening. One can define an "interaction probability" as the probability of a specified object, which diffuses into the generic capture area through an incremental surface element of the boundary surface of a generic capture area, being incident on a specified channel opening at least once before it diffuses out of the generic capture area through either the channel opening or the third segment. The boundary of a generic capture area can be defined in terms of a specified value of the interaction probability. In other words, all objects diffusing through the third segment of the boundary of a generic capture area have the same, specified probability of interacting with the specified channel opening at least once before diffusing out of the generic capture area. Note that, by definition, any object diffusing out of the generic capture area through the specified channel opening must have interacted with the specified channel opening at least once. By default, this interaction probability is 0.1.

A generic capture area can also be defined as follows. The minimum distance between a given point on the third segment of the boundary surface and any point on the first segment of the boundary surface, i.e. the channel opening, can be defined to be a specified function of the length of the mean free path of an object in the specified reservoir. By default the specified function is a linear function of the length of a mean free path, where the default constant of proportionality is ten.

A generic capture area can otherwise be defined as follows. For the static boundary condition, there is a known rate of objects incident on a channel opening per unit time. This rate of incident objects is denoted the "incident flux". One can define the third segment of the boundary surface of a generic capture area as a surface through which the rate of diffusion of objects from the specified reservoir into the generic capture area is a specified function of the incident flux. By default, the rate of diffusion of objects through the third segment is directly proportional to the incident flux, where the constant of proportionality is greater than one. This is due to a portion of the OI which diffuse into the generic capture area also diffusing out of the generic capture area without being incident on the channel opening. The default value of this constant of proportionality is ten. The shape of the third segment can be defined in a manner in which the expected rate of diffusion of objects through an incremental surface of the third segment is constant and uniform for any and all incremental surfaces of the third segment for the static boundary condition. The third segment can thus be considered to be a constant flux contour. As mentioned, the flux need only enter the third segment, i.e.

the return flux is not subtracted, and this flux typically defined to be larger than or equal to the incident flux.

The generic capture area can also be interpreted in the following way. In accordance with the aforementioned default definition of a generic capture area, the state of any object located at or in proximity of the third segment of the boundary of the generic capture area can be considered to be independent or uncorrelated to the state of objects at the channel opening. Thus the properties of an object at the third segment are approximately equal to the properties of any object in the specified reservoir, i.e. outside the generic capture area. In a simplified case shown in FIG. 1, the state refers to the velocity magnitude and direction of an OI. In other embodiments, a state can refer to other or additional parameters. The third segment marks the location closest to a channel opening at which the average properties of the objects substantially match the average properties of the objects in the medium of the specified reservoir. Thus, the third segment can be interpreted to be the true interface between a channel and the specified reservoir. The third segment can also be interpreted to be the aperture of the specified channel opening in regards to the specified reservoir. The third segment can also be interpreted to be the effective channel opening, or the capture area, of the specified channel opening in regards to the specified reservoir.

In accordance with some embodiments of the invention, the surface area of the third segment of a first generic capture area of a first channel opening in a first reservoir is larger than the third segment of a second generic capture area of a second channel opening in a second reservoir for a static boundary condition, where the second channel opening and the first channel opening are associated with the same channel system.

The third segment of the boundary surface of the first generic capture area of the interior channel opening 250 in the first gradient segment 247 is schematically represented by dashed line 254. The third segment of the boundary surface of the second generic capture area of the interior channel opening 250 in the second gradient segment 249 for the static boundary condition is schematically represented by dashed line 255. Since the channel opening is axially symmetric, the boundary surfaces of the associated generic capture areas are axially symmetric about an axis parallel to the Y-axis. The third segment of the boundary surface of a "hypothetical generic capture area" of the interior channel opening 250 in the second gradient segment 249 for a "hypothetical case" is schematically represented by dotted line 256. In the hypothetical case, the properties of the medium in the second reservoir 241 are considered to be identical to the properties of the medium in the first reservoir 240. Note that, in practice, such a configuration can only be maintained instantaneously, i.e. in an infinitesimally short time period, since this configuration is similar to the initial configuration for the dynamic boundary condition. Note that for the static boundary condition, the properties of the medium within the first gradient segment 247 are substantially uniform, isotropic, and equal to the properties of the medium in the first reservoir 240, and the properties of the medium within the second gradient segment 249 are substantially uniform, isotropic, and equal to the properties of the medium in the second reservoir 241. Such properties can comprise the pressure or density of OI within the reservoir, for example. For simplicity, one can consider the generic capture areas to be the intersection between the volume of a sphere of a certain radius centered at the center of the channel opening and the volume of the specified reservoir. The radius of the hypothetical generic capture area 256 and the first generic capture area 254 can be considered to be similar in magnitude, because in the hypothetical case the properties of the medium and the OI contained therein are identical in the second reservoir 241 and the first reservoir 240. In general, the surface area of the third segment of the first generic capture area 254 is larger than the surface area of the third segment of the hypothetical generic capture area 256. In FIG. 1, this is due to the more gradual increase in the negative Y-direction of the size of the channel cross-sectional area viewed along the Y-axis throughout the portion of the second gradient segment 249 which is adjacent to the second generic capture area 255, where the comparison is made to the less gradual increase in the positive Y-direction of the size of the channel cross-sectional area viewed along the Y-axis throughout the portion of the first gradient segment 247 which is adjacent to the first generic capture area 254. The surface area of a third segment of the boundary surface of a specified generic capture area of a specified channel opening in a specified reservoir will be referred to as the "aperture" for simplicity. As a result of the larger aperture, the rate of diffusion of OI from the first gradient segment 247 through the interior channel opening 250 into the second gradient segment 249 is larger than the hypothetical rate of diffusion of OI from the second gradient segment 249 into the first gradient segment 247 through the same channel opening for the aforementioned hypothetical case. In the static boundary condition, the rate of diffusion in either direction through the interior channel opening 250 must be identical. In order to satisfy this constraint despite the smaller aperture, the number density of OI in the second reservoir 241 must be larger than the number density of OI in the first reservoir 240, as shown in FIG. 1. As a result of the larger number density and reduced mean free path, the radius and aperture of the actual second generic capture area 255 is smaller than the same for the hypothetical generic capture area 256. For some embodiments for the static boundary condition, the pressure of OI in the second reservoir 241 is larger than the pressure of OI in the first reservoir 240. For some embodiments for the static boundary condition, the entropy of OI in the second reservoir 241 is smaller than the entropy of OI in the first reservoir 240. For some embodiments for the static boundary condition, the average velocity of OI in the second reservoir 241 is substantially equal to the average velocity of OI in the first reservoir 240. For some embodiments for the static boundary condition, the temperature of OI in the second reservoir 241 is substantially equal to the temperature of OI in the first reservoir 240.

For the dynamic boundary condition, there is a net diffusion of OI from the first reservoir 240 into the second reservoir 241. Embodiments of the invention can therefore also be considered for applications involving pumping. As a result of the net diffusion of OI, there is a net force acting in the positive Y-direction on embodiments of the invention. Such a force can be employed to do mechanical work. For example, a plate containing an array of channels configured in accordance with the invention can be mounted on an aircraft or a spacecraft and employed to produce thrust or provide actuation for attitude control. This mechanical work can also be converted into electrical energy by means of an electric generator. In the case in which the OI carry charge, as in the case in which OI are electrons, or positively or negatively charged ions, embodiments of the invention can be employed to produce a net motion of charge, which can be used to do electrical work. This electrical work can also be converted into mechanical work by means of an electric motor. Embodiments of the invention can therefore also be considered for applications involving power generation or consumption.

The larger magnitude in the average gradient in the first gradient segment 247 results in a larger aperture associated with the first generic capture area 254 compared to the aperture of the hypothetical second generic capture area 256. This results in a stronger focusing effect of OI diffusing from the first aperture of the first generic capture area 254 to interior channel opening 250 compared to the focusing effect of OI diffusing from the second aperture of the second generic capture area 255 to interior channel opening 250 in the hypothetical case. The focusing effect arises from the statistical or natural diffusion OI from the second gradient segment 247 towards the interior channel opening 250.

Figure 11:
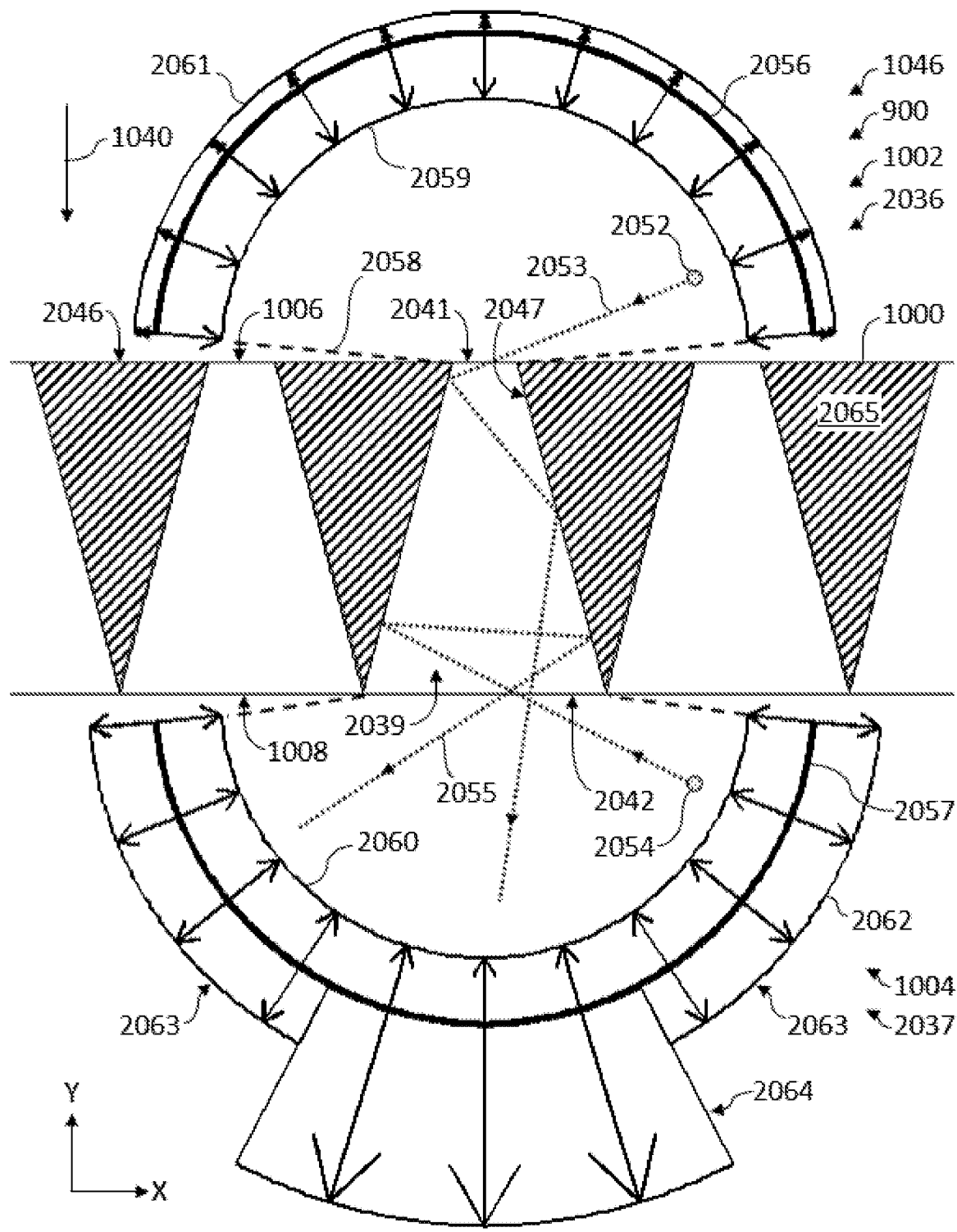
FIG. 11 is a cross-sectional view of one embodiment of the invention and a schematic representation of the interaction of said embodiment with objects of interest.

In describing the principle of operation of the embodiment shown in FIG. 1 one needs to distinguish between specular and diffuse reflections between the OI and the interior walls of a channel. Note that both types of reflections can lead to a reduced aperture in the second gradient segment compared to the first gradient segment. Note that both specular and diffuse reflections can be considered to be perfect reflections by bulk material 245, as opposed to transmissions through, or absorptions of, bulk material 245. The case in which there are specular reflections between OI and the interior walls of a channel is described in detail in the context of FIG. 11. Due to the angle formed between opposing walls of a channel, a specular reflection between an OI and the wall of a channel is for an OI diffusing along the length of a channel is also associated with a change in the angle of the trajectory of an object of interest, where the change in the angle of the trajectory is directed towards the region of larger cross-sectional area of the channel. As a result, successive wall collisions can result in a turning or a focusing of the trajectories of OI in a direction towards a region of larger cross-sectional area of the channel, e.g. in a direction of the second reservoir, or a direction of the first reservoir. The degree of the turning or focusing is a function of the gradient of a gradient segment, or the rate of change of the cross-sectional area of a channel along the length of a channel. Typically, a smaller gradient will result in a stronger focusing effect and a smaller aperture, as depicted in FIG. 11. Thus, a more gradual change in the cross-sectional area along the length of the channel in the second gradient segment compared to the first gradient segment can be associated with a smaller aperture area in the second gradient segment compared to the first gradient segment. Note that, in such embodiments, the number density of objects of interest along the length of a channel decreases in a direction of decreasing cross-sectional area. The decrease can be larger for the second gradient segment than for the first gradient segment. Due to the requirement that the number density of OI at the interface between the first and second gradient segment, i.e. at the region of reduced cross-sectional area, or at interior channel opening 250, be equal, the larger change in number density in the second gradient segment results in a larger number density of OI in the second reservoir 241 compared to the first reservoir 240.

The case in which there are diffuse reflections between OI and the interior walls of a channel can be described as follows. In determining the flux of OI, i.e. the number of OI which pass through a region of reduced cross-sectional area, such as interior channel 250, per unit time and per unit area, one needs to sum the contributions to the flux from the diffuse walls, such as the interior walls of a channel, and from the interior volume of a channel. In comparing the flux from a first scenario in which the flux is provided purely by a volume of OI, where the volume does not contain any walls, to the flux from a second scenario in which the flux is provided by the interior volume of channel comprising the same number density of OI and comprising diffuse walls, it is apparent that the effect of the diffuse walls is the replacement, or the shielding, or the shadowing of a theoretical volume of OI which lies beyond the diffuse walls. In order for the flux from the first and second scenario to be equal, the flux contribution from the diffuse walls of a channel must be equal to the flux contribution of the theoretical volume which lies beyond the diffuse walls. For a given number density of OI in an interior volume of a channel, the flux contribution to and from the diffuse walls reduces as the distance of separation between the diffuse walls is reduced to a value which is less than approximately 1000 times the mean free path of an objects of interest. Therefore, for a sufficiently small separation between the interior diffusively reflective walls of a channel, the flux contribution from the diffuse walls is less than the flux contribution of the theoretical volume of equal number density of OI which lies beyond the diffuse walls. The flux contribution from the second scenario is therefore smaller than the flux contributions from the first scenario in this case. The reduced flux is associated with a reduction in the aperture for the second scenario compared to the first scenario. In a static boundary condition, the flux from the first scenario must equal the flux from the second scenario. Thus, the number density of OI in the interior channel of the second scenario is larger than the number density of OI in the semi-infinite volume of the first scenario. This increase in density along the length of the channel is depicted in the form of line 258 in FIG. 1. Note that the gradient of the number density of OI along the length of a channel is a function of the local number density of OI in the channel, i.e. the local mean free path of OI in a channel, as well as the rate of change of the cross-sectional area of a channel. Note that the mean free path of OI in a channel is also a function of the collisional diameter of an OI. A more shallow gradient in the second gradient segment compared to the first gradient segment can thus be employed to induce a smaller decrease in the number density of OI in the second gradient segment compared to the decrease in the number density of OI in the first gradient segment relative to the location of the region of reduced cross-sectional area 205. This can result in a larger number density of OI in the second reservoir 241 compared to the first reservoir 240 for a static boundary condition. Similar principles explain the operation of the embodiments shown in FIGS. 2-10.

The embodiments shown in FIGS. 1-5 can be configured in a manner in which the interactions between objects of interest and the interior walls of the channels can comprise diffuse reflections. In some such embodiments, more than 50% of said interactions can be described as diffuse reflections. In some such embodiments, more than 90% of said interactions can be described as diffuse reflections. In some such embodiments, more than 30% of said interactions can be described as diffuse reflections.

Note that the plots of the number density of OI versus position along the length of a channel in FIGS. 1-5 imply diffusively reflective channel walls. These plots are provided for illustrative purposes, and are not intended to limit the application of these geometries, or the scope of the invention. The embodiments shown in FIGS. 1-5 can also be configured in a manner in which the interactions between objects of interest and the interior walls of the channels can comprise specular reflections. In some such embodiments, more than 50% of said interactions can be described as specular reflections. In some such embodiments, more than 90% of said interactions can be described as specular reflections. In some such embodiments, more than 30% of said interactions can be described as specular reflections.

Figure 6:
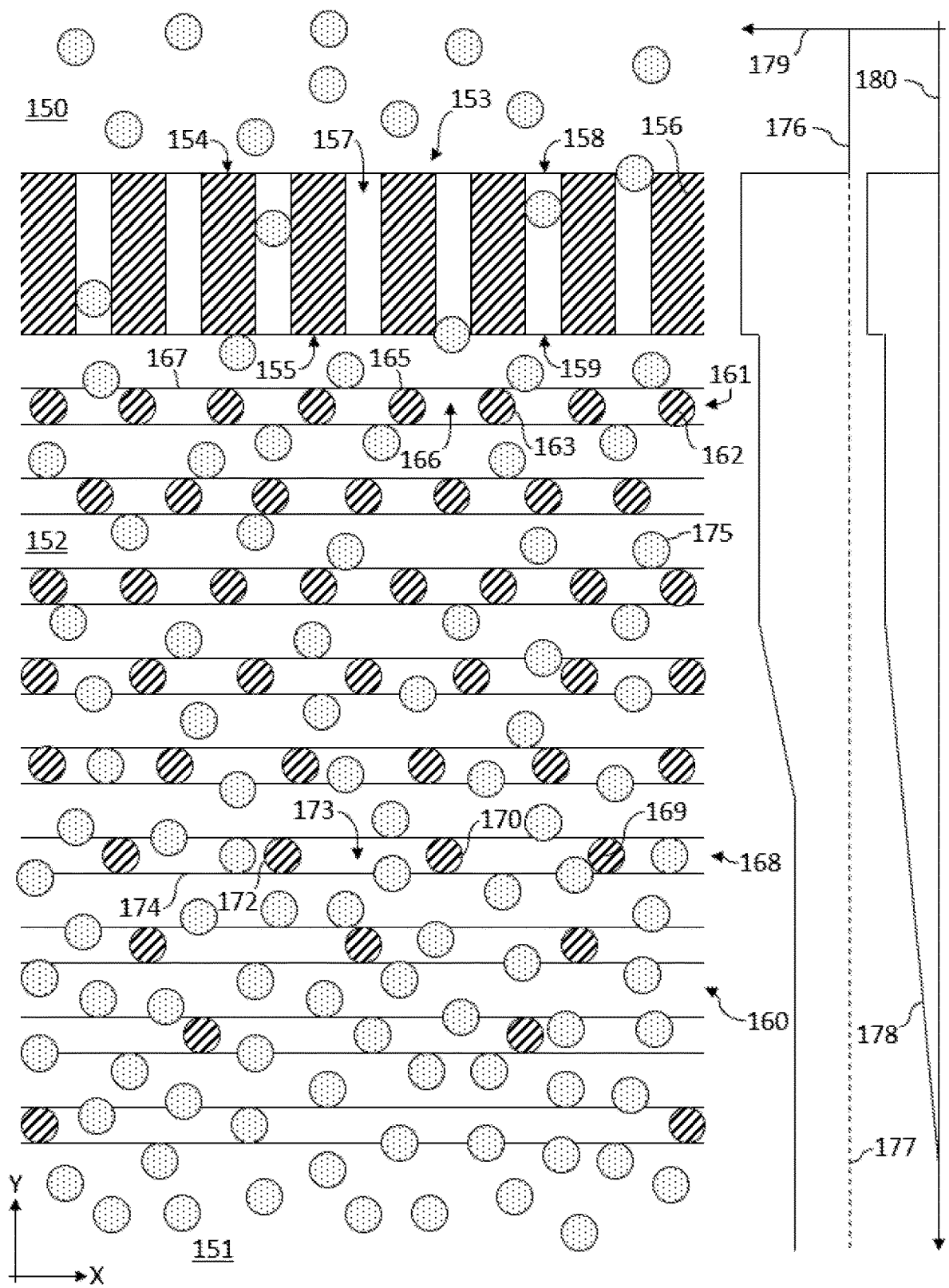
FIG. 6 is a cross-sectional view of another embodiment of the invention.
Figure 7:
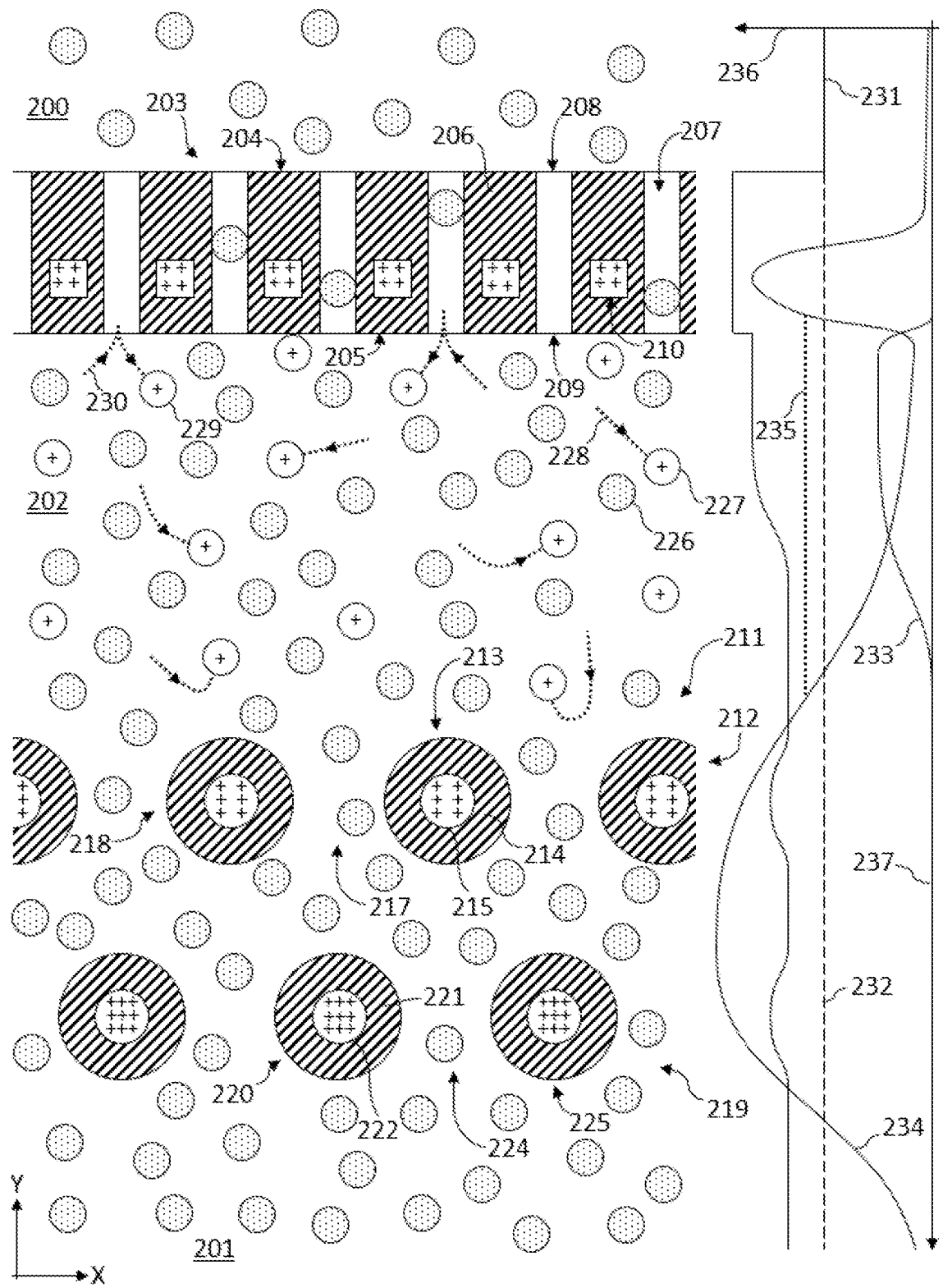
FIG. 7 is a cross-sectional view of another embodiment of the invention.
Figure 8:
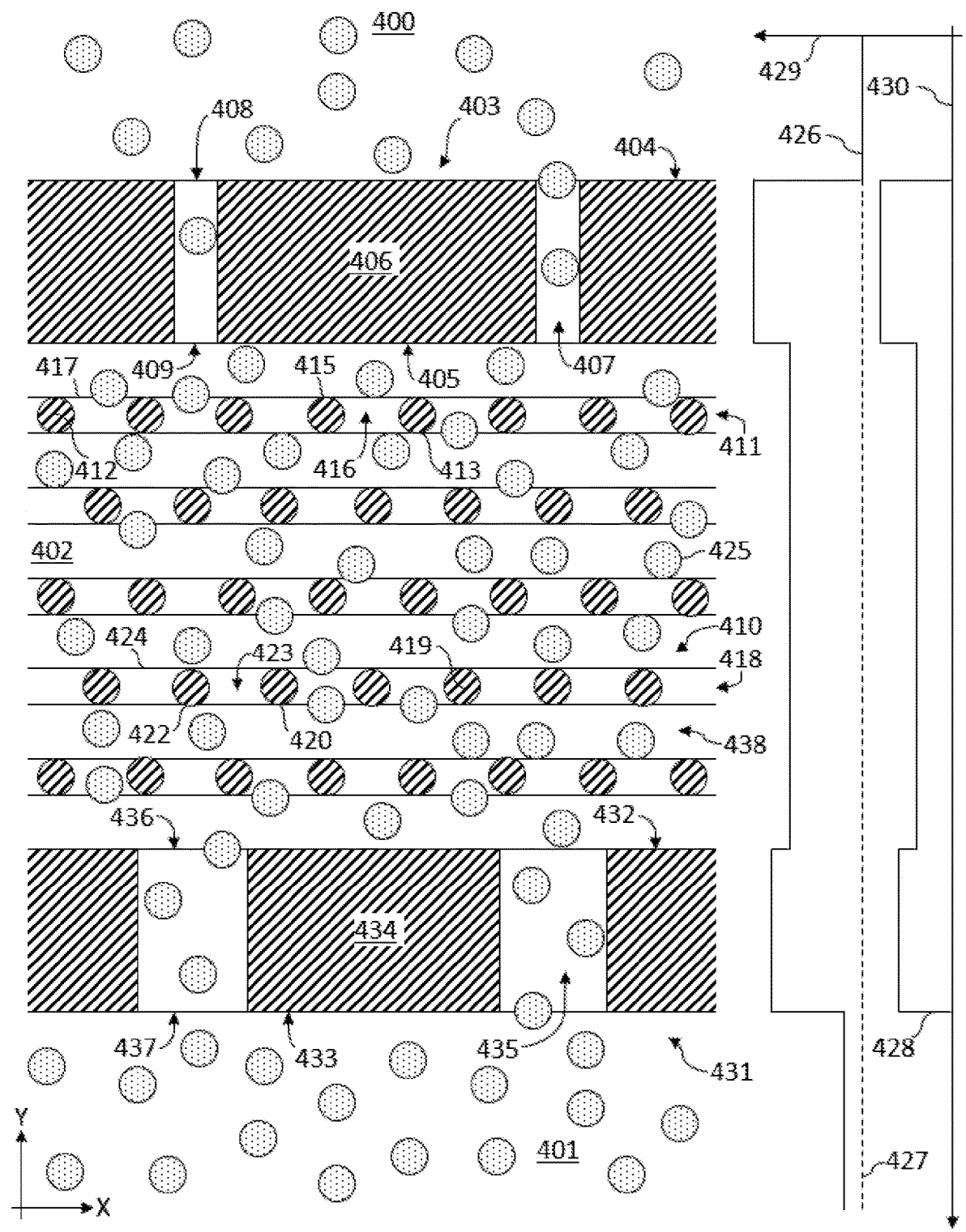
FIG. 8 is a cross-sectional view of another embodiment of the invention.
Figure 9:
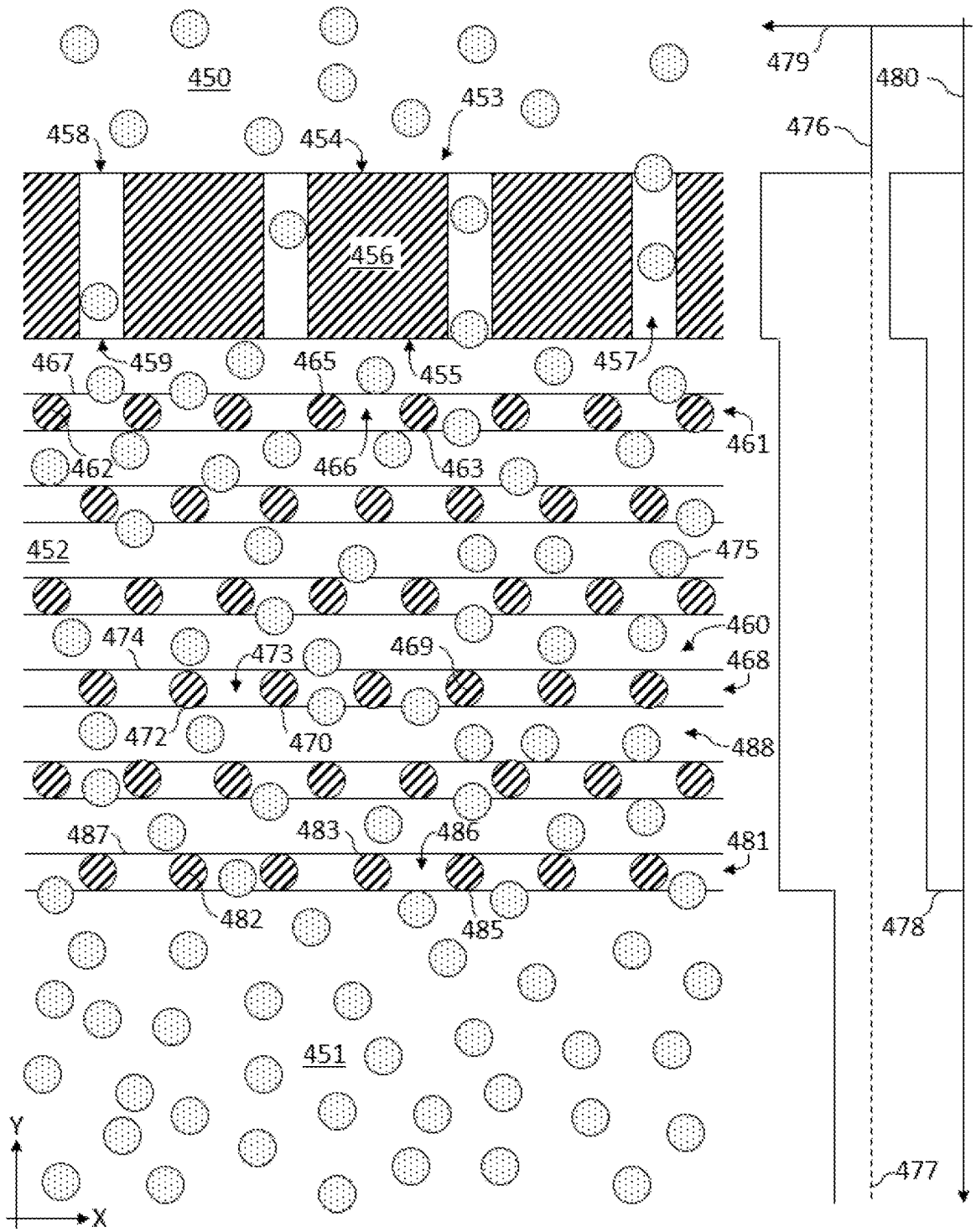
FIG. 9 is a cross-sectional view of another embodiment of the invention.
Figure 10A:
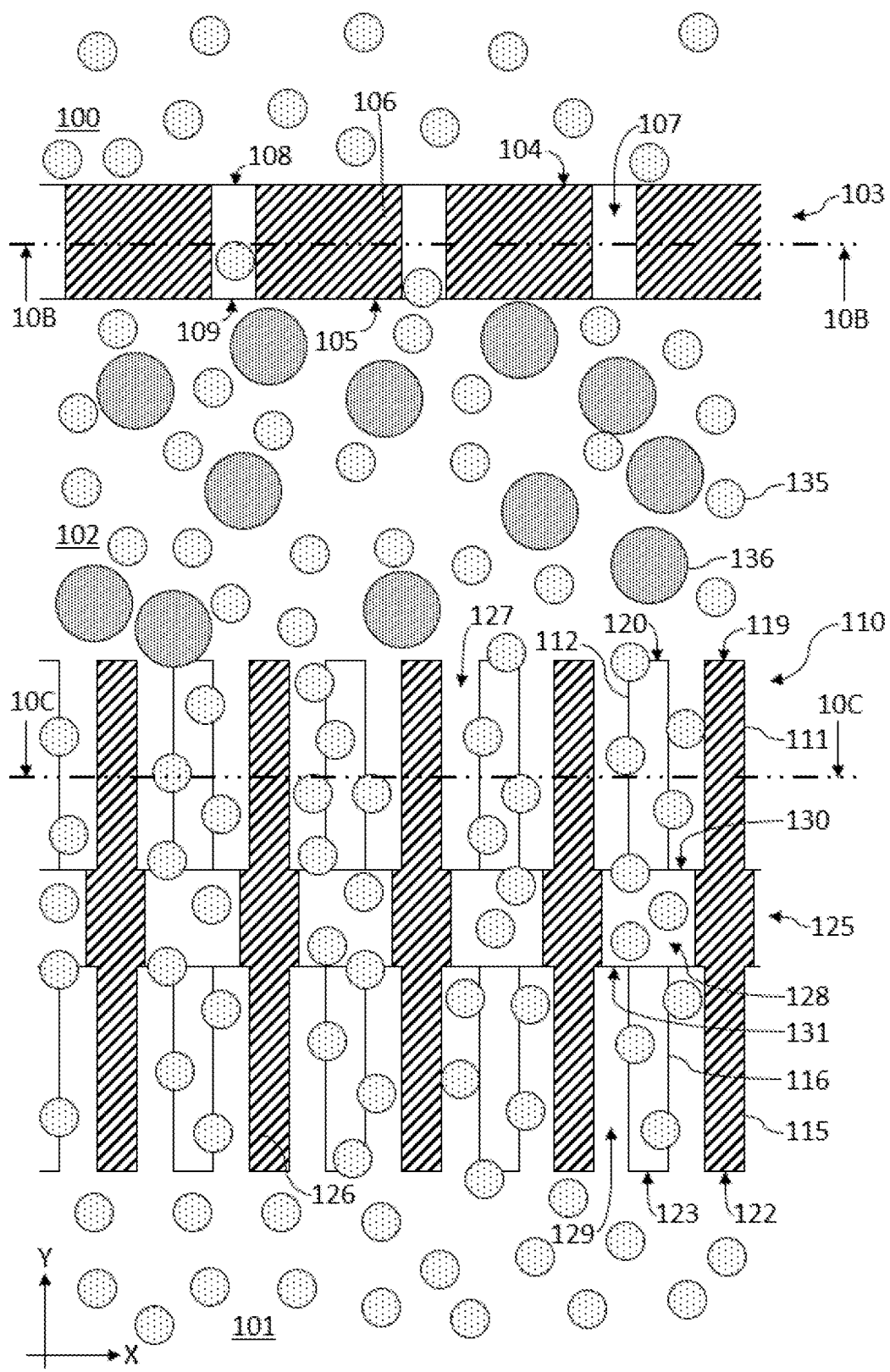
FIG. 10A is a cross-sectional view of another embodiment of the invention.

The interactions between OI and the filtered objects in FIG. 7 or FIG. 10A, or the porous bulk material, such as porous bulk material 162, in FIG. 6, FIG. 8 and FIG. 9, can be described as diffuse reflections, or scattering events.

In the context of line 258, axis 261, which is parallel to the X-axis, schematically represents the average OI fraction, and axis 262, which is parallel to the Y-axis, denotes the position along the Y-direction at which said average OI fraction is measured. The average OI fraction is measured along the central axis of the channel system 241. Dashed line 259 shows the value of the average OI fraction in the first reservoir 240 for reference.

In the context of line 260, axis 261 denotes the average bulk fraction, and axis 262 denotes the position along the Y-direction at which said average bulk fraction is measured. As before, the average portion of space which is not occupied by the first reservoir 240, the second reservoir 241, the first gradient segment 247, or the second gradient segment 249 at a specified location along the Y-direction is denoted the "average bulk fraction".

Due to a reduced aperture in the second gradient segment, the rate of diffusion of OI from the second reservoir 241 into the second theoretical generic capture area is lower in the hypothetical case than the rate of diffusion of OI from the first reservoir 240 into the first generic capture area 254. In order to balance the latter rate of diffusion for the static boundary condition, the values of some of the properties of the medium in the second reservoir 241 need to be different than the value of the same properties of the medium in the first reservoir 240. For example, the average volumetric number density of OI in the second reservoir 240 can be larger than the same in the first reservoir 240.

The effectiveness of embodiments of the invention of the type shown in FIG. 1 can be improved by reducing the cross-sectional area of the interior channel 250, increasing the aperture associated with the first generic capture area 247 relative to the aperture associated with the second generic capture area 255. Other parameters, such as those describing the properties of the OI, such as the collisional diameter of an OI, also affect the effectiveness of the embodiment. The effectiveness can be characterized in several ways, such as the ratio of the density of OI in the second reservoir 241 to the density of OI in the first reservoir 240 for the static boundary condition, or the rate of flux of OI from the first reservoir 240 to the second reservoir 241 for a dynamic boundary condition, or a combination of these metrics. In other embodiments, the effectiveness can be the net rate of diffusion of OI from the first reservoir 240 into the second reservoir 241. Connecting several stages of an apparatus of the invention, such as the apparatus shown in FIG. 2, in series, i.e. allowing the second reservoir of a first apparatus to coincide with the first reservoir of a second apparatus, can improve the effectiveness. As mentioned, arranging several channel systems, such as channel system 267, in parallel, i.e. arranging a number of adjacent channel systems in the XZ-plane, can achieve a desired effectiveness. The most suitable configuration of an embodiment of the invention can be found using methods known in the art.

Note that, as the size of the interior channel opening 250 is increased while the values of the first gradient and the second gradient, as well as the properties of the OI are unchanged, the ratio of the aperture of the first generic capture area 254 to the aperture of the second generic capture area 255 decreases. As a result, the effectiveness of the embodiment of the invention is reduced. In this case, the size of the interior channel opening 250 can be expressed in terms of the diameter of interior channel opening 250. For some embodiments, it can therefore be desirable for the size of an interior channel opening 250 to be on the order of a collision diameter of an OI, or as small as is feasible achievable by manufacturing methods while still allowing OI to diffuse through the interior channel opening 250. Embodiments of the invention can be manufactured using methods known in the art of semiconductor manufacturing, for example.

Figure 2:
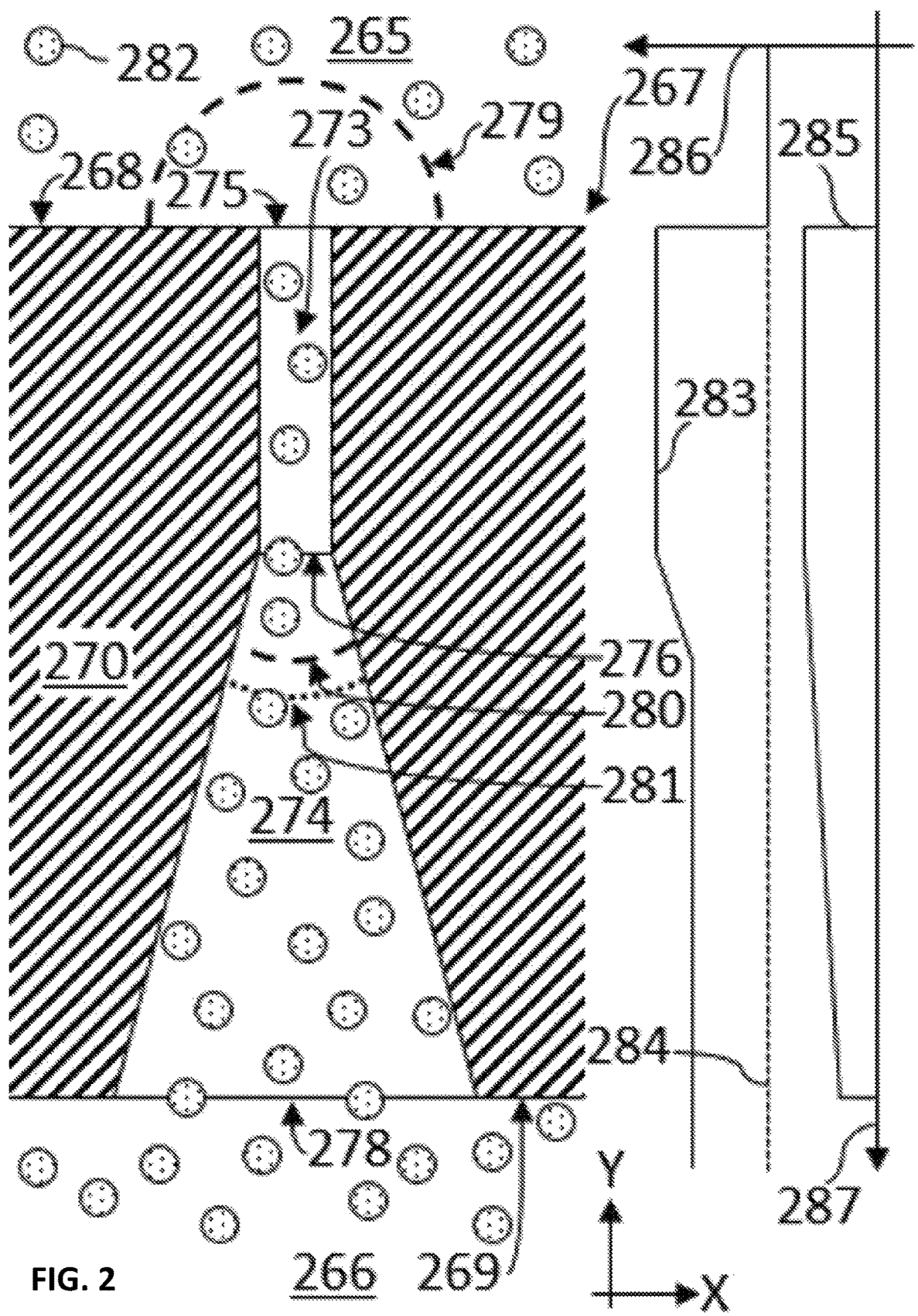
FIG. 2 is a cross-sectional view of another embodiment of the invention.

FIG. 2 is a cross-sectional view of another embodiment of the invention. Some features of the apparatus shown in FIG. 2, as well as some of the principles of operation of the apparatus share similarities with the apparatus shown in the other figures, and FIG. 1 in particular, and will therefore not be described in the same detail in the context of FIG. 2, and vice versa.

There is a first reservoir 265 and a second reservoir 266, in which the medium comprises OI which are schematically represented by individual particles, such as the schematic representation of OI 282.

In this example, the invention is embodied by a channel system 267, which comprises a first gradient segment 273 or a uniform segment 273 and a second gradient segment 274. OI are able to diffuse from the first reservoir 265 into the uniform segment 273 via the first opening 275, and from the uniform segment 273 into the second gradient segment 274 via the interior channel opening 276, and from the second gradient segment 274 into the second reservoir 266 via the second entrance 278. An OI is also able to diffuse from the second reservoir 266 into the first reservoir 265 through the channel system 267. Other embodiments need not comprise a uniform segment 273. In other words, the interior channel opening 276 need not be interior to the filtering apparatus, but can instead be identical to the first opening 275, i.e. form the interface between the second gradient segment 274 and the first reservoir 265.

An embodiment of the invention can comprise several channel systems, such as channel system 267. In some embodiments, the channel systems are located in close proximity to one another in the XZ-plane. For example, the second entrance 278 of one channel system can be adjacent to six other second entrances of six other channel systems. In this case, the second entrance 278 can have a hexagonal shape.

The channel system 267 is surrounded by bulk material 270, which comprises a first surface 268 and a second surface 269, both of which are planar, and parallel to the XZ-plane. Bulk material 270 can be made of any suitable material, such as metal, composite, such as fiberglass or carbon fiber, or ceramic.

In this embodiment, the cross-sectional geometry of channel system 267 is constant and circular when viewed along the Y-direction. In other embodiments, a channel can have any cross-section, such as square, rectangular, or polygonal cross-sections. In other embodiments, the cross-sectional geometry of channel system 267 need not be constant throughout the channel system. For instance, the cross-sectional geometry of the channel system 267 can change as a linear function of position along the Y-axis from a hexagonal shape at the second entrance 278 to a circular cross-section at the interior channel opening 276.

In the uniform segment 273, the size of the channel cross-sectional area is constant along the Y-direction.

For simplicity, the second gradient segment 274 in FIG. 2 is identical to the second gradient segment 249 in FIG. 1.

The embodiments and configurations of the second gradient segment 249 discussed in the context of FIG. 1 also apply to the second gradient segment 274.

In the embodiment shown in FIG. 2, the size of the cross-sectional area of the uniform segment 273 is identical to the size of the cross-sectional area of interior channel opening 250.

The third segment of the boundary surface of the first generic capture area of the first channel opening 275 in the first reservoir 265 is schematically represented by dashed line 279. The third segment of the boundary surface of the second generic capture area of the interior channel opening 276 in the second gradient segment 274 for the static boundary condition is schematically represented by dashed line 280. Since the channel opening is axially symmetric, the boundary surfaces of the generic capture areas are axially symmetric about an axis parallel to the Y-axis. The third segment of the boundary surface of the hypothetical generic capture area of the interior channel opening 276 in the second gradient segment 274 for the hypothetical case is schematically represented by dotted line 281. In the hypothetical case, the properties of the medium in the second reservoir 266 are considered to be identical to the properties of the medium in the first reservoir 265.

In the embodiment shown in FIG. 2, the aperture of the first generic capture area 279 is larger than the aperture of the first generic capture area 254 in FIG. 1. In FIG. 2, the first reservoir 265 can be considered to be equivalent to a first gradient segment, such as first gradient segment 247, for the scenario in which the first gradient is infinite in magnitude. The larger aperture of the first generic capture area 279 can lead to an improved aforementioned effectiveness of the apparatus compared to the apparatus shown in FIG. 1. This is indicated by a larger ratio of the density of OI in the second reservoir 266 to the density of OI in the first reservoir 265 for the apparatus shown in FIG. 2 compared to the apparatus shown in FIG. 1.

In the context of line 283, axis 286, which is parallel to the X-axis, schematically represents the average OI fraction, and axis 287, which is parallel to the Y-axis, denotes the position along the Y-direction at which said average OI fraction is measured. The average OI fraction is measured along the central axis of the channel system 267. Dashed line 284 shows the value of the average OI fraction in the first reservoir 265 for reference.

In the context of line 285, axis 286 denotes the average bulk fraction, and axis 287 denotes the position along the Y-direction at which said average bulk fraction is measured. As before, the average portion of space which is not occupied by the first reservoir 265, the second reservoir 266, the uniform segment 273, or the first gradient segment 273, where the first gradient is zero, or the second gradient segment 274 at a specified location along the Y-direction is denoted the "average bulk fraction".

Figure 3:
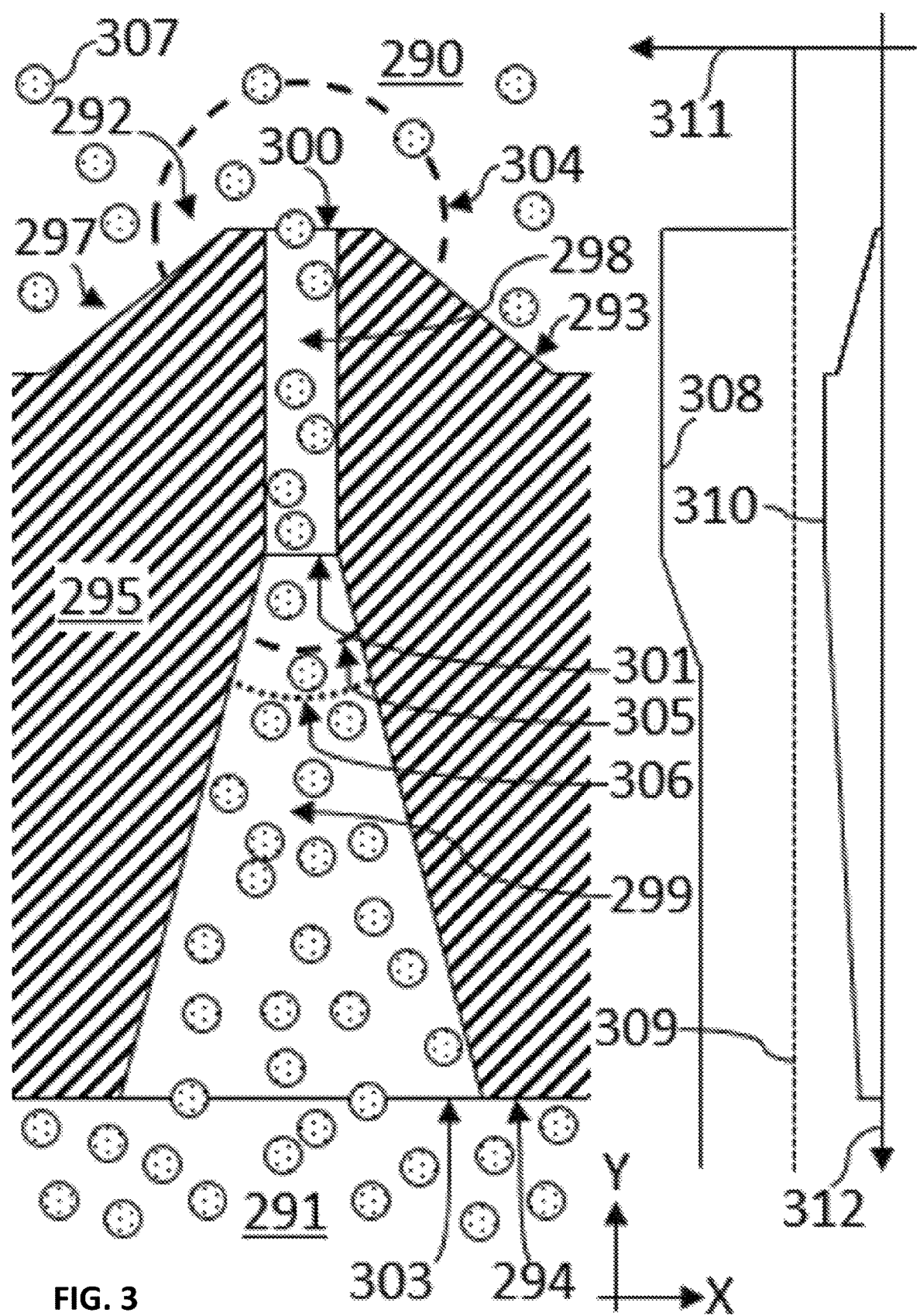
FIG. 3 is a cross-sectional view of another embodiment of the invention.

FIG. 3 is a cross-sectional view of another embodiment of the invention. Some features of the apparatus shown in FIG. 3, as well as some of the principles of operation of the apparatus share similarities with the apparatus shown in the other figures, and will therefore not be described in the same detail in the context of FIG. 3, and vice versa.

There is a first reservoir 290 and a second reservoir 291, in which the medium comprises OI which are schematically represented by individual particles, such as the schematic representation of OI 307.

In this example, the invention is embodied by a channel system 292, which comprises an inlet segment 297, a uniform segment 298 and a second gradient segment 299. OI are able to diffuse from the first reservoir 290 into the uniform segment 298 via the first channel opening 300, and from the uniform segment 298 into the second gradient segment 299 via the interior channel opening 301, and from the second gradient segment 299 into the second reservoir 291 via the second entrance 303. An OI is also able to diffuse from the second reservoir 291 into the first reservoir 290 through the channel system 292. Other embodiments need not comprise a uniform segment 298.

An embodiment of the invention can comprise several channel systems, such as channel system 292. In some embodiments, the channel systems are located in close proximity to one another in the XZ-plane. For example, the second entrance 303 of one channel system can be adjacent to six other second entrances of six other channel systems. In this case, the second entrance 303 can have a hexagonal shape.

The channel system 292 is surrounded by bulk material 295, which comprises a first surface 293 and a second surface 294. The second surface 294 is planar and parallel to the XZ-plane. The portion of a first surface 293 which is associated with an inlet segment, such as inlet segment 297, describes the surface of a cone, where the longitudinal axis of the cone is coincident with the central axis of uniform channel 298, and where outside normal of the surface of the cone has a radially outward component, where the outside direction is directed out of bulk material 295 and into the first reservoir 290. The remaining portion of first surface 293 is planar and parallel to the XZ-plane. Bulk material 295 can be made of any suitable material, such as metal, composite, or ceramic.

In this embodiment, the cross-sectional geometry of channel system 292 is constant and circular when viewed along the Y-direction. In other embodiments, a channel can have any cross-section, such as square, rectangular, or polygonal cross-sections. In other embodiments, the cross-sectional geometry of channel system 292 need not be constant throughout the channel system. For instance, the cross-sectional geometry of the channel system 292 can change as a linear function of position along the Y-axis from a hexagonal shape at the second entrance 303 to a circular cross-section at the interior channel opening 301. In FIG. 3, the cross-sectional geometry of the outside surface of the inlet segment 297 when viewed along the Y-direction is circular, since the outside surface of the inlet segment 297 describes a cone, i.e. the outside surface of a tapered cylinder, where the radius of the circular cross-sectional area of the cylinder viewed along the Y-direction decreases in the positive Y-direction in a linear fashion. As mentioned, the outside surface of the inlet segment 297 refers to the interface between bulk material 295 and the first reservoir 290. In other embodiments, the cross-sectional geometry of the outside surface of the inlet segment 297 when viewed along the Y-direction need not be circular. For instance, the cross-sectional geometry of the outside surface of the inlet segment 297 can change as a linear function of position along the Y-axis from a hexagonal shape at the base to a circular cross-section at the first channel opening 300.

In the uniform segment 298, the size of the channel cross-sectional area is constant along the Y-direction.

For simplicity, the second gradient segment 299 is identical to the second gradient segment 249. The embodiments and configurations of the second gradient segment 249 discussed in the context of FIG. 1 also apply to the second gradient segment 299.

In the embodiment shown in FIG. 3, the size of the cross-sectional area of the uniform segment 298 is identical to the size of the cross-sectional area of the interior channel opening 250 and the first channel opening 300.

In some embodiments, the extent of the inlet segment 297 along the Y-direction is at least as large as the extent of the first generic capture area 304 along a theoretically infinitely long inlet segment 297 along the Y-direction. In other embodiments, this need not be the case.

In the context of line 308, axis 311, which is parallel to the X-axis, denotes the average OI fraction, and axis 312, which is parallel to the Y-axis, denotes the position along the Y-direction at which said average OI fraction is measured. The average OI fraction is measured along the central axis of the cylindrical uniform segment 298. Dashed line 309 shows the value of the average OI fraction in the first reservoir 290 for reference.

In the context of line 310, axis 311 denotes the average bulk fraction, and axis 312 denotes the position along the Y-direction at which said average bulk fraction is measured. As before, the average portion of space which is not occupied by the first reservoir 290, the second reservoir 291, the uniform segment 298, or the second gradient segment 299 at a specified location along the Y-direction is denoted the "average bulk fraction".

The third segment of the boundary surface of the first generic capture area of the first channel opening 300 in the first reservoir 290 is schematically represented by dashed line 304. The third segment of the boundary surface of the second generic capture area of the interior channel opening 301 in the second gradient segment 299 for the static boundary condition is schematically represented by dashed line 305. Since the channel opening is axially symmetric, the boundary surfaces of the generic capture areas are axially symmetric about an axis parallel to the Y-axis. The third segment of the boundary surface of the hypothetical generic capture area of the interior channel opening 301 in the second gradient segment 299 for the hypothetical case is schematically represented by dotted line 306. In the hypothetical case, the properties of the medium in the second reservoir 291 are considered to be identical to the properties of the medium in the first reservoir 290.

In the embodiment shown in FIG. 3, the aperture of the first generic capture area 304 is larger than the aperture of the first generic capture area 254 in FIG. 1. In FIG. 3, the first reservoir 290 in the proximity of inlet segment 297 can be considered to be equivalent to a first gradient segment, such as first gradient segment 247, for the scenario in which the interior surface of the first gradient segment is the portion of a first surface 293 which is associated with inlet segment 297. The larger aperture of the first generic capture area 304 can lead to an improved aforementioned effectiveness of the apparatus compared to the apparatus shown in FIG. 1. This is indicated by a larger ratio of the density of OI in the second reservoir 291 to the density of OI in the first reservoir 290 for the apparatus shown in FIG. 3 compared to the apparatus shown in FIG. 1. Note that the effectiveness of the apparatus shown in FIG. 3 can be substantially the same as the effectiveness of the apparatus shown in FIG. 2 for a static boundary condition. For a dynamic boundary condition, the effectiveness of the apparatus shown in FIG. 3 can be larger than the effectiveness of the apparatus shown in FIG. 2.

Figure 4:
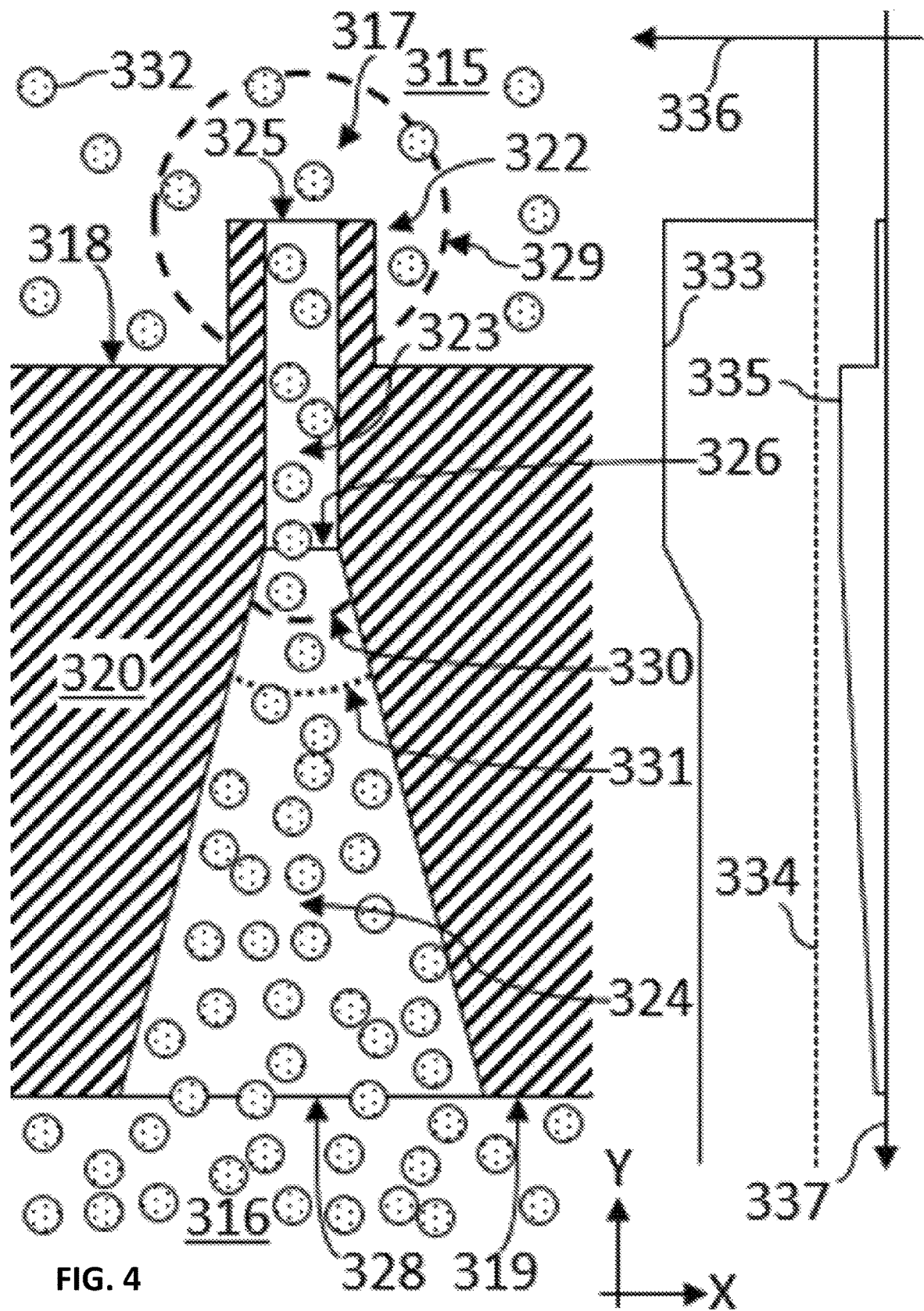
FIG. 4 is a cross-sectional view of another embodiment of the invention.

FIG. 4 is a cross-sectional view of another embodiment of the invention. Some features of the apparatus shown in FIG. 4, as well as some of the principles of operation of the apparatus share similarities with the apparatus shown in the other figures, and will therefore not be described in the same detail in the context of FIG. 4, and vice versa.

There is a first reservoir 315 and a second reservoir 316, in which the medium comprises OI which are schematically represented by individual particles, such as the schematic representation of OI 332.

In this example, the invention is embodied by a channel system 317, which comprises an inlet segment 322, a uniform segment 323 and a second gradient segment 324. OI are able to diffuse from the first reservoir 315 into the uniform segment 323 via the first channel opening 325, and from the uniform segment 323 into the second gradient segment 324 via the interior channel opening 326, and from the second gradient segment 324 into the second reservoir 316 via the second entrance 328. An OI is also able to diffuse from the second reservoir 316 into the first reservoir 315 through the channel system 317. Other embodiments need not comprise a uniform segment 323.

An embodiment of the invention can comprise several channel systems, such as channel system 317. In some embodiments, the channel systems are located in close proximity to one another in the XZ-plane. For example, the second entrance 328 of one channel system can be adjacent to six other second entrances of six other channel systems. In this case, the second entrance 328 can have a hexagonal shape.

The channel system 317 is surrounded by bulk material 320, which comprises a first surface 318 and a second surface 319. The second surface 319 is planar and parallel to the XZ-plane. The portion of a first surface 318 which is associated with an inlet segment, such as inlet segment 322, describes the surface of a cylinder, where the longitudinal axis of the cylinder is coincident with the central axis of uniform channel 323, and where outside normal of the surface of the cylinder has a radially outward component, where the outside direction is directed out of bulk material 320 and into the first reservoir 315. The remaining portion of first surface 318 is planar and parallel to the XZ-plane. Bulk material 320 can be made of any suitable material, such as metal, composite, or ceramic.

In this embodiment, the cross-sectional geometry of channel system 317 is constant and circular when viewed along the Y-direction. In other embodiments, a channel can have any cross-section, such as square, rectangular, or polygonal cross-sections. In other embodiments, the cross-sectional geometry of channel system 317 need not be constant throughout the channel system. For instance, the cross-sectional geometry of the channel system 317 can change as a linear function of position along the Y-axis from a hexagonal shape at the second entrance 328 to a circular cross-section at the interior channel opening 326. In FIG. 4, the cross-sectional geometry of the outside surface of the inlet segment 322 when viewed along the Y-direction is circular, since the outside surface of the inlet segment 322 describes a cylinder. In other embodiments, the cross-sectional geometry of the outside surface of the inlet segment 322 when viewed along the Y-direction need not be circular. For instance, the cross-sectional geometry of the outside surface of the inlet segment 322 can be square, rectangular, or polygonal.

In the uniform segment 323, the size of the channel cross-sectional area is constant along the Y-direction.

For simplicity, the second gradient segment 324 is identical to the second gradient segment 249. The embodiments and configurations of the second gradient segment 249 discussed in the context of FIG. 1 also apply to the second gradient segment 324.

In the embodiment shown in FIG. 4, the size of the cross-sectional area of the uniform segment 323 is identical to the size of the cross-sectional area of the interior channel opening 250 and the first channel opening 325.

In some embodiments, the extent of the inlet segment 322 along the Y-direction at least as large as the extent of the first generic capture area 329 along a theoretically infinitely long inlet segment 322 along the Y-direction. In other embodiments, this need not be the case.

In the context of line 333, axis 336, which is parallel to the X-axis, denotes the average OI fraction, and axis 337, which is parallel to the Y-axis, denotes the position along the Y-direction at which said average OI fraction is measured. The average OI fraction is measured along the central axis of the cylindrical uniform segment 323. Dashed line 334 shows the value of the average OI fraction in the first reservoir 315 for reference.

In the context of line 335, axis 336 denotes the average bulk fraction, and axis 337 denotes the position along the Y-direction at which said average bulk fraction is measured. As before, the average portion of space which is not occupied by the first reservoir 315, the second reservoir 316, the uniform segment 323, or the second gradient segment 324 at a specified location along the Y-direction is denoted the "average bulk fraction".

The third segment of the boundary surface of the first generic capture area of the first channel opening 325 in the first reservoir 315 is schematically represented by dashed line 329. The third segment of the boundary surface of the second generic capture area of the interior channel opening 326 in the second gradient segment 324 for the static boundary condition is schematically represented by dashed line 330. Since the channel opening is axially symmetric, the boundary surfaces of the generic capture areas are axially symmetric about an axis parallel to the Y-axis. The third segment of the boundary surface of the hypothetical generic capture area of the interior channel opening 326 in the second gradient segment 324 for the hypothetical case is schematically represented by dotted line 331. In the hypothetical case, the properties of the medium in the second reservoir 316 are considered to be identical to the properties of the medium in the first reservoir 315.

In the embodiment shown in FIG. 4, the aperture of the first generic capture area 329 is larger than the aperture of the first generic capture area 254 in FIG. 1. In FIG. 4, the first reservoir 315 in the proximity of inlet segment 322 can be considered to be equivalent to a first gradient segment, such as first gradient segment 247, for the scenario in which the interior surface of the first gradient segment is the portion of a first surface 318 which is associated with inlet segment 322. The larger aperture of the first generic capture area 329 can lead to an improved aforementioned effectiveness of the apparatus compared to the apparatus shown in FIG. 1. This is indicated by a larger ratio of the density of OI in the second reservoir 316 to the density of OI in the first reservoir 315 for the apparatus shown in FIG. 4 compared to the apparatus shown in FIG. 1.

Note that the effectiveness of the apparatus shown in FIG. 4 can be substantially the same as the effectiveness of the apparatus shown in FIG. 2 and FIG. 3 for a static boundary condition. For a dynamic boundary condition, the effectiveness of the apparatus shown in FIG. 4 can be larger than the effectiveness of the apparatus shown in FIG. 2.

Figure 5:
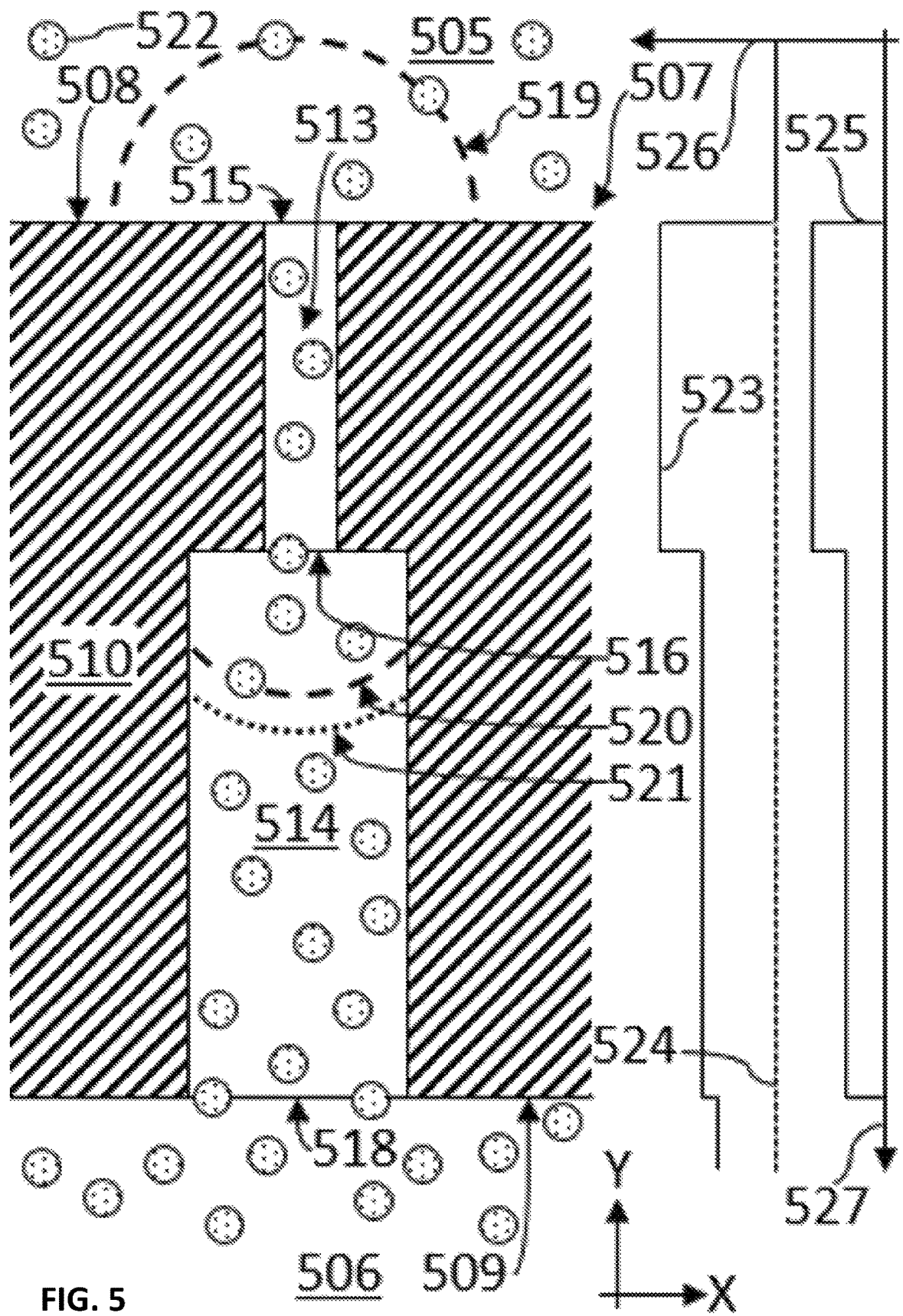
FIG. 5 is a cross-sectional view of another embodiment of the invention.

FIG. 5 is a cross-sectional view of another embodiment of the invention. Some features of the apparatus shown in FIG. 5, as well as some of the principles of operation of the apparatus share similarities with the apparatus shown in the other figures, and will therefore not be described in the same detail in the context of FIG. 5, and vice versa.

There is a first reservoir 505 and a second reservoir 506, in which the medium comprises OI which are schematically represented by individual particles, such as the schematic representation of OI 522.

In this example, the invention is embodied by a channel system 507, which comprises a first segment 513 and a second segment 514. OI are able to diffuse from the first reservoir 505 into the first segment 513 via the first opening 515, and from the first segment 513 into the second segment 514 via the interior channel opening 516, and from the second segment 514 into the second reservoir 506 via the second entrance 518. An OI is also able to diffuse from the second reservoir 506 into the first reservoir 505 through the channel system 507. In the first segment 513 and the second segment 514 the size of the channel cross-sectional area is constant along the Y-direction.

An embodiment of the invention may comprise several channel systems, such as channel system 507. In some embodiments, the channel systems are located in close proximity to one another in the XZ-plane. For example, the second entrance 518 of one channel system may be adjacent to six other second entrances of six other channel systems. In this case, the second entrance 518 may have a hexagonal shape.

The channel system 507 is surrounded by bulk material 510, which comprises a first surface 508 and a second surface 509, both of which are planar, and parallel to the XZ-plane. Bulk material 510 may be made of any suitable material, such as metal, composite, or ceramic.

In this embodiment, the cross-sectional geometry of channel system 507 is constant and circular when viewed along the Y-direction. In other embodiments, a channel may have any cross-section, such as square, rectangular, or polygonal cross-sections. In other embodiments, the cross-sectional geometry of channel system 507 need not be constant throughout the channel system. For instance, the cross-sectional geometry of the channel system 507 may change as a linear function of position along the Y-axis from a hexagonal shape at the second entrance 518 to a circular cross-section at the interior channel opening 516.

In the context of line 523, axis 526, which is parallel to the X-axis, denotes the average OI fraction, and axis 527, which is parallel to the Y-axis, denotes the position along the Y-direction at which said average OI fraction is measured. The average OI fraction is measured along the central axis of the cylindrical first segment 513. Dashed line 524 shows the value of the average OI fraction in the first reservoir 505 for reference.

In the context of line 525, axis 526 denotes the average bulk fraction, and axis 527 denotes the position along the Y-direction at which said average bulk fraction is measured. As before, the average portion of space which is not occupied by the first reservoir 505, the second reservoir 506, the first segment 513, or the second segment 514 at a specified location along the Y-direction is denoted the "average bulk fraction".

The third segment of the boundary surface of the first region of influence of the first channel opening 515 in the first reservoir 505 is schematically represented by dashed line 519. The third segment of the boundary surface of the second region of influence of the interior channel opening 516 in the second segment 514 for the static boundary condition is schematically represented by dashed line 520. Since the channel opening is axially symmetric, the boundary surfaces of the regions of influence are axially symmetric about an axis parallel to the Y-axis. The third segment of the boundary surface of the hypothetical region of influence of the interior channel opening 516 in the second segment 514 for the hypothetical case is schematically represented by dotted line 521. As mentioned, in the hypothetical case, the properties of the medium in the second reservoir 506 are considered to be identical to the properties of the medium in the first reservoir 505.

Note that the characteristic width of second segment 514 is less than the diameter of the third segment of the boundary surface of the second region of influence 520.

FIG. 6 is a cross-sectional view of another embodiment of the invention. Some features of the apparatus shown in FIG. 6, as well as some of the principles of operation of the apparatus share similarities with the apparatus shown in the other figures, and will therefore not be described in the same detail in the context of FIG. 6, and vice versa.

There is a first reservoir 150 and a second reservoir 151, in which the medium comprises OI which are schematically represented by individual particles, such as the schematic representation of OI 175.

In this example, the invention is embodied by a first filtering apparatus 153, a second filtering apparatus 160. Other embodiments of the invention may only comprise a second filtering apparatus of the same or similar configuration shown in FIG. 6.

The first filtering apparatus 153 has a first surface 154 and a second surface 155, both of which are planar, and parallel to the XZ-plane. In this embodiment, several identical channels, such as channel 157, allow OI from the first reservoir 150 to pass through bulk material 156 to the interior region 152, and vice versa.

Bulk material 156 may be made of any material, such as metal, composite, or ceramic. In some embodiments, bulk material 156 may also be described as a fabric. Bulk material 156 may comprise graphene in some embodiments.

Each channel has a first opening, such as first opening 158, and a second opening, such as second opening 159. The cross-section of channel 157 is constant, and circular when viewed along the positive Y-direction. In other embodiments, a channel may have any cross-section, such as square, rectangular, or polygonal cross-sections. In general, the principles underlying the configuration of channel 157 are similar to the principles underlying the configuration of interior channel opening 250. In some embodiments, the channel width is constant in time. In other embodiments, this need not be the case. For instance, the width of a channel may be regulated to control the rate of diffusion of OI through the first filtering apparatus 153. The width of a channel can take any suitable value at any instant in time, where suitability depends on the particular application, and can be determined using methods known in the art.

The second filtering apparatus 160 comprises several layers, such as a first layer 161 and second layer 168. Each layer comprises several cylindrical tubes arranged parallel to the Z-axis, such as cylindrical tube 163, cylindrical tube 165, cylindrical tube 170, or cylindrical tube 172. These are uniformly spaced in the X-direction, and are supported by cylindrical tubes arranged parallel to the X-axis, such as cylindrical tube 167 or cylindrical tube 174. These tubes are uniformly spaced in the Z-direction, and are rigidly connected to the tubes parallel to the Z-axis. In other embodiments, perpendicular tubes need not be rigidly connected, but may be overlapping like fibers in a fabric. In this embodiment, the spacing between the tubes parallel to the X-axis in the XZ-plane is equal to the spacing of the tubes parallel to the Z-axis for a given layer. Thus, the cross-sectional area of the gap or the channel between tubes parallel to the X-axis and tubes parallel to the Z-axis, such as channel 166 between tubes 163, 165, 167, and a fourth tube above the plane of the page, is square in shape when viewed along the Y-axis. In other embodiments, the channel can have any cross-sectional geometry, such as circular, rectangular, or polygonal. The spacing between the tubes of a specified layer can therefore be described in terms of a single parameter, denoted the "channel width", which is equal to the distance of separation between the centroid of tubes of the same layer parallel to the Z-axis. In this embodiment, the distance of separation between layers in the Y-direction is uniform for all layers. In other embodiments, this need not be the case. For example, the longitudinal separation may increase in the negative Y-direction in concurrence with an increase in channel width of each layer in the negative Y-direction.

The distance of separation between layers, as well as the structural support of said layers is provided by a longitudinal support structure, which is not shown in FIG. 6. The longitudinal support structure may comprise tubes rigidly connected to each layer and parallel to the Y-axis. In some embodiments, the longitudinal tubes connect to a layer at a location where tubes parallel to the X-axis and tubes parallel to the Z-axis connect. In other embodiments, the longitudinal support structure may not be rigidly connected to individual layers, but may be woven between layers like fibers in a fabric.

Other embodiments of the invention may comprise wide variety of other configurations of the second filtering apparatus 160. Note that for some embodiments, there is no distinguishable first and second filtering apparatus. In this case, the invention can be considered to consist of a single filtering apparatus, where the single filtering apparatus is configured in a similar manner as second filtering apparatus 160 in FIG. 6.

In FIG. 6, the bulk material of the second filtering apparatus 160, such as bulk material 162 of layer 161 or bulk material 169 of layer 168, is of the same material as bulk material 156. The bulk material of each layer in the second filtering apparatus 160 may also be identical. In other embodiments, the bulk material of the second filtering apparatus 160 may be different than bulk material 156. The aforementioned circular tubes, such as tube 163, may consist of a polymer, i.e. a single chain of monomer molecules. In other embodiments, the circular tubes may represent a chain of single molecules, such that the diameter of a circular tube is equal to the diameter of a single molecule. In other embodiments, the circular tubes may be carbon nanotubes. The bulk material of second filtering apparatus need not form tubes, but may take any form. For instance, the bulk material may comprise individual particles, or collections of particles. For example, consider the case in which the OI are electrons, and the first and second reservoir are conductors. In this case, the bulk material of first filtering apparatus may be an electrical insulator, such as a ceramic, or a glass, and a channel, such as channel 157, or channel 166, or channel 173, may comprise conducting material. Any medium which is not a bulk material in FIG. 6 can be configured to conduct electrons in this case. The width of channel 157 may be the width of one atom of a conducting material, or it may be the width of a collection of atoms. The bulk material of second filtering apparatus may in this case consist of single atoms of an insulating material which are embedded in a lattice of conducting material, which forms the interstitial space of interior region 152. In other words, the conducting material forms part of the medium through which the free electrons, i.e. the OI, are able to travel or diffuse. In general, the bulk material of the first or second filtering apparatus is configured to reflect free or mobile electrons back into the surrounding conducting material. Such a second filtering apparatus can be manufactured using methods known in the art of doping semi-conductors. Note that the second filtering apparatus may be manufactured by doping a conductor with atoms of an insulator, or doping an insulator with atoms of a conductor, or by doping an insulator, conductor, or semiconductor with a suitable type of semi-conductor, amongst several other configurations. The doping process can be configured to generate a desired spatial density distribution of bulk material within the interior region 152. For instance, the portion of space occupied by bulk material may decrease gradually in the negative Y-direction, and decrease more abruptly, or less gradually, in the positive Y-direction. In the case in which the OI are real or virtual photons, the bulk material may be a metal with a high coefficient of reflectivity for the specified type of photons of interest, while the medium surrounding the bulk material is configured to allow the OI to diffuse throughout the medium.

The second filtering apparatus 160 comprises a uniform segment and a gradient segment. The uniform segment is characterized by a uniform longitudinal spacing, i.e. the spacing in the direction parallel to the Y-axis, between adjacent layers as well as a uniform channel width for all channels within a layer and all layers within the uniform segment. In the context of line 178, axis 179 denotes the average portion of space occupied by the bulk material of the embodiment of the invention, denoted the "average bulk fraction", and axis 180 corresponds to the location along the Y-axis at which the quantity expressed by line 178 is measured. The aforementioned bulk material may any bulk material, such as bulk material 156 of the first filtering apparatus 153 or the bulk material of the second filtering apparatus 160. For smoothness, the average is computed over the length of several layers of second filtering apparatus 160. The aforementioned average portion of space can be interpreted to be the number of atoms of a bulk material of the first or second filtering apparatus per unit area which are intersecting a plane parallel to the XZ-plane, where the location of said plane corresponds to the axis of the graph parallel to the Y-axis, and where the area is the area of said plane. For simplicity, the extent of the depicted apparatus can be assumed to be infinite in the XZ-plane. Since in this embodiment the layers of second filtering apparatus 160 are uniformly spaced in the Y-direction, a part of line 178 may also be interpreted to represent the average number of tubes, such as tube 163, per unit area in the XZ-plane at the specified location along the Y-axis. The extent of the uniform segment of the second filtering apparatus 160 is evident in the uniform segment of line 178 within the range of positions along the Y-axis corresponding to the extent of the second filtering apparatus 160. This uniform segment is located in the proximity of label 162. In the uniform segment, the average portion of space occupied by bulk material is constant along the X-, Y-, and Z-directions. In the uniform segment, the average bulk fraction is constant along the Y-direction. In general, the principles underlying the configuration of channel 157 or a channel in the uniform segment, such as channel 166, are similar to the principles underlying the configuration of interior channel opening 250.

In the uniform segment of the embodiment shown in FIG. 6, the distance of separation between adjacent tubes of the bulk material is substantially equal to the mean free path of OI in the interior region 152, where the distance of separation may refer to the separation in the X-direction or Z-direction, i.e. the channel width, or the separation of tubes in the Y-direction, i.e. longitudinal spacing. The mean free path denotes the average distance travelled by an OI between collisions with other OI or collisions with the bulk material 156 of the first filtering apparatus 153, or the bulk material of the second filtering apparatus 160. When the distance of separation between elements of the bulk apparatus, such as tube 163 and tube 165, is substantially equal to the mean free path of OI, the majority of collisions of OI are with the bulk material as opposed to other OI. In other embodiments, only a fraction of collisions of OI may be between OI and the bulk material of the first or second filtering apparatus in the uniform segment. Note that the mean free path of OI inside the interior region 152 is smaller than the mean free path of OI inside a theoretically infinitely large first reservoir 150 for a static boundary condition. Note that a uniform segment can be infinitesimally small along the Y-direction for other embodiments, i.e. the other embodiments may comprise at least a gradient segment.

The entire space occupied by the first filtering apparatus 153 consists of any volume containing bulk material 156, as well as the sum of the cylindrical volumes associated with the cylindrical channels, such as channel 157. The entire space occupied by the first filtering apparatus 153 can be considered to be the volume between the plane parallel to the XZ-plane and coincident with the first surface 154, and the plane parallel to the XZ-plane and coincident with the second surface 155. The portion of space occupied by bulk material 156 is the ratio of the volume of bulk material 156 to the volume of the entire space occupied by first filtering apparatus 153. The portion of space occupied by bulk material 156 is larger than the portion of space occupied by the bulk material of the uniform segment of the second filtering apparatus 160, in this embodiment. This difference in the value of the aforementioned portions of space is manifested by the discontinuity in line 178 at the interface between the uniform segment of the second filtering apparatus 160 and the first filtering apparatus 153. In other embodiments of the invention, the value of these two portions is identical, and no such discontinuity occurs. In some embodiments, the first filtering apparatus 153 can be considered to be part of the uniform segment of the second filtering apparatus 160.

The gradient segment is the segment of the second filtering apparatus 160 which cannot be described as the uniform segment of the second filtering apparatus 160 shown in FIG. 6. In this embodiment, the gradient segment is characterized by a gradually increasing channel width for a given layer, such as layer 168. For example, the width of channel 173 is greater than the width of channel 166. As a result, the portion of space occupied by the bulk material of second filtering apparatus 160 decreases in the negative Y-direction in the gradient segment of the second filtering apparatus 160. This decrease is illustrated by line 178. The gradual increase of the channel width refers to an increase which occurs over a distance which is non-zero, i.e. the increase is not a step-function of position along the Y-axis. In the embodiment shown, the increase in channel width occurs over a distance along the Y-axis equal to several mean free paths of OI in the interior region 152. The reduction in the average bulk fraction is a linear function of position along the negative Y-direction, in this case. In other embodiments, the average bulk fraction may decrease at an increasing rate in the negative Y-direction. In other embodiments, the average bulk fraction may decrease at decreasing rate in the negative Y-direction.

In accordance with some embodiments of the invention, the longitudinal spacing between layers in the Y-direction is such that the region of influence of a channel of any layer, such as channel 166 of layer 161, overlaps with the region of influence of at least the closest channel of an adjacent layer. This is the case for both the uniform segment and the gradient segment. The fraction of a specified first region of influence that overlaps with a specified second region of influence is denoted the "overlap fraction". The overlap fraction of the region of influence of a channel of a first layer and the closest channel of an adjacent second layer is non-zero for the interior region 152. Note that the overlap of the regions of influence of the channels of adjacent layers within second filtering apparatus 160 occurs in the Y-direction. In general, the overlap can occur in any direction.

The principle of operation of the embodiment shown in FIG. 6 can be described in several ways. The embodiment shown in FIG. 6 can be considered to be similar to the embodiment shown in FIG. 2. The gradual increase in the width of a channel, such as channel 173, or the gradual decrease in the average portion of space occupied by bulk material, such as bulk material 169, throughout the gradient segment of interior region 152 in the negative Y-direction is analogous to the gradually increasing cross-sectional area of the channel in the second gradient segment 274 in the negative Y-direction. A channel, such as channel 166, in the uniform segment of the second filtering apparatus 160 can be conceptually combined with an adjacent channel of an adjacent layer and thus be considered to form a funnel with an approximately constant cross-sectional area when viewed along the Y-direction, analogous to the uniform segment 273 in FIG. 2. A channel, such as channel 173, in the gradient segment of the second filtering apparatus 160 can be conceptually combined with an adjacent channel of an adjacent layer and thus be considered to form a funnel with a cross-sectional area which increases gradually in the negative Y-direction, analogous to the gradient segment 274 in FIG. 2. Thus the principles of operation of the embodiment shown in FIG. 6 are similar to those discussed in the context of FIGS. 1-5 in the case in which the interior walls of the channels are diffusely reflective.

In the context of line 176, axis 179, which is parallel to the X-axis, denotes the average fraction of free space which is occupied by OI, also referred to as the "average OI fraction", and axis 180, which is parallel to the Y-axis denotes the position along the Y-direction at which said average OI fraction is measured. In this context, "free space" refers to space which is not occupied by any bulk material, such as bulk material 156, 162, or 169. Note that this space need not be free in the literal sense, as would be the case in which the medium also comprises other objects, such as the nuclei and bound electrons contained within conductors. Dashed line 177 shows the value of the average OI fraction in the first reservoir 150 for reference. In other embodiments, the change in the average OI fraction throughout the gradient segment of the second filtering apparatus 160 need not be a linear function of position along the Y-direction. The average OI fraction can change at an increasing rate or at a decreasing rate along the negative Y-direction.

In several embodiments, the interaction between individual OI shares common features with the interaction between an OI and the bulk material of the embodiment. In the embodiment shown in FIG. 6, the interaction between individual OIs and the interaction between an OI and the bulk material can be characterized as a perfectly elastic collision which occurs in a negligibly short time period.

In this case, the extent of a gradient segment along the Y-axis is on the order of, or within several orders of magnitude of, the mean free path of an OI in the second reservoir 151. In the case in which OI are virtual particles, such as virtual photons, the mean free path is described by the Compton wavelength, which is very small due to the short period of time in which the virtual photons exist. The duration of existence of a virtual photon, or other virtual particle, can be considered to be the mean free time of the particle, i.e. the average time between the collision between the particle and another particle. The annihilation of a virtual particle can be considered to be a scattering event. The size and the geometry of the embodiments of the invention can be adapted to the particular properties of the medium and the OI.

In the static boundary condition, the rate of diffusion of OI from the first reservoir 150 into the interior region 152 is equal to the rate of diffusion of OI from the interior region 152 into the first reservoir 150. The rate of diffusion of OI from the second reservoir 151 into the interior region 152 is equal to the rate of diffusion of OI from the interior region 152 into the second reservoir 151. The rate of diffusion of OI from the first reservoir 150 into the uniform segment of second filtering apparatus 160 is equal to the rate of diffusion of OI from the uniform segment into the first reservoir 150. The rate of diffusion of OI from the gradient segment of the second filtering apparatus 160 into the uniform segment of second filtering apparatus 160 is equal to the rate of diffusion of OI from the uniform segment into the gradient segment.

Interior region 152 can be considered to comprise OI as well as conceptual filtered objects, or "CFOs", which are conceptually similar to the FOs in interior region 202 shown in FIG. 7, where the CFOs consist of the bulk material of second filtering apparatus 160.

In some embodiments, the width of a channel, such as channel 166, is on the order of the collision diameter of an OI. In some embodiments, the width of a channel is several orders of magnitude larger than a collision diameter of an OI.

In the context of the simplified embodiments shown in the figures, one can define an interaction between an OI and the depicted apparatus or embodiment to commence when an OI passes through, intersects, or comes into contact with, a first boundary surface or a second boundary surface. In some embodiments, the first boundary surface can be a plane containing a first surface, such as first surface 204 or 243, and the second boundary surface can be a plane containing a second surface, such as second surface 244, where the planes are parallel to the XZ-plane, where the planes bracket an embodiment of the invention. In these and other embodiments, one can alternatively define the first boundary surface as the aperture of a first region of influence in a first reservoir, and the second boundary surface to be the aperture of a second region of influence in a second reservoir, where the surfaces can in general have a three-dimensional shape. An interaction can be defined to end when an OI no longer intersects or is in contact with the aforementioned first or second boundary surfaces. Said "contact" can in this case be defined as the existence of a non-negligible force between an object of the medium and an object of the apparatus, such as an object of bulk material 270.

One can define "input properties of interest" and "output properties of interest" as the properties of interest of a specified class of objects immediately before and immediately after interacting in a non-negligible manner with an embodiment of the invention, respectively. A property of interest may be the location of an object in either a first reservoir, such as first reservoir 240, or a second reservoir, such as second reservoir 241. The interaction of an object of interest with the apparatus of the invention can be described in terms of the difference between the input and output properties of interest. For example, one type of interaction can be described as a transmission from the one reservoir to another reservoir, while another type of interaction may be described as a reflection back into the reservoir the object was located in before the interaction began. In the context of a transmission or reflection, the type of interaction is described by the magnitude of the difference between the output properties of interest and the input properties of interest. In accordance with some embodiments of the invention, the type of interaction is a function of the "defining properties" of an object. The set of defining properties of the objects of interest may comprise the properties which distinguish the object of interest from other objects of the surrounding medium. In the embodiments shown in the figures, the set of defining properties of an object also includes the input property of interest, i.e. the location of an object in either a first reservoir or a second reservoir immediately before interacting in a non-negligible manner with an embodiment of the invention. Throughout an interaction, an apparatus configured and operated in accordance with some embodiments of the invention will distinguish between or filter objects based on the value of the defining property of an object. In other words, the expected type of interaction between a specified class of objects with at least one specified defining property and an embodiment of the invention is not equal to the expected the type of interaction of objects of the same specified class but different specified defining property. The expected value is the statistical expectation calculated for all objects contained within at least one specified class of objects which interact with an embodiment of the invention in a sufficiently long duration of time to provide a sufficiently accurate result. By default, a class of objects comprises all objects which interact with a specified apparatus.

For example, consider a dynamic boundary condition, in which a second OI is located in a second reservoir immediately before interacting with an embodiment of the invention. The input property of interest as well as the defining property of the second OI is the fact, that the OI is located in the second reservoir initially. Consider a first OI which is located in a first reservoir immediately before interacting with an embodiment of the invention. The first and second reservoirs are separated by an embodiment of the invention. The input property of interest as well as the defining property of the first OI is the fact, that the OI is located in the first reservoir initially. The output property of interest is the location of the OI after having interacted with the embodiment of the invention. The interaction of an OI with the embodiment of the invention can be one of two types: a transmission or a reflection. When the output property of interest is different to the input property of interest, an OI is said to have been transmitted. When the output property of interest is equal to the input property of interest, an OI is said to have been reflected. The embodiment of the invention is configured in a manner in which the expected value of the type of the interaction is a function of the defining property of the OI, i.e. the initial location of an OI. In accordance with some embodiments of the invention, the probability of the second OI being transmitted is smaller than the probability of the first OI being transmitted for the dynamic boundary condition. Thus an embodiment of the invention can be considered to filter OI based on the defining property of the OI.

FIG. 7 is a cross-sectional view of another embodiment of the invention. Some features of the apparatus shown in FIG. 7, as well as some of the principles of operation of the apparatus share similarities with the apparatus shown in the other figures, and will therefore not be described in the same detail in the context of FIG. 7, and vice versa.

There is a first reservoir 200 and a second reservoir 201, in which the medium comprises OI which are schematically represented by individual particles, such as the schematic representation of OI 226.

In this example, the invention is embodied by a first filtering apparatus 203, a second filtering apparatus 211, and an interior region 202 comprising filtered objects, or "FOs", such as filtered object 227. Interior region 202 also comprises OI.

The FOs are unable to pass through the first filtering apparatus 203. Bulk material 206 is perfectly reflective to FOs and OI. In other embodiments, bulk material 206 may transmit or absorb a fraction of OI or FOs which come into contact with bulk material 206. The FOs also carry a net electric charge in this embodiment. Several charge collections, such as charge collection 210, are embedded in bulk material 206, where the charge collections carry the same charge as the FOs, resulting in a repulsion of FOs by the charge collections. The geometric shape, position, and strength of the charge collections are configured to prevent FOs from successfully passing from the interior region 202 through a channel, such as channel 207, into the first reservoir 200.

In the case in which an OI is a molecule an FO may be a positively or negatively ionized version of an OI molecule, where the magnitude of the charge may take any practical value. An FO may also be a molecule different to an OI molecule. An FO may also be a collection of molecules, such as a dust particle. In the case in which an OI carries electric charge, an FO may be configured to, on average, carry more or less electric charge than an OI. The first filtering apparatus 203 and any charge collections associated with it may in this case be configured to filter OI from FO based on the average difference in charge between an OI and FO. For example, an OI may on average carry a net negative charge equal to the charge of one electron, and an FO may be configured to on average carry a net charge equal to two or three charges of an electron. The charge collections associated with the first filtering apparatus 203 may then be negatively charged, and their geometry, size, and amount of charge may be configured to ensure that the probability of an FO which interacts with the first filtering apparatus 203 in the interior region 202 diffusing from the interior region 202 into the first reservoir 200 is lower than the probability of an OI which interacts with the first filtering apparatus 203 in the interior region 202 diffusing from the interior region 202 into the first reservoir 200 for the static boundary condition. For a given collection of charge associated with the first filtering apparatus 203, an FO with a larger net charge of the same sign will experience a larger repulsive force than an OI with a smaller net charge of the same sign. The larger repulsive force may be used to repel or filter a larger portion of FOs compared to the portion of OI that are repelled, which accomplishes the intended filtering effect. In general, the first filtering apparatus 203 is configured to be less conductive to FO than it is to OI. The transmission coefficient for FO incident on the first filtering apparatus 203 is lower than the transmission coefficient for OI incident on the first filtering apparatus 203.

In other embodiments, other features or properties of FOs may be used in order to prevent their passage through a filtering apparatus. For example, the FOs may be more readily polarizable than OI, i.e. their coefficient of polarizability may be larger. A charge collection may in this case be configured to more strongly deflect FOs entering a channel than OI, where a portion of OI and a larger portion of FOs may subsequently be reflected back into the interior region 202. Such methods are known in the art.

Note that the principles which apply to an electric dipole can also be employed in scenarios involving permanent or temporary magnetic dipoles, and vice versa.

The first filtering apparatus 203 has a first surface 204 and a second surface 205, both of which are planar, and parallel to the XZ-plane. In this embodiment, several identical channels, such as channel 207, allow OI from the first reservoir 200 to pass through bulk material 206 to the interior region 202, and vice versa.

Bulk material 206 may be made of any material, such as metal, composite, or ceramic. In some embodiments, bulk material 206 may also be described as a fabric. Bulk material 206 may comprise graphene in some embodiments.

Each channel has a first opening, such as first opening 208, and a second opening, such as second opening 209. The cross-section of channel 207 is constant, and circular when viewed along the positive Y-direction. In other embodiments, a channel may have any cross-section, such as square, rectangular, or polygonal cross-sections.

The width of a channel, such as channel 207, is slightly larger than the collision diameter of an OI in FIG. 7. In other embodiments, the channel width may be less than two times the collision diameter of an OI. In other embodiments, the channel width may be less than ten times the collision diameter of an OI. In general, the principles underlying the configuration of channel 207 are similar to the principles underlying the configuration of interior channel opening 250. In some embodiments, the channel width is constant in time. In other embodiments, this need not be the case. For instance, the width of a channel may be regulated to control the rate of diffusion of OI through the first filtering apparatus 203. The width of a channel can take any suitable value at any instant in time, where suitability depends on the particular application, and can be determined using methods known in the art.

A collection of charge refers to an insulated arrangement of charged material within bulk material 206. Each collection of charge shown in FIG. 7 is annular in shape with a rectangular cross-section as shown, where annular or ring shape is configured to enclose or encompass the channel associated with the collection of charge. In the case in which the channels are relatively close together, such as the embodiment shown in FIG. 7, the aforementioned rings containing the collections of charge around a channel may overlap, such that the apparatus containing the collection of charge forms a hexagonal cross-section when viewed along the Y-direction. In order to ensure a uniform distribution of charge within a charge collection, portions of a charge collection may be electrically insulated from one another. For instance, a collection of charge may not form a uniform ring, but a series of separate point charges or a series of smaller, distinct collections of charge located in the proximity of a channel.

A collection of charge may comprise an insulated conductor such as a metal to which an electric potential has been applied, such that the number of electrons contained within the collection of charge have been increased or decreased compared to the nominal, neutral configuration. In other embodiments, a collection of charge may comprise at least one charged particle embedded within bulk material 206. For example, bulk material 206 may be a semiconductor, and a charged particle may be embedded within the semiconductor by doping the semiconductor with an atom or molecule of a different number of electrons in the outer shell and subsequently ionizing said atom or molecule. Such methods are well known in the art.

In the case in which bulk material 206 is a conductor such as a metal, the collection of charge is insulated from the conducting material by an insulator. The electrical insulation may be facilitated by an appropriate choice of electrically insulating material such as glass. Note that in this case the distribution of the electric field in the channel is also a function of the electric response of the conducting bulk material to the presence of the collection of charge.

In this embodiment, the field associated with a collection of charge is constant in time. In other embodiments the field may be modified over time. This could be accomplished by changing the electric potential of the apparatus which collects and contains the charge. The regulation of the electric field of a collection of charge may be employed to control the filtering properties of the first filtering apparatus 203. To that end, a charge collection may be electrically connected to a voltage regulation apparatus.

The second filtering apparatus 211 may comprise several stages or layers, such as a first layer 212 and second layer 219. In other embodiments, a second filtering apparatus 211 may comprise more than two such layers. In other embodiments, a second filtering apparatus 211 may only comprise one layer. Each layer comprises several cylindrical tubes arranged parallel to the Z-axis, such as cylindrical tube 213, cylindrical tube 218, cylindrical tube 220, or cylindrical tube 225. These are uniformly spaced in the X-direction. The support apparatus for these tubes is not shown, but is configured to rigidly connect the tubes to each other, and to the remaining apparatus associated with the embodiment of the invention, or to an external apparatus.

In FIG. 7, the bulk material of the second filtering apparatus 211, such as bulk material 214 of layer 212 or bulk material 211 of layer 219, is of the same material as bulk material 206. In other embodiments, the bulk material of the second filtering apparatus 211 may be different than bulk material 206. The bulk material of each layer in the second filtering apparatus 211 may also not be identical. Similarly to bulk material 206, the bulk material of the second filtering apparatus 211 may be made of any material, such as metal, composite, or ceramic.

Each cylindrical tube in layer 212 contains a collection of charge, such as collection of charge 215 of cylindrical tube 213, or collection of charge 222 of cylindrical tube 220. Each collection of charge is embedded in bulk material, such as bulk material 214 or bulk material 221. As before, each collection of charge refers to an insulated arrangement of charged material within the bulk material.

The principles underlying the embedding of charge collections within the second filtering apparatus 211 also apply to the charge collections of the first filtering apparatus 203, and vice versa.

In the embodiment shown in FIG. 7, the average charge density per unit area of a layer, such as layer 212, gradually increases in the negative Y-direction. Thus the electric field strength in the interior region 202 gradually increases in the negative Y-direction in the proximity of, and in the positive Y-direction of, the second filtering apparatus 211. This produces a gradual increase in the electric potential of an individual FO moving in the negative Y-direction towards the second filtering apparatus 211. In the context of line 234, axis 236, which is parallel to the X-axis, denotes the average magnitude of the electric potential in the XZ-plane, and axis 237, which is parallel to the Y-axis, denotes the position along the Y-direction at which the average magnitude of the electric potential is measured. The maximum energy of FO within interior region 202 determines the maximum electric potential which a FO is able to reach within the potential well produced by the first and second filtering apparatuses. This maximum energy is indicated by dotted line 235. For the static boundary condition, for some embodiments, the maximum energy may be a function of the temperature of the medium in interior region 202, amongst other parameters. In this embodiment, the maximum energy of an FO is less than the peak electric potential required by an FO to escape the potential well in either the positive or the negative Y-direction. Thus all FOs are confined within interior region 202 by the first and second filtering apparatuses. In other embodiments, this need not be the case, i.e. a portion of FO may be able to diffuse in and out of the potential well. In FIG. 7, the furthest an FO is able to diffuse in the negative Y-direction is the location along the negative Y-direction at which the electric potential within interior region 202 reaches the maximum energy of an FO for the first time, as indicated by the first intersection of line 235 and line 234 in the positive Y-direction. Similarly, the furthest an FO is able to diffuse in the positive Y-direction is the location along the positive Y-direction at which the electric potential within interior region 202 reaches the maximum energy of an FO for the first time, as indicated by the second intersection of line 235 and line 234 in the positive Y-direction.

For simplicity, each layer of the second filtering apparatus 211 is constructed in a similar manner in this embodiment, i.e. since each cylindrical tube and the charged material and bulk material contained within are of the same geometric shape and the same size for each layer and within each layer. In other embodiments, the construction of each layer may not be uniform for all layers. In order to produce the aforementioned gradual increase in the electric potential, each collection of charge in the second layer, such as collection of charge 222, contains more charge than a collection of charge in the first layer, such as collection of charge 215.

One of the purposes fulfilled by the second layer 219 is the prevention of FO escaping the interior region 202 into the second reservoir 201. This is also one of the purposes fulfilled by the first filtering apparatus 203 in regards to the first reservoir 200. In other embodiments, some FO may be allowed to diffuse into and out of interior region 202 from the second reservoir 201 or the first reservoir 200.

Between each cylindrical tube of second filtering apparatus 211 there is a channel, such as channel 217 between cylindrical tube 218 and cylindrical tube 213, or channel 224 between cylindrical tube 220 and cylindrical tube 225. One can also consider one half of channel 217 and one half of channel 224 to form a single channel.

The channel width of the second filtering apparatus 211 is configured to allow at least an OI and an FO to pass each other within a channel. In some embodiments the channel width of the second filtering apparatus is as large as is feasible for generating the desired gradual increase in the electric potential in the negative Y-direction in the proximity of and within at least the portion of the channel facing the interior region 202. The size of the channel is constrained by structural constraints as well as constraints on the strength and the gradient of electric field produced by the charge collections. For instance, the insulating property of the insulating material or the bulk material surrounding the charge collections may degrade for strong electric fields. If the OI are molecules, a too strong gradient in the electric field may ionize the OI. In embodiments of the second filtering apparatus in which the FO do not enter a channel due to the electric potential produced by the charge collections, the channel width of the second filtering apparatus can be arbitrarily small while still allowing OI to diffuse through the second filtering apparatus 211. In this case, the channel width can be just large enough to allow a single OI to diffuse from the interior region 202 to the second reservoir 201 at a time. In other such embodiments, the channel width can be any width larger than that, provided the aforementioned requirements on the spatial variation of the electric potential are met. In this case the average density of OI on the side of the second filtering apparatus 211 facing in the positive Y-direction is equal to the average density of OI on the side of the second filtering apparatus 211 facing in the negative Y-direction. Such a scenario is shown in FIG. 7 and indicated by line 231.

In the context of line 233, axis 236, which is parallel to the X-axis, denotes the average fraction of space which is occupied by FO in the interior region 202, also referred to as the "average FO fraction", and axis 237, which is parallel to the Y-axis, denotes the position along the Y-direction at which said average FO fraction is measured. As shown, the average FO fraction decreases more gradually in the negative Y-direction than it decreases in the positive Y-direction.

A subset of conventional filtration systems employ osmosis, which is a process in which solvent molecules tend to diffuse through a semi-permeable membrane from a region of low solute concentration to a region of high solute concentration. In a typical osmotic process, the semi-permeable membrane is permeable to the solvent molecules and impermeable to solute molecules in the solution. The net diffusion through the membrane is zero when the difference the total pressure between the solutions on either side of the membrane is equal to the difference in the osmotic pressure of the two solutions.

At low solute concentrations, the solution can be modeled as an ideal solution, and the relationship between the osmotic pressure and the concentration of the solute in the volume of the solution is similar to the ideal gas relationship between pressure and the concentration of gas molecules in the volume of the gas. More specifically, the osmotic pressure of a solute in a solution is similar to the partial pressure of a gas in a gas mixture.

According to Dalton's law of partial pressures, the total pressure of a mixture of ideal gases in a volume is equal to the sum of the partial pressures of each constituent gas in said volume, where the partial pressures are calculated for each constituent gas using the ideal gas law, the mass of the gas, the volume available to the mixture, and the temperature of the mixture. In other words, the partial pressure is equal to the pressure the constituent gas would exert if it occupied the entire volume of the mixture at the same temperature without any other gas present.

Consider the following simplified, hypothetical example of a conventional osmotic process. A first and a second reservoir, of finite volume and equal size, are separated by a semi-permeable membrane configured to allow a first gas species to pass through the membrane from the first to the second reservoir, and vice versa. The membrane is also configured to prevent the passage of a second gas species through the membrane. The concentration of the second gas species, i.e. the number of gas molecules per unit volume of the second reservoir, in the second reservoir is non-zero in this example, and the concentration of the second gas species in the first reservoir is zero. The concentration of the first gas species, is non-zero in both the first and second reservoirs. In the second reservoir, the gas mixture can be considered to be a solution comprising the first gas as a solvent and the second gas as a solute.

When said system is in equilibrium, there is no net diffusion of gas molecules of the first gas species through the semi-permeable membrane. In other words, the rate of diffusion of gas molecules of the first gas species through the membrane from the first reservoir into the second reservoir is equal in magnitude as the rate of diffusion of molecules of the first gas species through the membrane from the second reservoir into the first reservoir. This equilibrium scenario, i.e. the scenario in which there is no net diffusion of molecules of the first gas species through the membrane, can also be described as the aforementioned static boundary condition. In this example, the osmotic pressure of the gas mixture in the second reservoir is approximately equal to the partial pressure of the second gas species in the second reservoir. The osmotic pressure of the gas in the first reservoir is zero, since the concentration of molecules of the second gas species in the first reservoir is zero in this example. As mentioned, zero net diffusion of the first gas species through the membrane occurs when the difference in pressure between the gas mixture in the second reservoir and the gas mixture in the first reservoir is equal to the difference in the osmotic pressures of gas mixture in the second reservoir and the first reservoir. In other words, the difference in total pressure between the second and first reservoirs is equal to the partial pressure of the second gas species in the second reservoir. Therefore, in equilibrium, the partial pressure of the first gas species in the second reservoir is equal to the partial pressure of the first gas species in the first reservoir. Since the temperature in the first and second reservoirs are identical in this example, the number of molecules of the first gas species per unit volume in the first and second reservoirs are identical. In other words, the number of molecules of the second gas species per unit volume in the second reservoir has no effect on the number of molecules of the first gas species per unit volume in the second reservoir in the equilibrium scenario of a conventional osmotic process. Similarly, the transmissivity of molecules of the first gas species from the first reservoir to the second reservoir is equal to the transmissivity of molecules of the first gas species from the second reservoir to the first reservoir. In other words, the transmissivity of molecules of the first gas species from the first reservoir to the second reservoir is independent of the number of molecules of the second gas species per unit volume in the second reservoir.

This behavior of a conventional osmotic process is due to the assumption of a low concentration of molecules of the second gas species per unit volume in the second reservoir, and the treatment of the solution in the second reservoir as an ideal solution, or an ideal gas mixture. In a subset of embodiments of the present invention, filtering apparatuses are configured to facilitate a departure from the aforementioned ideal behavior. For instance, the concentration of FO, or equivalent geometries, associated with a filtering apparatus can be configured to be sufficiently large. As described below, the properties of the resulting non-ideal behavior can be employed to generate a difference in the concentration of OI in a second reservoir relative to a first reservoir for a static boundary condition. Said properties can also be employed to generate a net diffusion of objects of interest, or "OI", through a filtering apparatus for a dynamic boundary condition. The energy of the net diffusion, i.e. the energy associated with the resulting bulk flow of OI, is provided by the thermal energy of the OI in some embodiments of the invention. The bulk flow of OI can be employed in the production of thrust in an aircraft propulsion unit, for example. The bulk flow of OI can also be employed in the conversion of thermal energy of a fluid into useful work, such as into mechanical work or electrical energy. For example, filtering apparatuses configured in accordance with some embodiments of the invention can be employed to induce a bulk flow of OI, and the resulting thrust acting on the filtering apparatus can be employed to apply a torque on the drive shaft of an electric generator, which can be configured convert the mechanical power associated with the rotation of the drive shaft into electrical energy. The filtering apparatus can take the place of, and perform the function of, the turbine blades of a conventional wind turbine, for example. In this case, the OI can be air molecules, and the fluid can be air.

In accordance with some embodiments of the invention, the average FO fraction in FIG. 7, or the average bulk fraction in FIGS. 1-10A, is sufficiently large, that the mixture of FO and objects of interest can no longer be considered to be an ideal mixture or an ideal solution, as described by Dalton's law, or as described by an ideal solution. As a result, the interstitial volume between the FOs which is accessible to OI can be modeled as a channel with diffuse interior walls, resulting in a concentration of OI within the interior region 202 which exceeds the concentration, or volumetric number density of OI, in the first reservoir 200, i.e. the concentration predicted by conventional osmotic behavior. This also applies to the scenarios in which other FOs are employed, and the scenarios in which the FOs are represented by the bulk, such as bulk 169, of a porous bulk material, as described in the context of FIGS. 6-10A.

This increase in density above the value predicted by conventional osmotic behavior can be explained as follows. Due to the large density or concentration of FOs, and due to the finite size of the OI, the mean free path is reduced to a value which less than approximately 1000 times the collision diameter of an OI. Due to the finite collision diameter of an OI, the collision between an OI and an FO or another OI will occur approximately one collision diameter sooner than predicted by conventional scattering models, for example. In addition, due to the finite collision diameter of an OI, there is an increase in the amount of volume, denoted the "collision volume", within which a neighboring OI or FO needs to be located in order to cause a collision between and OI and said neighboring OI or FO within an incremental radius "dr", where "r" is the distance of the center of the OI relative to a reference point, such as an incremental area of a channel opening, for example. The increase in the collision volume is due to the fact, that the radius at which the center of a neighboring OI or FO needs to be located in order to cause a collision with an OI is larger than "r" by approximately one collision diameter of an OI. Note that this portion of the collision volume is proportional to the square of the radius, and can be considered to be the longitudinal extension of the OI along the radius "r". In addition, due to the finite size of the OI, the collision volume also comprises a large portion of volume outside of the volume accessible to the center of an OI, i.e. outside of the region of feasible trajectories of the center of an OI. In other words, for a given incremental volume available to the centers of OI within a distance "dr", there is an even larger incremental collision volume. This portion of the collision volume can be considered to be the lateral extension of the OI perpendicular to the radius "r" and perpendicular to the current trajectory of the center of the OI. The increase in the collision volume contributes to a reduction in the mean free path of OI, and a reduction in the aperture of a channel opening, for the portion of a channel opening facing a region of increased FO or OI concentration, or a region of reduced separation between diffusely reflective channel walls. This reduction in the mean free path is larger than the reduction in the mean free path within ideal solutions or ideal gas mixtures at low concentrations of FO. As discussed, this departure from the behavior of ideal solutions or ideal gas mixtures is associated with a reduction in the aperture and an increase in the number density of OI within the region of reduced aperture, such as interior region 202.

The reduction in aperture can also be considered to be an interior "blocking" or a "shadowing" effect, in which neighboring FOs or OI, or the diffuse walls of a channel, prevent the passage of OI through a channel opening and out of the region of large FO concentration. Note that this interior blocking effect is not cancelled by a corresponding exterior blocking effect in which OI are prevented from diffusing into the region of large FO concentration due to excessive or premature collisions with FO. This is in part due to the diffuse nature of collisions within the region of large FO concentration. This blocking effect can be considered to be similar in function as a weakly spring loaded ball valve located on the side of the filtering surface which faces the region of large FO concentration, where the ball valve allows the passage of OI into the region of large FO concentration, but discourages the passage of OI out of said region. The asymmetric blocking effect results in a larger absorptivity of OI for a region of large FO concentration for a dynamic boundary condition, resulting in a preferential diffusion of OI into the region of large FO concentration. Once the concentration of OI in the region of large FO concentration has increased by a sufficient amount, i.e. once the pressure of the region of large FO concentration has increased to account for the larger-than-ideal osmotic pressure in said region, the net diffusion of OI through the filtering surface is zero, and a static boundary condition is established. This blocking effect is not accounted for in ideal models which assume a low concentration of OI and FO.

This reduction in the mean free path is furthermore enhanced by a narrower channel opening compared to a larger channel opening. This is due to the finite diameter of OI, which limits the range of initial angles of the trajectory or the velocity with which an OI can diffuse into a narrower channel. The maximum initial angle relative to the surface normal of the channel opening is denoted the "aperture angle". As indicated in FIG. 8, FIG. 9, and FIG. 10A, this effect can be employed to increase the aperture of equivalent channels on one side of an interior region, such as the side of interior region 402 facing the second reservoir 401, compared to the other side of the interior region, such as the side of interior region 402 facing the first reservoir 400. OI within an interior region preferentially diffuse through channels with larger effective apertures within said interior region, i.e. into the second reservoir as opposed to into the first reservoir.

The portion of the interior region 202 in which the average FO fraction decreases in the positive Y-direction is denoted the "first gradient segment". The portion of the interior region 202 in which the average FO fraction decreases in the negative Y-direction is denoted the "second gradient segment". The portion of the interior region 202 in which the average FO fraction is substantially uniform or constant along the Y-direction is denoted the "uniform segment". Note that the extent of the uniform segment in the Y-direction may be negligibly small for some embodiments. In accordance with some embodiments of the invention, the magnitude of the average spatial gradient of the average FO fraction along the Y-direction is larger for the first gradient segment than it is for the second gradient segment.

This configuration of FOs within the interior region 202 may be generated in a wide variety of ways. For example, a potential field may be generated, either conceptually or actually, in order to manipulate the average FO fraction as a function of position along the Y-direction.

The effect of a gradually increasing potential in the negative Y-direction is the repulsion or deceleration of FO which diffuse in the negative Y-direction, and the acceleration of FO which diffuse in the positive Y-direction, in the proximity of the second filtering apparatus 211. In other words, there is a net acceleration in the positive Y-direction on FOs in the proximity of the second filtering apparatus 211. This results in the aforementioned gradual spatial density gradient of FO, where the density of FO decreases in the negative Y-direction in the proximity of the second filtering apparatus 211.

The effect of a less gradually or more abruptly increasing potential in the negative Y-direction is the repulsion or deceleration of FO which diffuse in the positive Y-direction, and the acceleration of FO which diffuse in the negative Y-direction, in the proximity of the first filtering apparatus 203, where the comparison is made to the aforementioned gradually increasing potential in the negative Y-direction in the proximity of the second filtering apparatus 211. In other words, there is a larger net acceleration in the negative Y-direction on FOs in the proximity of the first filtering apparatus 203. This results in a less gradual or more abrupt spatial density gradient of FO, where the density of FO decreases in the positive Y-direction in the proximity of the first filtering apparatus 203.

Note that, since bulk material 206 or bulk material 214 is in this case perfectly reflective to FOs, any surface of bulk material can be considered to be an apparatus which is capable of generating an abrupt increase in the potential of an FO in the proximity of the bulk material. Note that the potential need not be electric in nature. As will be explained later, this topography of the potential can be generated by any type of body force per unit mass, such as a gravitational force. The topography or spatial variation of the potential of an FO can also be a function of time. For instance, the spatial rate of change of a potential in the Y-direction may be modified or regulated over time in order to regulate the effectiveness of the embodiment of the invention. For instance, a an increase in the rate of increase of the potential in the negative Y-direction can be used to increase the magnitude of the average spatial gradient of the average FO fraction along the Y-direction for the second gradient segment. This can be used to reduce the ratio of the density of OI in the second reservoir 201 to the ratio of OI in the first reservoir 200 for the static boundary condition, ceteris paribus.

In the context of line 231, axis 236 denotes the average fraction of free space which is occupied by OI, also referred to as the "average OI fraction", and axis 237 denotes the position along the Y-direction at which said average OI fraction is measured. As before, "free space" refers to space which is not occupied by any bulk material, such as bulk material 206, 214, or 221. Dashed line 232 shows the average portion of free space which is occupied by OI in the first reservoir 200 for reference.

In the uniform segment, the motion of the FOs in this embodiment is substantially in a straight line, as shown in the form of trajectory 228, which shows a portion of the trajectory of path followed by FO 227. In the first gradient segment, FOs are accelerated in the negative Y-direction, as indicated by trajectory 230 of FO 229. In the second gradient segment, FOs are accelerated in the positive Y-direction, as indicated by the curved trajectories of FOs in the second gradient segment.

Due to the gradual decrease in the average FO fraction in the negative Y-direction, the average OI fraction increases gradually in the negative Y-direction in the proximity of the second filtering apparatus 211. Due to the less gradual or more abrupt decrease in the average FO fraction in the positive Y-direction, the portion of free space occupied by OI does not change substantially in this simplified embodiment. In other embodiments, the average OI fraction may decrease in the negative Y-direction throughout the first gradient segment, where the decrease is smaller than the increase in the negative Y-direction throughout the second gradient segment.

One of the purposes of the second filtering apparatus 211 can be considered to be the generation of a body force in the positive Y-direction on FOs in the second gradient segment, where the body force is configured to counteract or balance the diffusive pressure of FO arising from the concentration gradient of FOs.

For a static boundary condition, for some embodiments, the density of OI in the second reservoir 201 is larger than the density of OI in the first reservoir 200. For some embodiments, the pressure of OI in the second reservoir 201 is larger than the pressure of OI in the first reservoir 200. For some embodiments, the entropy of OI in the second reservoir 201 is smaller than the entropy of OI in the first reservoir 200. For some embodiments, the average velocity of OI in the second reservoir 201 is substantially equal to the average velocity of OI in the first reservoir 200. For some embodiments, the temperature of OI in the second reservoir 201 is substantially equal to the temperature of OI in the first reservoir 200.

For the dynamic boundary condition, there is a net diffusion of OI from the first reservoir 200 into the second reservoir 201. Embodiments of the invention can therefore also be considered for applications involving pumping. As a result of the net diffusion of OI, there is a net force acting in the positive Y-direction on embodiments of the invention. Such a force may be employed to do mechanical work. This mechanical work may also be converted into electrical energy by means of an electric generator. In the case in which the OI carry charge, embodiments of the invention may be employed to produce electrical work. This electrical work may also be converted into mechanical work by means of an electric motor. Embodiments of the invention may therefore also be considered for applications involving power generation. Such applications, as well as related apparatuses and methods, are well known in the art.

As mentioned, other embodiments of the invention may comprise wide variety of other configurations and designs of the second filtering apparatus 211, as well as the first filtering apparatus 203.

In other embodiments, the second filtering apparatus may be configured in a different manner. For example, the second filtering apparatus may be configured in a manner similar to the first filtering apparatus, with the following differences. For example, the second filtering apparatus may feature a larger number of separate and insulated charge collections, such as charge collection 210 in first filtering apparatus 203, where each charge collection is offset in the Y-direction, and where the charge contained within each charge collection may increase gradually in the negative Y-direction. The channel width of such a second filtering apparatus follows the same principles already described in the context of FIG. 7.

The purpose of some embodiments of the invention is the generation or creation of a density gradient of FO in an interior region, where the density of FO gradually decreases in the negative Y-direction in the proximity of the first boundary of the interior region for the static boundary condition, and where the density of FO less gradually or more abruptly decreases in the positive Y-direction in the proximity of the second boundary of the interior region, as exemplified in FIG. 7 by line 223. The interior region is defined to be the volume of space within which the average density of FO is above a specified threshold. The boundary of the interior region is the surface of said volume. The boundary surface can be split into at least a first boundary and a second boundary, where distinction is made in terms of the aforementioned gradient of the density of FO in the proximity of the boundary. Note that the interior region need not be enclosed by an apparatus on all sides, such as a first or second filtering apparatus. The interior region can be defined entirely in terms of the number density of FO. Note that the FO need not be freely moving, as indicated in the example shown in FIG. 6. In some embodiments, the FO may be rigidly attached to an embodiment of the invention, in which case the FO may more aptly be described as a bulk material. The interior region can also be defined in terms of other parameters, such as the average pressure of FO.

In the case in which the FO and OI may be distinguished by the average charge they carry, the first filtering apparatus 203 and the second filtering apparatus 211 can fulfill the aforementioned purpose by producing an electric field, where the electric field may produce a gradual increase in the electric potential of an individual FO moving in the negative Y-direction towards the second boundary and where the electric field may produce a less gradual or more abrupt decrease in the electric potential of an individual FO moving in the positive Y-direction towards the first boundary. The electrical potential which partially or completely confines the FO and forms the interior region can be considered to form at least a local potential well for FO.

For example, in FIG. 7, the first boundary is the first surface 205 and the portion of a channel which can be reached by FOs before they are repelled by a charge collection, such as charge collection 210. This portion is a function of the average velocity and mass of an FO, amongst other parameters, such as the charge of an FO and the configuration of the charge collection associated with the first filtering apparatus. In FIG. 7, the second boundary surface is approximately a plane parallel to the XZ-plane and located in the proximity of the second filtering apparatus 211 at the position along the Y-axis at which the average density of FO reaches zero, as indicated by line 233 and the approximate location of the label "233".

The aforementioned topography of the electric potential within an interior region can be generated in a variety of different ways, as is well known in the art. In general, the apparatus generating the electric field can be denoted the "electric field generating contraption", or EFGC.

In FIG. 7, the EFGC can be described in terms of a first electric field generating apparatus, or a "first EFGA", and a second EFGA. The term "first EFGA" is another way of referring to the first filtering apparatus 203, and the term "second EFGA" is another way of describing the second filtering apparatus 211. Note that, since bulk material 206 or bulk material 214 is in this case perfectly reflective to FOs, any surface of bulk material can be considered to be an electric field generating apparatus, where the electric field is configured to repel FOs in the proximity of the surface.

In some embodiments, the first filtering apparatus may filter FOs based on the size or shape of FOs, while the second filtering apparatus may filter FOs with a distinct or separate potential. For instance, the FOs may be spherical in shape, where the diameter is larger than the diameter of a circular opening of a channel, such as channel 207. Thus FOs are unable to pass through the first filtering apparatus, which in turn results in an abrupt or less gradual change in the average density of FOs along the Y-direction. As mentioned, the FOs may be positively or negatively charged. If the second filtering apparatus comprises collections of charge of the opposite sign as the sign of the charge of FOs, the second filtering apparatus may be located in interior region 202 in the proximity of the first filtering apparatus in order to produce a sufficient density of FOs at the second surface 205 of the first filtering apparatus. Alternatively, the second filtering apparatus may be located beyond the second channel openings, such as second channel opening 209, in the positive Y-direction. The second filtering apparatus may be embedded in the first filtering apparatus, for example. In this case, the collections of charge in the first filtering apparatus, such as collection of charge 210, may be conceptually assigned to, or considered to be, the second filtering apparatus, which, due to its opposite charge, attracts FOs to the second surface 205 of the first filtering apparatus 203. By virtue of the gradual spatial variation of the electric potential produced by the collections of charge of the second filtering apparatus, the average FO fraction decreases gradually in the negative Y-direction in interior region 202. Note that the electric potential of the second filtering apparatus alone increases gradually and symmetrically in the negative and positive Y-direction. Due to the presence of the second surface 205 of the first filtering apparatus 203, which is impenetrable to FOs, the FOs experience an abrupt reduction in density in the positive Y-direction, however. In other such embodiments the charge of the charge collections of the second filtering apparatus may be of the same sign as the charge of the FOs, in which case the second filtering apparatus may be located in the negative Y-direction of the second surface 205 of the first filtering apparatus 203, and configured in a manner similar to the first filtering apparatus 203 or the second filtering apparatus 211, amongst a wide variety of other suitable configurations.

In FIG. 7 the electric field is generated by a repulsive charge contained within the second EFGA and located in the negative Y-direction of the required spatial density gradient of FO.

In other embodiments, the electric field may be generated by an attractive charge contained within the second EFGA and located in the positive Y-direction of the required spatial density gradient of FO. Several locations for the second EFGA would fulfill this purpose. For instance, the second EFGA could be located in the interior region 202, in close proximity to the second surface 205. In the context of FIG. 7, the second EFGA could contain negative charge collections and be located in the uniform segment of the interior region 202. Note that the first filtering apparatus can be considered to be a first electric field generating apparatus", or "first EFGA". Since an electric field has an infinite range, the aforementioned electric field can also be considered to be generated by a single electric field generating apparatus.

In some embodiments, the second EFGA may even be located within the bulk material 206 of the first filtering apparatus 203. The second EFGA may be located in the positive or negative Y-direction relative to the collections of charge of the first filtering apparatus 203. In this case, the charge collections associated with the first filtering apparatus 203, such as charge collection 210, would need to be sufficiently strong and sufficiently localized to repel FO and prevent a sufficient percentage of FO which enter or interact with a channel, such as channel 207, from diffusing from the interior region 202 into the first reservoir 200.

In some embodiments, an individual FO may be an electron, and an individual OI may be real or virtual photon, and the desired density gradient of FOs may be generated by a suitably configured spatial variation of electric potential, which may be generated by a suitably arranged collection of insulated positive or negative charges, where suitability can be determined by following the principles outlined in this paper as well as known methods for generating a desired spatial distribution of electric potential. As mentioned in the context of FIG. 1, the extent of an apparatus of the invention along the Y-direction may differ substantially between cases in which the OI are real and virtual photons.

The potential may also be conceptually considered to be produced mechanically. For example, an artificial density gradient of FO could be produced by several stages of a compressor, where the compressor may be similarly configured as the axial or centrifugal compressor in a conventional jet engine, and where the compressor is able to compress the FO to a greater extent than OI. The compressor can be considered to provide the pressure on the FO which is required to prevent the diffusion of FO into the second reservoir. The compressor thus balances the diffusion pressure of the FOs, which arises from the concentration gradient of FO. The compressor is configured to increase the pressure of FOs in the positive Y-direction, and effectively push or press FOs towards or against the first filtering apparatus 203. Note that there need not be a net flow of FO in either direction through the compressor. In the case in which an axial compressor is used, the stages of the compressor may be counter-rotating. This could reduce the net viscous drag associated with the operation of the compressor. The viscous drag of a centrifugal compressor is negligible for the static boundary condition and for some embodiments, such as embodiments in which the walls of the compressor rotate with the medium containing the OI and FO. There are several ways in which the FO can be compressed to a greater extent than the OI. The compressor blades may be configured to be penetrable or transparent to a greater portion of OI than FO in some embodiments, i.e. the transmission coefficient of OI which interact with the compressor blades may be greater than the transmission coefficient of FO. Alternatively, an FO may on average have a larger mass than OI. This would result in a larger force exerted by the axial or centrifugal compressor on individual FOs than OI. Thus a larger number density gradient of FOs could be produced throughout the compressor compared to the same for OI. This effect is similar to the sedimentation effect. In the case in which the FOs and OIs can be described as ideal gases, the properties of a gas consisting of FOs may be configured to be different to the properties of a gas consisting of OIs. For example, a gas consisting of FOs may have a different molecular mass, a different specific heat capacity at constant pressure, or a different ratio of the specific heat capacity at constant pressure to the specific heat capacity at constant volume compared to a gas consisting of OI. The suitable difference in the properties of FOs and the properties of OI can be determined using methods known in the art. In some embodiments, the gas consisting of FOs may have a larger molecular mass, a smaller specific heat capacity at constant pressure, or a larger ratio of the specific heat capacity at constant pressure to the specific heat capacity at constant volume compared to a gas consisting of OI. Note that the aforementioned definition of a potential also applies to the case in which an axial, centrifugal or any other kind of compressor is used. The work done in moving a test FO between two points in the compressor can be modeled as, or considered to be conceptually associated with, a change in the potential energy of the FO.

As mentioned, a different mechanism may be used in other embodiments to create a potential of the aforementioned topography. For instance, any type of body force per unit mass may be used to generate the potential. In this case the potential difference between two points can be considered to be work required to move a particle between these two points, where the work is done against a body force per unit mass. The spatial and temporal distribution of the magnitude and direction of the body force per unit mass may be configured to produce the aforementioned topography of the potential. A body force per unit mass can take many forms, such as a gravitational acceleration, a linear or angular inertial acceleration. The body force may also be produced by electric or magnetic fields. Note that any work done against a magnetic force is a subset of the ways in which work can be done against an electric field. Other types of forces may be used to generate the body force per unit mass, such as the strong force. A wide variety of different ways in which such a body force per unit mass distribution can be generated and configured in time and space in order to generate the aforementioned density variation of FO in space are known in the art.

FIG. 8 is a cross-sectional view of another embodiment of the invention. Some features of the apparatus shown in FIG. 8, as well as some of the principles of operation of the apparatus share similarities with the apparatus shown in the other figures, and will therefore not be described in the same detail in the context of FIG. 8, and vice versa.

There is a first reservoir 400 and a second reservoir 401, in which the medium comprises OI which are schematically represented by individual particles, such as the schematic representation of OI 425.

In this example, the invention is embodied by a first filtering apparatus 403, a second filtering apparatus 410, and a third filtering apparatus 431.

The first filtering apparatus 403 has a first surface 404 and a second surface 405, both of which are planar, and parallel to the XZ-plane. In this embodiment, several identical channels, such as channel 407, allow OI from the first reservoir 400 to pass through bulk material 406 to the interior region 402, and vice versa. In this embodiment, the channels are uniformly spaced in the XZ-plane, similar to the arrangement of the channels of first filtering apparatus 103 shown in FIG. 10A.

Bulk material 406 may be made of any suitable material, such as metal, composite, or ceramic. In some embodiments, bulk material 406 may also be described as a fabric.

Each channel has a first opening, such as first opening 408, and a second opening, such as second opening 409. The cross-section of channel 407 is constant, and circular when viewed along the positive Y-direction.

The second filtering apparatus 410 comprises several layers, such as a first layer 411 and second layer 418. Each layer comprises several cylindrical tubes arranged parallel to the Z-axis, such as cylindrical tube 413, cylindrical tube 415, cylindrical tube 420, or cylindrical tube 422. As shown, these tubes are uniformly spaced in the X-direction, and are supported by cylindrical tubes arranged parallel to the X-axis, such as cylindrical tube 417 or cylindrical tube 424.

A channel 416 is formed between tubes 413, 415, 417, and a fourth tube above the plane of the page. Similarly, channel 423 is formed between tubes 424, 422, 420, and a fourth tube.

In FIG. 8, the bulk material of the second filtering apparatus 410, such as bulk material 412 of layer 411 or bulk material 419 of layer 418, is of the same material as bulk material 406. In other embodiments, the bulk material of the second filtering apparatus 410 may be a material different to bulk material 406.

The embodiment shown in FIG. 8 can be considered to be similar to the embodiment shown in FIG. 5 and FIG. 7. As mentioned, for a dynamic boundary condition, there is a net diffusion of OI from a first reservoir into an interior chamber and into a second reservoir. In the case in which the interior chamber comprises freely moving FOs, as is the case for the embodiment shown in FIG. 10A, for example, this can result in a larger density of FOs in the portion of the interior chamber in the negative Y-direction. In other words, the concentration of FOs in the interior chamber may decrease in the positive Y-direction as a result of the diffusion of OI in the negative Y-direction and associated pressure of OI on the FOs. The increase in the concentration of FOs in the negative Y-direction can reduce the average rate of diffusion of OI in the negative Y-direction. The increase in the concentration of FOs can be considered to block the channel openings of a second filtering apparatus at the interface to the interior chamber, thus reducing the rate of diffusion of OI from the interior chamber into the second filtering apparatus. This effect is undesirable and can be largely avoided by employing CFOs instead of FOs. Since CFOs are part of the bulk material of the embodiment, they are not displaced by the diffusing OIs within an interior region to the same degree or by the same amount as freely moving FOs. Thus the rate of diffusion of OIs for a dynamic boundary condition in a steady state may be larger for an embodiment employing CFOs, such as the embodiment shown in FIG. 8 compared to an equivalent embodiment employing FOs, such as the embodiment shown in FIG. 10A.

The third filtering apparatus 431 has a first surface 432 and a second surface 433, both of which are planar, and parallel to the XZ-plane. In this embodiment, several identical channels, such as channel 435, allow OI from the second reservoir 401 to pass through bulk material 434 to the interior region 402, and vice versa. In this embodiment, the channels are uniformly spaced in the XZ-plane, similar to the arrangement of the channels of third filtering apparatus 103 shown in FIG. 10A.

For illustrative purposes, the distance of separation between adjacent channels of third filtering apparatus 431 in the XZ-plane is identical to the distance of separation between adjacent channels of first filtering apparatus 403 in the XZ-plane. Note that the diameter of a channel of the third filtering apparatus 431, such as channel 407, is larger than the size of a channel of the first filtering apparatus 403, such as channel 435. Hence, the diameter of a reference channel of the first filtering apparatus 403 in the first reservoir 400 is smaller than the diameter of the reference channel of the third filtering apparatus 431 in the second reservoir 401. For the static boundary condition, the density of OI in the second reservoir 401 is larger than the density of OI in the first reservoir 400.

Bulk material 434 may be made of any suitable material, such as metal, composite, or ceramic. In some embodiments, bulk material 434 may also be described as a fabric. Bulk material 434 may comprise graphene in some embodiments.

Each channel of third filtering apparatus 431 has a first opening, such as first opening 436, and a second opening, such as second opening 437. The cross-section of channel 435 is constant, and circular when viewed along the positive Y-direction.

In the context of line 428, axis 429 denotes the average portion of space occupied by the bulk material of the embodiment of the invention, denoted the "average bulk fraction", and axis 430 corresponds to the location along the Y-axis at which the quantity expressed by line 428 is measured. The aforementioned bulk material may any bulk material, such as bulk material 406 of the first filtering apparatus 403, the bulk material of the second filtering apparatus 410, or the bulk material 434 of the third filtering apparatus 431.

In the context of line 426, axis 429, which is parallel to the X-axis, denotes the average fraction of free space which is occupied by OI, also referred to as the "average OI fraction", and axis 430, which is parallel to the Y-axis denotes the position along the Y-direction at which said average OI fraction is measured. Dashed line 427 shows the value of the average OI fraction in the first reservoir 400 for reference.

FIG. 9 is a cross-sectional view of another embodiment of the invention. Some features of the apparatus shown in FIG. 9, as well as some of the principles of operation of the apparatus share similarities with the apparatus shown in the other figures, and will therefore not be described in the same detail in the context of FIG. 9, and vice versa.

There is a first reservoir 450 and a second reservoir 451, in which the medium comprises OI which are schematically represented by individual particles, such as the schematic representation of OI 475.

In this example, the invention is embodied by a first filtering apparatus 453, and a second filtering apparatus 460.

The first filtering apparatus 453 has a first surface 454 and a second surface 455, both of which are planar, and parallel to the XZ-plane. In this embodiment, several identical channels, such as channel 457, allow OI from the first reservoir 450 to pass through bulk material 456 to the interior region 452, and vice versa. In this embodiment, the channels are uniformly spaced in the XZ-plane, similar to the arrangement of the channels of first filtering apparatus 103 shown in FIG. 10A.

Bulk material 456 may be made of any suitable material, such as metal, composite, or ceramic. In some embodiments, bulk material 456 may also be described as a fabric.

Each channel has a first opening, such as first opening 458, and a second opening, such as second opening 459. The cross-section of channel 457 is constant, and circular when viewed along the positive Y-direction.

The second filtering apparatus 460 comprises several layers, such as a first layer 461, second layer 468, and third layer 481. Each layer comprises several cylindrical tubes arranged parallel to the Z-axis, such as cylindrical tube 463, cylindrical tube 465, cylindrical tube 470, or cylindrical tube 472. As shown, these tubes are uniformly spaced in the X-direction, and are supported by cylindrical tubes arranged parallel to the X-axis, such as cylindrical tube 467 or cylindrical tube 474. A channel 466 is formed between tubes 463, 465, 467, and a fourth tube above the plane of the page. Similarly, channel 473 is formed between tubes 474, 472, 470, and a fourth tube. Similarly, channel 486 is formed between tubes 487, 483, 485, and a fourth tube.

In FIG. 9, the bulk material of the second filtering apparatus 460, such as bulk material 462 of layer 461, or bulk material 469 of layer 468, or bulk material 482 of layer 481, is of the same material as bulk material 456. In other embodiments, the bulk material of the second filtering apparatus 460 may be a material different to bulk material 456.

The third labelled layer 481 can be considered to be equivalent to the third filtering apparatus 431 mentioned in the context of FIG. 8. Note that the cross-sectional area of channel 486 is larger than the cross-sectional area of channel 457. Further note that the distance of separation of adjacent channels in layer 481 in the XZ-plane is less than the distance of separation of adjacent channels in the first filtering apparatus 453. Hence, the diameter of a reference channel of the first filtering apparatus 453 in the first reservoir 450 is smaller than the diameter of the reference channel of the second filtering apparatus 460 in the second reservoir 451. For the static boundary condition, the density of OI in the second reservoir 451 is larger than the density of OI in the first reservoir 450.

In the context of line 478, axis 479 denotes the average portion of space occupied by the bulk material of the embodiment of the invention, denoted the "average bulk fraction", and axis 480 corresponds to the location along the Y-axis at which the quantity expressed by line 478 is measured. The aforementioned bulk material may any bulk material, such as bulk material 456 of the first filtering apparatus 453, or the bulk material of the second filtering apparatus 460.

In the context of line 476, axis 479, which is parallel to the X-axis, denotes the average fraction of free space which is occupied by OI, also referred to as the "average OI fraction", or the concentration of OI, and axis 480, which is parallel to the Y-axis denotes the position along the Y-direction at which said average OI fraction is measured. Dashed line 477 shows the value of the average OI fraction in the first reservoir 450 for reference.

In other embodiments, a filtering apparatus can comprise a first filter surface, a filtering membrane, or a filtering plate, or filtering apparatus, such as first filtering apparatus 453, where the first filter surface comprises a first surface directed towards a first reservoir, and a second surface directed towards a second reservoir. A filtering apparatus can also comprise at least a second filter surface, wherein the second filter surface also comprises a first surface directed towards a first reservoir, and a second surface directed towards a second reservoir, where the second surface of the first filter surface and the first surface of the second filter surface are facing each other, thereby forming an interior volume. In accordance with the invention, the separation distance between these two filtering surfaces is less than 1000 times the mean free path of an object of interest at that location. For example, the first filter surface can be planar and comprise several parallel channels of constant characteristic width along the length of a channel, similar to filtering apparatus 403. Similarly, the second filter surface can be planar and comprise several parallel channels of constant characteristic width along the length of a channel, similar to filtering apparatus 434. The channels of the first and second filtering surface as well as the interior volume form a channel system.

In some such embodiments, the interactions between the objects of interest and the filtering surfaces comprise diffuse reflections.

In other words, a subset of the embodiments being described in this paragraph can be considered to be similar to the embodiment shown in FIG. 8, with the exception that the interior region 402 does not need to comprise any additional bulk material or filtered objects, such as bulk material 419. In such embodiments, the first surface of the second filtering apparatus and the second surface of the first filtering apparatus are located sufficiently close to one another, that at least a portion of the interior volume can be considered to be a channel which is arranged perpendicular to the length of a channel in the first filtering surface or a channel in the second filtering surface. The locally shortest distance between the first surface of the second filtering apparatus and the second surface of the first filtering apparatus is denoted the "distance of separation".

In accordance with the invention, the width of a channel of the second filtering surface is larger than width of a channel in the first filtering surface, such that the aperture angle of a channel in the second filtering surface is larger than the aperture angle of a channel in the first filtering surface. Thus a second gradient segment is formed by the transition from the interior volume through a channel in the second filtering surface and into the second reservoir.

In some such embodiments, the distance of separation between the second surface of the first filter surface and the first surface of the second filter surface is larger than the characteristic width of a channel in the first filtering surface, the transition from the channel in a first filtering surface to the interior volume thereby forming a second gradient segment.

In some embodiments, several filtering surfaces, such as the first or second filtering surface, can be arranged in series, where the distance of separation between the filtering surfaces gradually increases, and where the aperture angle or the characteristic width of the channel in consecutive filtering surfaces increases gradually. Thus a single second gradient segment can extend throughout several filtering surfaces.

In some such embodiments, the distance of separation between the second surface of the first filter surface and the first surface of the second filter surface is smaller than the width of a channel in the second filtering surface, the transition from the interior volume to a channel in a second filtering surface thereby forming a second gradient segment.

In some such embodiments, and in some embodiments comprising filtering surfaces, such as filtering surfaces 403 or 431, such as the embodiments shown in FIGS. 6-10A, the cross-sectional area of the channels along the length of the channels can also increase in the direction of a second reservoir, thereby forming a second gradient segment within the filtering surface. In other words, the filtering apparatuses 153, 203, 403, 431, 453, 103, 110 can comprise a second gradient segment. These filtering apparatuses can be configured in a similar manner as the embodiment shown in FIG. 1 or FIG. 2, for example.

FIG. 10A is a cross-sectional view of another embodiment of the invention.

In FIG. 10A, the medium comprises objects of interest, or "OI", which are schematically represented by individual particles, such as the schematic representation of particle 135. For simplicity, the medium can be considered to be an ideal gas comprising monatomic molecule. In other embodiments the medium may consist of other types of objects, such as water molecules. The medium may also comprise several different types of objects, such as free electrons found in the lattice of atoms in a metal conductor. OI are assumed to be spherical in shape in this simplified embodiment. In other embodiments, OI need not be spherical, but can take any shape. For example, OI may be a diatomic molecule, or a polyatomic molecule, or an aerosol particle like a dust particle or pollen, which can take a wide variety of shapes. An OI may also be a subatomic particle such as an electron, positron, or photon. An OI may also be a virtual particle, or virtual object, such as a virtual photon, a virtual electron, or a virtual positron. In the case in which an OI is a virtual photon, the FO may be an electron, for example. An OI may also be a charged molecule, such as a positively or negatively charged ion.

There is a first reservoir 100 and a second reservoir 101. In this example, the invention is embodied by a first filtering apparatus 103, a second filtering apparatus 110, and an interior chamber 102 comprising filtered objects, or "FOs", such as filtered object 136.

In this embodiment, the interface between interior chamber 102 and the first reservoir 100 is formed by the first filtering apparatus 103 or by an insulating material, which is not shown, but configured to be impenetrable and perfectly reflective to FOs and OI. Said insulating material may be configured to enclose interior chamber 102 in directions perpendicular to the Y-direction. For example, the cross-section of the insulating material may be a cylindrical shell when viewed along the Y-direction. In other embodiments, the cross-section of the insulating material may be any shape, such as rectangular or polygonal. Similarly, the interface between interior chamber 102 and the second reservoir 101 is formed by the second filtering apparatus 110 or by said insulating material.

The first filtering apparatus 103 has a first surface 104 and a second surface 105. In this embodiment, several identical channels, such as channel 107, allow OI from the first reservoir 100 to diffuse through bulk material 106 to the interior chamber 102, and vice versa. Each channel has a first opening, such as first opening 108, and a second opening, such as second opening 109. The cross-section of channel 107 is constant, and circular when viewed along the positive Y-direction. In other embodiments, the cross-sectional geometry of channel 107 need not be circular, but can be any arbitrary shape, such as square, rectangular, or polygonal.

Figure 10B:
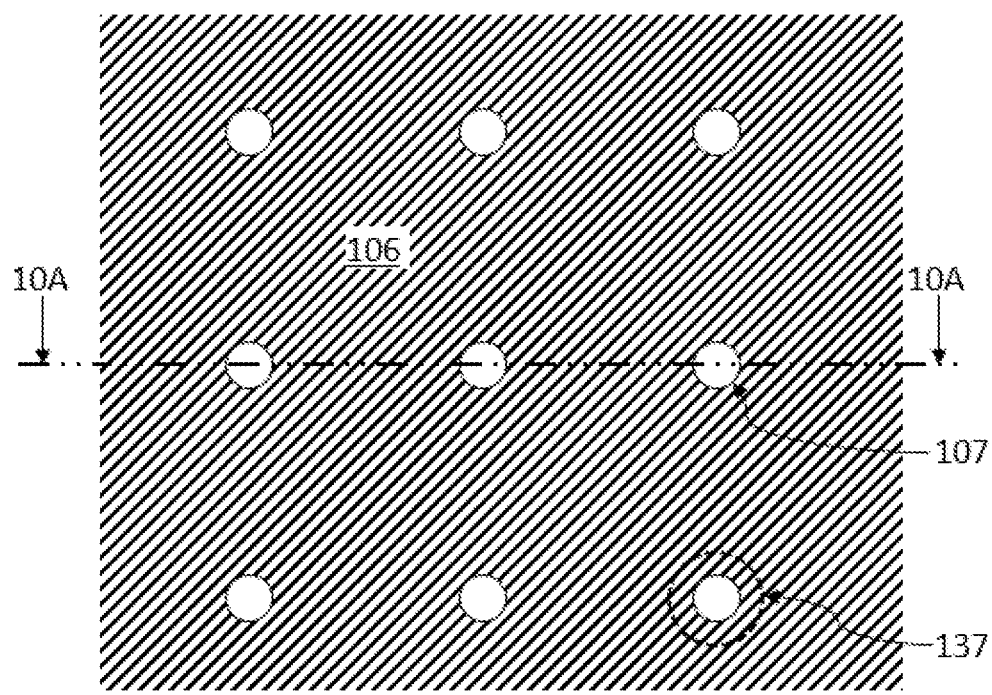
FIG. 10B is a cross-sectional view of the embodiment shown in FIG. 10A.

FIG. 10B is a cross-sectional view along the positive Y-direction of the first filtering apparatus 103 of the embodiment shown in FIG. 10A. The periodic arrangement of the channels, such as channel 107, within bulk material 106 is evident. In other embodiments, the arrangement need not be periodic. Circle 137 schematically represents the projection of the largest circumference of a FO on the cross-section of a channel. Since the surface of bulk material 106 facing the interior chamber 102 is perfectly reflective to an FO, an FO is not able to pass through first filtering apparatus 103.

The cross-sectional geometry and size of a channel is configured to allow OI to diffuse from the interior region 202 through a channel and into the first reservoir 100, and vice versa. For example, in the embodiment shown in FIG. 10A, the circular cross-sectional area of channel 107 is larger than the maximum circular cross-sectional area of an OI, but smaller than the minimum circular cross-sectional area of FO. In other embodiments, the cross-sectional area or geometric shape may not be constant along the Y-direction. In other embodiments, a fraction of FO which interact with the first filtering apparatus 103 or the second filtering apparatus 110 may also be able to diffuse through the first filtering apparatus 103 or the second filtering apparatus 110, provided that the principles of operation of the embodiment of the invention are still employed. In accordance with some embodiments of the invention, the rate of diffusion of OI in any one direction through a reference channel of a second filtering apparatus associated with an interior chamber is larger than the rate of diffusion of OI in any one direction through a reference channel of a first filtering apparatus associated with an interior chamber for the static boundary condition. In some embodiments, this principle may require, amongst other conditions, that the number density of FO in the interior chamber 102 is larger than the number density of FO in the first reservoir 100, and larger than the number density of FO in the second reservoir 101, for the static boundary condition.

In the case in which the objects of interest can be described as particles, such as molecules, bulk material 106 may be any solid material, such as a metal, ceramic, or composite. All accessible surfaces of material 106 are configured to perfectly reflect all OI and FOs. In other embodiments, the reflectivity can be any value greater than zero. Those skilled in the art will be able to choose an appropriate material for a given application.

Thus the first filtering apparatus 103 is configured to allow OI to pass through the channels, such as channel 107, of first filtering apparatus 103 in the positive or negative Y-direction, but prevents the passage of FOs from the interior chamber 102 into the first reservoir 100. In this simplified embodiment, the difference in the size between the spherical FO and the spherical OI is employed to filter, or prevent the diffusion of FOs through the first filtering apparatus 103 while allowing OI to diffuse through the first filtering apparatus 103. In other embodiments, other properties of FOs may be used to allow first filtering apparatus 103 to distinguish between FOs and OI. For example, a difference in electric charge between a FO and an OI may be used to filter FO while allowing OI to pass through the filtering apparatus. In this case, the filtering apparatus may employ electrostatic repulsion in order to prevent FOs of a particular charge from passing through the filtering apparatus. In another example, a difference in geometric shape between FOs and OI may be employed to filter FOs while allowing OI to pass through the first filtering apparatus 103. For instance, the volume of an FO and an OI may be identical, but an OI may be spherical in shape while an FO is triangular or rectangular in shape. The minimum cross-section of an FO is thus larger than the minimum cross-section of an OI, which allows a channel with a circular cross-section to be sized in a manner which allows OI to pass through the channel while preventing the passage of FO through the channel.

A wide variety of other filtering apparatuses and methods are known in the art for the purpose of allowing the passage of objects of a particular set of properties through a filtering apparatus, while obstructing, diminishing, or preventing the passage of, or reducing the rate of flow or the rate of diffusion of, objects with a different set of properties through said filtering apparatus.

In the simplified example depicted in FIG. 10A, the filtered objects can be considered to be spherical particles, such as the atoms found in a monatomic gas. As shown, the FOs have a larger diameter than the OI. In other embodiments, the FOs need not be spherical in shape, and need not be larger than OI along all dimensions. An individual FO may also be collection of atoms, such as fullerene molecules, which may be of spherical, ellipsoidal, or tubular shape, for example.

The second filtering apparatus 110 comprises several interior pins, such as interior pin 111, or interior pin 112. The second filtering apparatus 110 also comprises exterior pins, such as exterior pin 116, or exterior pin 115. Each interior pin defines a first surface, such as first surface 120 of interior pin 112, or first surface 119 of interior pin 111. Each exterior pin defines a second surface, such as second surface 122 of exterior pin 115, or second surface 123 of exterior pin 116. The interior pins and the exterior pins are rigidly connected to a support apparatus 125. The interior pins are located in the positive Y-direction of the support apparatus 125, i.e. on the side of the support apparatus 125 facing the interior chamber 102. The exterior pins are located in the negative Y-direction of the support apparatus 125, i.e. on the side of the support apparatus 125 that is not facing the interior chamber 102, but facing the second reservoir 101. In this embodiment, the interior pins can be considered to be a mirroring of the exterior pins, where the mirroring plane is parallel to the XZ-plane and located at the center of the support apparatus 125 along the Y-direction, i.e. in the proximity of label 125 in FIG. 10A. This mirroring plane will be referred to as the mirroring plane of the second filtering apparatus 110.

In this embodiment, each pin is cylindrical in shape, with a long axis parallel to the Y-axis. The cross-section of a pin when viewed along the Y-direction is circular, and uniform in shape and size. In other embodiments, the cross-section may be any geometric shape, such as rectangular, square, or polygonal. In other embodiments, the long axis of a pin need not be parallel to the Y-axis. For example, the long axis of a pin may form an angle with the Y-axis, where the angle is less than 45 degrees. In other embodiments, said angle may be less than 90 degrees. In yet other embodiments, a channel of second filtering apparatus 110 may have any suitable geometry, provided the principles of the invention are employed. The principles of the invention may constrain the size of each channel of the second filtering apparatus 110, or the arrangement of the channels of the second filtering apparatus 110 relative to each other, or the geometry of a channel of the second filtering apparatus 110, amongst other parameters. These parameters determine the effectiveness of an embodiment of the invention. For example, the cross-section of a pin may vary in shape and size along the Y-axis. In some such embodiments, the geometry of a second filtering apparatus may, on average, be symmetric about a mirroring plane parallel to the XZ-plane and located halfway between the first surface of the second filtering apparatus, such as first surface 120, and the second surface of second filtering apparatus, such as second surface 123, along the Y-direction. In this case the average is a spatial and temporal average calculated over the extent of the second filtering apparatus. In other such embodiments, the geometry of the second filtering apparatus need not be symmetric. For example, the second filtering apparatus may only comprise a support apparatus, such as support apparatus 125, and exterior pins, such as exterior pins 115 or 116. In some such cases, there need not be a first filtering 103 apparatus or an interior chamber 102 comprising FOs.

Each pin can be any length in the Y-direction, provided structural and manufacturing constraints are met, amongst other constraints.

In this embodiment, the diameter of the cylindrical pins is as small as is feasible. In some embodiments, the cross-sectional area of a pin when viewed along the Y-direction is on the order of the size of a cross-sectional area of an OI. In some embodiments, the cross-sectional area of a pin when viewed along the Y-direction is on the order of the size of a cross-sectional area of an FO. In other embodiments, the cross-sectional area of a pin when viewed along the Y-direction can take any other suitable value.

In the embodiment shown, adjacent interior pins, such as interior pin 111 and interior pin 112, are arranged in a manner in which FOs are not able to pass through second filtering apparatus 110 from the interior chamber 102 into the second reservoir 101. One can define a first plane of second filtering apparatus 110 as a plane parallel to the XZ-plane and coincident with first surface 120 of interior pin 112. One can define a first middle plane of second filtering apparatus 110 as a plane parallel to the XZ-plane and coincident with first surface 130 of interior pin of rigid element 132. One can define a second middle plane of second filtering apparatus 110 as a plane parallel to the XZ-plane and coincident with second surface 131 of interior pin of rigid element 132. One can define a second plane of second filtering apparatus 110 as a plane parallel to the XZ-plane and coincident with second surface 123 of exterior pin 116. The volume of space between the first plane and the first middle plane which is not occupied by bulk material 126 is the first channel portion 127 of the second filtering apparatus 110. The volume of space between the second middle plane and the second plane which is not occupied by bulk material 126 is the second channel portion 129 of the second filtering apparatus 110. The volume of space between the first middle plane and the second middle plane which is not occupied by bulk material 126 comprises middle channels, such as middle channel 128 of the second filtering apparatus 110. The first channel portion 127, a middle channel, such as middle channel 128, and the second channel portion 129, allow the passage of OI through second filtering apparatus 110 from the interior chamber 102 to the second reservoir 101, and vice versa. The portion of the first plane which is not coincident with a first surface of a pin, such as first surface 120 or first surface 119, is denoted the first channel opening of the second filtering apparatus 110. The portion of the second plane which is not coincident with a second surface of a pin, such as second surface 122 or second surface 123, is denoted the second channel opening of the second filtering apparatus 110.

Figure 10C:
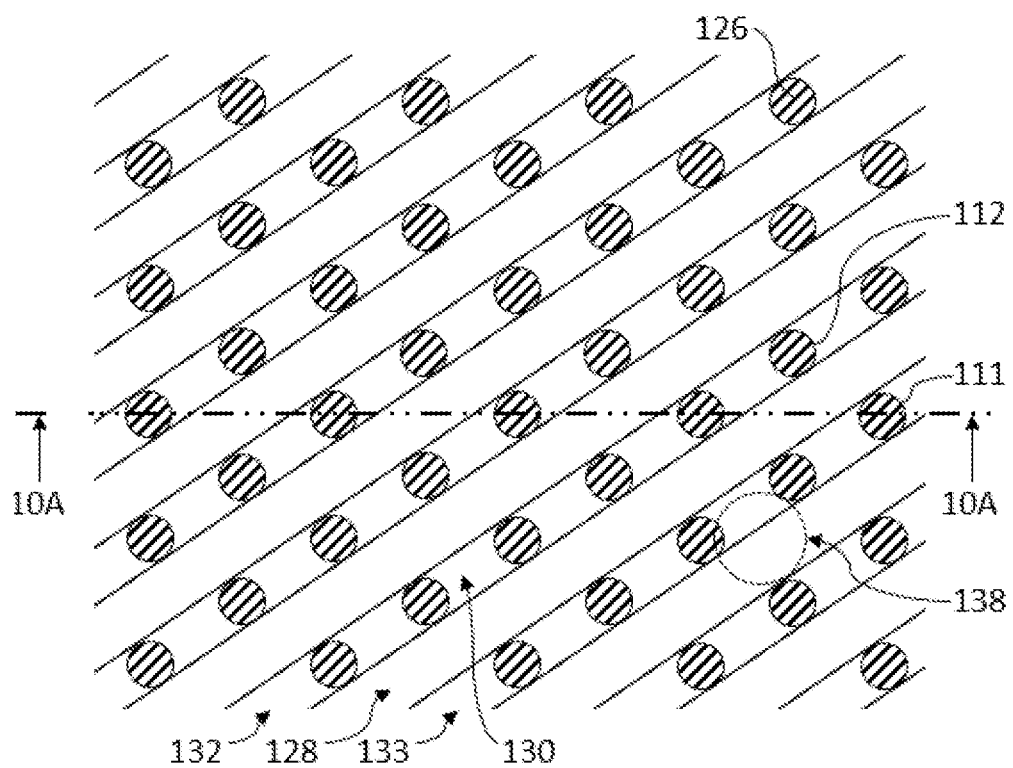
FIG. 10C is another cross-sectional view of the embodiment shown in FIG. 10A.

Support apparatus 125 comprises several rigid elements, such as rigid element 132 or rigid element 133 shown in FIG. 10C. Each rigid element is rigidly connected to a subset of interior and exterior pins, as shown in FIG. 10A and FIG. 10C. There may also be a rigid connection between a rigid element and an adjacent rigid element, or between a rigid element and any apparatus supporting the second filtering apparatus. Such rigid connections are not shown in the figures. Between adjacent individual rigid elements there is a middle channel, such as middle channel 128, through which OI are able to diffuse from the interior chamber 102 into the second reservoir 101, and vice versa. Each rigid element has a first surface, such as first surface 130 of rigid element 132, and a second surface, such as second surface 131 of rigid element 132.

In other embodiments, second filtering apparatus 110 can be configured in similar manner as the first filtering apparatus 103, where the characteristic width of a channel in the second filtering apparatus 110 is larger than the same in the first filtering apparatus 103, provided that the second filtering apparatus is still able to at least partially prevent or obstruct the diffusion of FO from interior region 102 into the second reservoir 101. In such embodiments, the filtering apparatus can be considered to be configured in similar manner as the filtering apparatus shown in FIG. 8, where the FOs in FIG. 10A are replaced by CFOs, i.e. by the bulk material, in FIG. 8.

FIG. 10C is a cross-sectional view along the negative Y-direction of the second filtering apparatus 110 of the embodiment shown in FIG. 10A. The periodic arrangement of the pins, such as interior pin channel 112 or interior pin 111 is evident. In other embodiments, the arrangement need not be periodic. Circle 138 schematically represents the projection of the smallest circumference of a FO on the cross-section of the first channel portion 127. Note that the circumference always intersects bulk material 126 at least once. Since the surface of bulk material 126 facing the interior chamber 102 is perfectly reflective to an FO, an FO is not able to pass through second filtering apparatus 110.

Note that the pins and the support apparatus may deflect or deform under stress, and may therefore also be considered to be flexible in some embodiments. In some embodiments, the first or second filtering apparatuses may be described as a fabric, a cloth, or a textile. In some embodiments, the first or second filtering apparatuses may be described as a porous plug.

The principles and considerations underlying the selection of a suitable material for bulk material 106 of first filtering apparatus 103 may also apply to bulk material 126 of second filtering apparatus 110. Bulk material 126 may be a metal, a ceramic, or a composite, for instance. Bulk material 126 may comprise carbon or graphene in some embodiments. In some embodiments, a pin of second filtering apparatus 110 may comprise a carbon nanotube. The surfaces of bulk material 126 are perfectly reflective to OI and FOs in this embodiment. As for bulk material 106, the reflectivity can be any value greater than zero in other embodiments. The range of the suitable value of the reflectivity of a bulk material of a specified apparatus, such as a first filtering apparatus or a second filtering apparatus, in regards to a specified type of object, such as a FO or an OI, depends on the geometry and size of the channels of the filtering apparatuses of the embodiments and the desired objective or desired effectiveness of the embodiment of the invention, amongst other parameters.

In accordance with some embodiments of the invention, the diameter of the reference channel of the second filtering apparatus 110 associated with the second reservoir 101 is larger than the diameter of the reference channel of the first filtering apparatus 103 associated with the first reservoir 100. Note that, due to the symmetry of the filtering apparatuses along the Y-direction, the reference channel of a given filtering apparatus associated with a first or second reservoir is identical to the reference channel of the same filtering apparatuses associated with the interior chamber 102 instead. This difference in the size of the reference channels between the first and second filtering apparatuses is accomplished by a larger cross-sectional area associated with a channel opening of the second filtering apparatus 110 to the interior chamber 102, such as the channel opening described by the interface between channel portion 127 and interior chamber 102, as well as a shorter distance of separation between adjacent channels, compared to the diameter and distance of separation of channels of the first filtering apparatus 103, such as channel 107.

The principle of operation of the apparatus shown in FIG. 10A is similar to the principle of operation of the apparatuses shown in FIG. 8, and discussed in the context of FIG. 7.

In the embodiment shown in FIG. 10A, the length of an interior pin, such as interior pin 111, along the Y-direction is sufficiently large, that the geometry and size of a middle channel, such as middle channel 128, does not substantially affect the rate of diffusion of OI in either direction through the first plane for the static boundary condition. In other embodiments, this need not be the case. In the depicted embodiment, the symmetry of the second filtering apparatus 110 about the mirroring plane of the second filtering apparatus 110 ensures that the average density of OI in the interior portion of a single channel of the second filtering apparatus 110 is equal to the average density of OI in the exterior portion of a single channel of the second filtering apparatus 110.

For a static boundary condition, for some embodiments, the density of OI in the second reservoir 101 is larger than the density of OI in the first reservoir 100. For some embodiments, the pressure of OI in the second reservoir 101 is larger than the pressure of OI in the first reservoir 100. For some embodiments, the entropy of OI in the second reservoir 101 is smaller than the entropy of OI in the first reservoir 100. For some embodiments, the average velocity of OI in the second reservoir 101 is substantially equal to the average velocity of OI in the first reservoir 100. For some embodiments, the temperature of OI in the second reservoir 101 is substantially equal to the temperature of OI in the first reservoir 100.

For the dynamic boundary condition, there is a net diffusion of OI from the first reservoir 100 into the second reservoir 101. Embodiments of the invention can therefore also be considered for applications involving pumping. As a result of the net diffusion of OI, there is a net force acting in the positive Y-direction on embodiments of the invention. Such a force may be employed to do mechanical work. This mechanical work may also be converted into electrical energy by means of an electric generator. In the case in which the OI carry charge, embodiments of the invention may be employed to produce electrical work. This electrical work may also be converted into mechanical work by means of an electric motor. Embodiments of the invention may therefore also be considered for applications involving power generation. Such applications, as well as related apparatuses and methods, are well known in the art.

In other embodiments, the role or the purpose of the FOs shown in FIG. 10A may be alternatively fulfilled by a suitable arrangement of bulk material within the interior chamber 102.

The manner in which a filtration apparatus is manufactured depends on the scale or the characteristic length of a filtration apparatus. For example, consider an application example in which the mean free path of objects of interest in a medium is about one millimeter. The characteristic width of a region of reduced cross-sectional area of a channel, such as channel 276, in an example of a filter system for such an application may be about one centimeter. Structures of this scale can be readily manufactured and mass produced using conventional mechanical manufacturing techniques, such as computer numerical controlled (CNC) mills, selective laser sintering (SLS), photolithography and etching, additive printing processes, and so on.

Embodiments of a filter apparatus for which the characteristic length is on the order of nanometers may be manufactured with semiconductor manufacturing equipment and procedures. For example, grayscale electron beam or ion beam lithography can be employed to manufacture molds with large arrays of repeating patterns of complex geometry at the nanometer scale. These molds can be employed to imprint the desired surface features on a substrate using nanoimprint lithography. This method can be employed to manufacture filter plate embodiments as shown in the examples of FIGS. 1-5, or FIG. 11, or filtering surfaces, or filtering membranes, or filtering plates, such as filtering surface 203 in FIG. 7, or filtering surface 153 in FIG. 6, for example. In another example, filter plate embodiments can be manufactured using nanometer scale additive manufacturing techniques, such as electron beam induced deposition. These and other manufacturing techniques can benefit from interference effects to manufacture the aforementioned large arrays of complex structures. These methods are known in the field of interference lithography, for example. Subtractive manufacturing techniques such as deep reactive ion etching can be employed to manufacture channels of filtration apparatuses of the type shown in FIGS. 6-10A, for example. The channel diameter can be on the order of tens of nanometers, for instance.

In FIG. 11 the distribution of initial directions, i.e. the distribution of the directions of the initial velocities of OI which interact with the filtering apparatus 900, are uniformly distributed over the range of all angles, i.e. 360 degrees. In the simplified scenario shown in FIG. 11, the distribution of initial directions for OI which enter a channel from the first reservoir 2036 is uniform. This is indicated by the uniformly distributed incident flux 2059 from the first reservoir, where the distribution is uniform over the range of possible directions indicated by the arrows within the contours of the plot of the incident flux 2059. The incident flux 2059 is measured relative to the reference line 2056. For the dynamic boundary condition the properties of the first reservoir 2036 and the second reservoir 2037 are assumed to be instantaneously identical. Accordingly, the distribution of incident flux 2060 of OI from the second reservoir 2037 as a function of the direction of the incident velocity is also uniform over all directions, as indicated by a constant magnitude of flux 2060 relative to reference line 2057.

Such a distribution of incident flux occurs in a wide variety of applications of embodiments of the invention. For example, in a typical stationary medium, i.e. a medium in which the average velocity of OI is zero, i.e. a medium in which the bulk flow is zero, the distribution of velocities of OI is uniformly distributed over all angles. This applies to atoms or molecules in gases, or electrons in the conduction bands of conductors. A filtering apparatus placed in such a stationary medium will therefore be subject to a uniform distribution of initial directions, i.e. the probability of an OI interacting with a channel or an outside surface of a filtering apparatus having an initial velocity with a specified direction is approximately equal for all directions.

For the simplified embodiment shown in FIG. 11, all of the OI which enter a channel such as channel 2039 from the first reservoir 2036 and transmitted to the second reservoir. Note that, for simplicity, it is assumed that there are no randomizing scattering events throughout the motion of an OI through the filtering apparatus. In other embodiments there can be scattering events, such as OI to OI collisions or diffuse reflections from the interior surface of a channel, such as interior surface 2047, provided that there can still be a net diffusion for a dynamic boundary condition or a net concentration, pressure, or density difference for a static boundary condition. As an OI diffuses from the first reservoir 2036 to the second reservoir 2037 through channel 2039, an OI can collide with the interior wall 2047 of a channel. Due to the angle of the wall relative to the XZ-plane, the component of the direction of motion of an OI along the Y-direction increases. This effect is shown in FIG. 11 in terms of the example trajectory of an OI, such as trajectory 2053 of OI 2052. As shown, the component of motion or of the velocity of OI 2052 in the negative Y-direction increases in magnitude with each collision with the interior surface 2047. As a result, the initially uniform distribution of velocities in the first reservoir 2036 indicated by flux magnitude 2059 as a function of direction is no longer uniform when the OI arrive in the second reservoir 2037. The initially hemispherical, uniform distribution of directions has been focused into a concentrated beam 2064 of outflow velocities. Due to the high first transmissivity and the geometric properties of the interior surface 2047 of channel 2039 the entire influx 2059, i.e. the influx 2059 integrated over all angles, has been focused into a reduced set of angles, i.e. a concentrated beam 2064.

Conversely, any influx 2060 from the second reservoir 2037 into channel 2039 with an initial angle which lies within the limited range of said beam 2064 is spread out over the entire range of possible influx angles, resulting in a reduced outflux magnitude 2061, measured relative to the same reference line 2056. Any influx 2060 from the second reservoir into channel 2039 with an initial angle which lies outside the limited range of said beam 2064 is reflected back into the second reservoir 2037, as indicated by the portion 2063 of outflux 2062 which lies outside of beam 2064. Outflux 2062 is also measured relative to reference line 2057. The scenario in which an OI from the second reservoir 2037 is reflected back into the second reservoir 2037 is exemplified by trajectory 2055 of OI 2054.

As a result, the first transmissivity is larger than the second transmissivity. In some embodiments, the ratio of the first transmissivity to the second transmissivity is sufficiently large, that the ratio of the product of the first transmissivity and the first capture area, i.e. the area of first opening 2041 in the XZ-plane, to the product of the second transmissivity and the second capture area, i.e. the area of the second opening 2042, is greater than one, despite the first capture area being smaller than the second capture area. In some such embodiments, therefore, there is a net diffusion of OI from the first reservoir 2036 to the second reservoir 2037 for a dynamic boundary condition, or a larger concentration, density, or pressure of OI in the second reservoir 2037 relative to the first reservoir 2036.

For a dynamic boundary condition, there is a net flow 1040 of objects of interest through the filtering apparatus 900, or 1000, from the first reservoir 2036 into the second reservoir 2037. The filtering apparatus 900 comprises a bulk material 2065, a first surface 2046, several channels, such as channel 2039, each channel comprising a first opening 2041 or 1006 and a second opening 2042 or 1008 and an interior surface 2047. In the depicted embodiment, the majority of interactions between the objects of interest and the boundaries of the channel, i.e. the interior surface 2047, can be described as specular reflections. In some such embodiments, more than 50% of said interactions can be described as specular reflections. In some such embodiments, more than 90% of said interactions can be described as specular reflections. In some such embodiments, more than 30% of said interactions can be described as specular reflections.

Note that the effective aperture of first opening 2041 to the second reservoir 2037 is described by the cross-sectional area of beam 2064 along the length of the beam, which is cone shaped in this example. The effective aperture of first opening 2041 to the first reservoir 2036 is described by the cross-sectional area of outflux 2061, which is almost hemispherical in this example. For the dynamic boundary condition, therefore, the aperture in the second reservoir is smaller than the aperture in the first reservoir, resulting in a net diffusion of OI from the first reservoir to the second reservoir.

Figure 12:
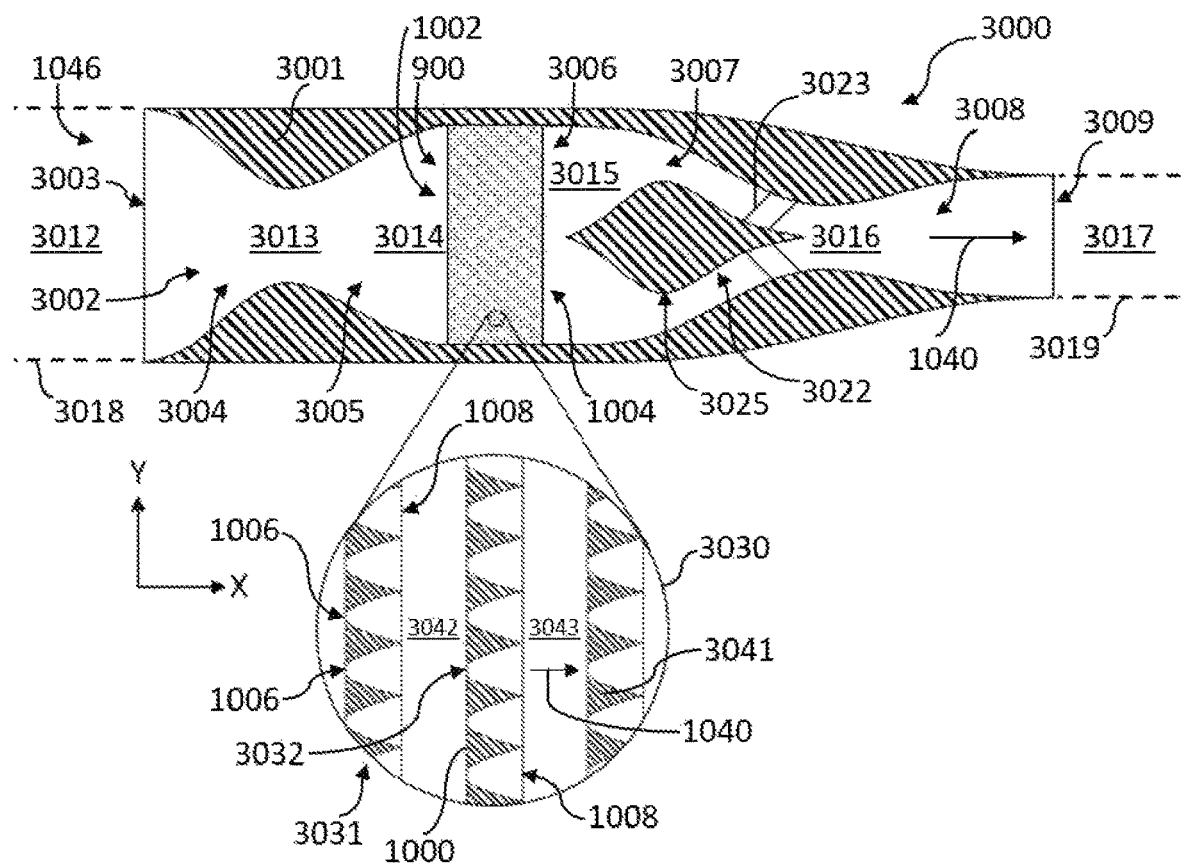
FIG. 12 is a cross-sectional view of an application of an embodiment of the invention in a supersonic ramjet engine.

FIG. 12 is a cross-sectional view of an application of an embodiment of the invention in a supersonic ramjet engine.

Engine 3000 can be employed to produce thrust by interacting with gas molecules, such as air molecules, for example. Engine 3000 comprises a first inlet 3003, a first contraction 3004, a first expansion 3005, a filtering apparatus 3006, also referred to as a filtering apparatus 900, a second contraction 3007, a second expansion 3008 and an exit 3009. During nominal, supersonic flight, an inflow streamtube 3018 and an outflow streamtube 3019 is incident on or emitted by stagnation points of the leading edge 3010 and trailing edge 3011, respectively.

Engine 3000 comprises a channel 3002 bounded by bulk material 3001 and located between inlet 3003 and outlet 3009. Engine 3000 can be configured to operate in air, for example. The exterior surface 3020 and the interior surface 3021 of the engine describe axially symmetric and concentric surfaces in this simplified embodiment, with the axis of symmetry being parallel to the X-axis, and being referred to as the "central axis".

A translating spike 3022 with external surface 3025 is configured to regulate the flow rate through the engine 3000 and thus regulate the amount of thrust produced. The translating spike 3022 can be moved by hydraulic or electric actuators along the central axis to increase or reduce the cross-sectional area of the channel 3002 from an open position to a closed position in a continuously variable fashion. Support struts, such as support strut 3023 provide structural support to the translating spike. The flow direction during nominal operation is indicated by arrow 1040.

Filtering apparatus 3006 is configured in accordance with the invention. For example, filtering apparatus 3006 can comprise several layers of filtering apparatuses, such as layer 3031, arranged in series, where each filtering apparatus in a layer is arranged in a similar manner as the filtering apparatus shown in FIG. 11. In other embodiments, a filtering apparatus in a layer, such as layer 3031, can be configured in a similar manner as the filtering apparatus shown in FIGS. 1-10. Accordingly, the pressure of the medium comprising the objects of interest, e.g. the air, is increased across the filtering apparatus, such that the pressure at station 3042 is larger than the pressure at station 3014, and the pressure at station 3043 is larger than at station 3042, and the pressure at station 3015 is larger than the pressure at station 3043. There is a net diffusion of OI, e.g. air molecules, through the filtering apparatus 3006 in the direction shown by arrow 1040. Each channel system in a filter apparatus comprises a first opening, such as a first opening 3032, and a bulk material, such as bulk material 3041, as shown by enlargement 3030.

Engine 3000 can be considered to operate in a similar fashion as a conventional ramjet in other aspects. Between the free stream station 3012 and the throat 3013 supersonic flow is decelerated and the air is compressed preferably isentropically, i.e. without the production of shock waves. Between throat 3013 and station 3014 the flow is compressed and decelerated further to subsonic flow speeds. This compression between station 3012 and 3014 in an ideal ramjet is adiabatic, but in practical implementations there can be a weak shock wave stabilized between throat 3013 and station 3014, preferably close to throat 3013 to reduce losses. The flow velocity at station 3014 is reduced in order to reduce the drag associated with the filtering apparatus 3006.

The filtering apparatus is configured to increase the pressure of the gas. Due to the collisions of the OI with the downstream surface of the filtering apparatus, there is a cooling effect of the medium containing the OI as momentum of the OI is transferred to the filtering apparatus.

Following the increase in pressure at station 3015, the gas is expanded, preferably adiabatically, through a convergent and divergent nozzle. In this expansion the temperature of the gas is reduced further, such that the temperature at station 3017 is less than the temperature at station 3012, while the pressures at both stations are atmospheric pressures.

In some embodiments, the characteristic width of a channel in a filtering apparatuses can be reduced in a downstream direction throughout a combined filtering apparatus in correspondence with a reduction in the mean free path associated with an increase in density and pressure across a filtering apparatus. Alternatively the flow velocity can be increased and the density of the medium can be decreased in order to maintain the length of the mean free path above a size constraint provided by the configuration or manufacturability of the filtering apparatus.

Figure 13:
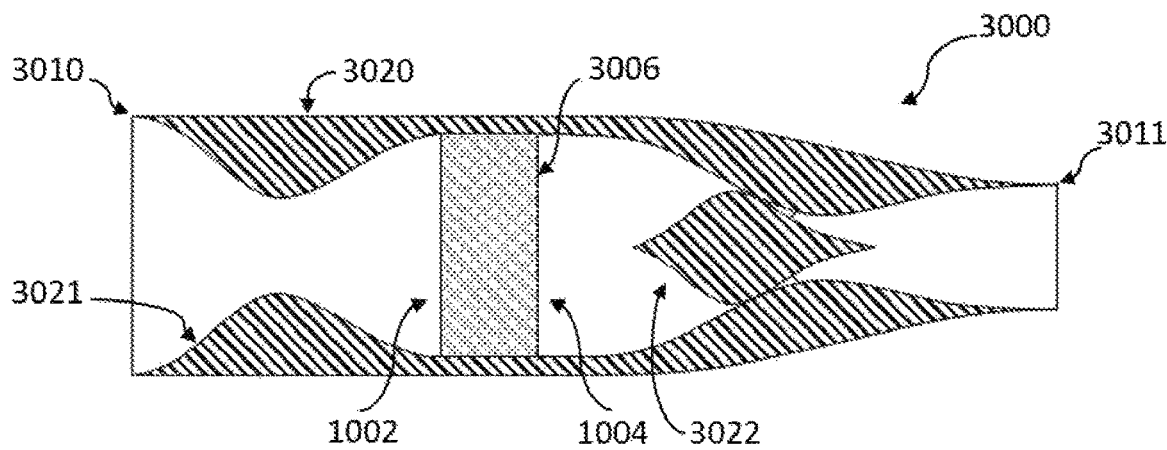
FIG. 13 is a cross-sectional view of the embodiment shown in FIG. 12 in a closed or zero-thrust configuration.

FIG. 13 is a cross-sectional view of the embodiment shown in FIG. 12 in a closed or zero-thrust configuration. In this configuration the translating spike 3022 is in a fully retracted position, resulting in a closing off of the channel 3002 and the production of zero thrust. The filtering apparatus 3006 can be considered to operate at a static boundary condition in this configuration, with a larger pressure being produced in the second reservoir 1004 than in the first reservoir 1002.

In some embodiments of the invention, the objects of interest are virtual particles, as described by quantum field theory. One can consider the quantum vacuum to be a medium comprising virtual objects, where a virtual object denotes a fluctuation in the quantum vacuum which temporarily exhibits some or all of the properties of a corresponding conventional or real object. Examples of virtual objects are virtual photons, or virtual particle-antiparticle pairs such as electrons and positrons. The quantum vacuum can instantaneously exhibit any of the properties of a particle or wave, such as mass or momentum. In the context of embodiments of the invention, no distinction is made between conventional objects, such as photons, and virtual objects, such as virtual photons. For simplicity, the term "vacuum" is used to refer to the quantum vacuum described by quantum field theory. These virtual particles give rise to the zero point energy and associated effects, such as the Casimir effect.

Embodiments of the invention which interact with the quantum vacuum can be configured as follows. The characteristic size of a filtering apparatus, the characteristic length and the characteristic width of a channel, are configured to be less than the length of 1000 mean free paths of virtual particles. In other words, the characteristic size of a filtering apparatus is configured in a manner in which the Casimir forces between components of the invention, e.g. between opposing walls of a channel, are non-negligible. In other words, the characteristic size of a filtering apparatus is configured in a manner in which the zero point energy between components of the invention, e.g. between opposing walls of a channel, is changed from the undisturbed, vacuum level of the zero point energy by a non-negligible amount.

The vacuum can be considered to consist of virtual particles, such as virtual photons, which travel a certain distance or exist of a period of time before annihilating with another virtual particle. An annihilation event can be considered to be a scattering event of an OI, as discussed herein. The average path travelled by a virtual particle, such as a virtual photon, between annihilation or extinction events can be considered to be the mean free path of a virtual particle, as discussed herein. The mean free path of virtual particles is within several orders of magnitude of one nanometer. For example, the Casimir pressure between two opposing, perfectly conducting plates is approximately equal to one atmosphere at separations of approximately 10 nanometers.

The geometry of a filtering apparatus which interacts with the quantum vacuum can be any suitable geometry discussed herein. For example, a filtering apparatus can be configured in a manner described in the context of FIGS. 1-11. Note that the distribution of initial directions of virtual particles for a static boundary condition is uniform over all angles, as described in the context of FIG. 11. Note that, as described in the context of FIG. 11, the interaction between the virtual particles and the boundary of a channel system, such as interior surface 2047, can comprise specular reflections. Note that, as described in the context of FIGS. 1-10, the interactions between the virtual particles and the boundary of a channel system, such as interior surface of bulk material 245 in channel system 242, or bulk material 270 in channel system 267, or the bulk material 156 or 162 in FIG. 6, of filtered objects, such as filtered object 227 in FIG. 7, or filtered object 136 in FIG. 10A, can also comprise diffuse reflections or can be described as scattering events. In the following paragraphs, for convenience and clarity of description, the example embodiment which will be discussed is an embodiment configured in a similar manner as the embodiment in FIG. 11.

All surfaces of bulk material of the filtering apparatus, such as bulk material 2065 or bulk material 270, are perfectly conducting in this embodiment. In other embodiments, this need not be the case. Bulk material 270 may be a superconducting material, or a conventionally conducting material such as metal, a semiconductor such as silicon, or an insulator such as glass. In other embodiments, the surface of bulk material may also be coated in a different material with intended properties. If the minimization of an objective favors a high electrical conductivity, coating materials such as copper, silver, or graphene may be used. The bulk material is neutrally charged in this simplified embodiment. In the case in which the bulk material 270 is a metal, a metal with a large plasmon frequency, such as Aluminium, can be used. This ensures that the range of frequencies over which the reflectivity of the bulk material is greater than zero is maximized, which ensures that the filtering apparatus can interact with a wide range of frequencies of virtual particles such as virtual photons, such that the thrust or axial pressure is maximized.

For a dynamic boundary condition, virtual objects can interact with the filtering apparatus in a manner in which there is a net diffusion of virtual objects in the negative Y-direction for the embodiment shown in FIG. 11. This can result in a net force on the filtering apparatus in the positive Y-direction. The value of this force per unit area in the XZ-plane is denoted the axial pressure. For example, when the virtual particles are virtual photons, the origin of this axial pressure is the radiation pressure of virtual photons which are redirected or focused by the filtering apparatus within the mean free path of these virtual photons, as exemplified by trajectory 2053 and trajectory 2055 in FIG. 11. The radiation pressure of virtual objects acting on the surfaces of the filtering apparatus, such as surface 2047 can give rise to a net force or a net axial pressure along the Y-direction. The value of the zero point energy can be considered to be larger in channel 2039 compared to the baseline, undisturbed vacuum, resulting in a pressure on the interior surface 2047 which is larger than the pressure due to a lower, baseline, undisturbed vacuum level of the zero point energy on surface 2046. The zero-point energy can be considered to be the energy associated with virtual objects. The size and shape of a channel, as well as other parameters, such as the conductivity of the bulk material, affect the magnitude of this axial pressure.

When all portions of the finite surface are subjected to an unmodified vacuum, an embodiment of the invention may be configured to produce a net axial pressure. In other embodiments, other portions of the surface of a finite volume need not be subjected to an unmodified vacuum as defined by the vacuum of the default boundary condition. In general, the bulk material may be configured in a manner in which the zero-point energy of the medium in the proximity of one incremental surface element of the bulk material is not equal to the zero-point energy of the medium in the proximity of another incremental surface element of the bulk material. Such differences in zero-point energy may result in differences in the stress on said surfaces. In accordance with the invention, when integrated over the entire surface of the bulk material, such differences in stress may give rise to a net force on the volume of the bulk material enclosed by said surfaces.

The magnitude and direction of the axial pressure for a particular geometry and size of an apparatus unit can be calculated using methods known in the art. For example, such methods have been developed for calculating the Casimir interaction between two bodies of arbitrary geometry. These algorithms can be adapted to the types of geometries provided in or within the scope of the invention. The appropriate geometry and size of an embodiment for a particular application can be found using standard optimization techniques.

There are a wide variety of applications of such an apparatus. For example, the axial pressure may be used to do mechanical work, which may be converted into electrical energy by an electric generator. Embodiments of the invention can also be considered for applications involving the pumping of zero-point energy. Consider a scenario in which the depicted apparatus forms an interface between two otherwise isolated reservoirs. In such cases, embodiments of the invention can be employed to decrease the zero-point energy in a first reservoir and increase it correspondingly in a second reservoir. The first and second reservoirs are assumed to be finite in size, and are assumed to initially be at the default boundary condition, i.e. the zero-point energy in the first and second reservoirs is initially substantially equal to the zero-point energy of free space. Over time, the embodiment of the invention will reduce the zero-point energy in the first reservoir, and increase the zero-point energy in the second reservoir correspondingly. Eventually, a new steady-state configuration is reached, in which the zero-point energy in any reservoir is approximately constant in time.

Filtering apparatuses configured to interact with the quantum vacuum have a wide variety of applications. For example, such filtering apparatuses can be configured to produce thrust by interacting with and inducing a bulk flow of virtual particles. For instance, such embodiments can be configured in a similar manner as the embodiment shown in FIG. 12 and FIG. 13, where the medium 1046 is a vacuum as opposed to a gas. Accordingly, such an engine can be configured to produce thrust in the vacuum of space. Embodiments of the invention can therefore be used to power or propel spacecraft or rockets. In such applications, the filtering apparatus can be mounted in place of conventional, chemical rockets on the spacecraft or rockets, for example. As discussed in the context of FIG. 12, a translating spike, such as translating spike 3022, can be used to regulate the flow rate of the virtual particles through the engine. The bulk material 3001 can be configured in a similar manner as the bulk material of the filtering apparatus which interacts with the virtual particles, as discussed. In other embodiments, a different type of valve or flow regulator can be employed to regulate the flow rate or the rate of diffusion of virtual particles or gas molecules through channel 3002. For example, the outlet 3009 can comprise a moveable nozzle which can constrict the cross-sectional area when viewed along the central axis.

A filtering apparatus which interacts with the quantum vacuum or any other type of medium can also be mounted on a rotating shaft of an electric generator, and apply a torque on the shaft. Thus a filtering apparatus can be employed to turn the shaft and apply power to the electric generator, which can convert the power into electricity. In such configurations, the filtering apparatus can perform the same function and be arranged similarly as a turbine blade on a wind turbine. The normal or the Y-axis of the filtering apparatus can be configured perpendicularly to the local flow of OI relative to the filtering apparatus. Note that the filtering apparatus can produce thrust or deliver power to the electric generator even when there is no net bulk flow or no wind.

A filtering apparatus which interacts with the quantum vacuum can also be enclosed in a protective casing. For example, this casing can close off inlet 3003 and outlet 3009. The casing is configured to be transparent to virtual particles to a greater extent than bulk material 3001, such that virtual particles can still move through the protective casing. The casing can be configured to prevent or reduce contamination or blockage of individual channels of a filtering apparatus by other objects, such as air molecules, dust particles, or aerosols. The casing material can be any material with the aforementioned properties. For example, the casing material can be fiberglass or any other material with a high transmissivity for electromagnetic radiation. The casing material can also be a metal, provided the transmissivity of virtual particles through the metal of the casing is larger than the transmissivity of the virtual particles through the bulk material of the filtering apparatus, such as bulk material 3041.

Figure 14:
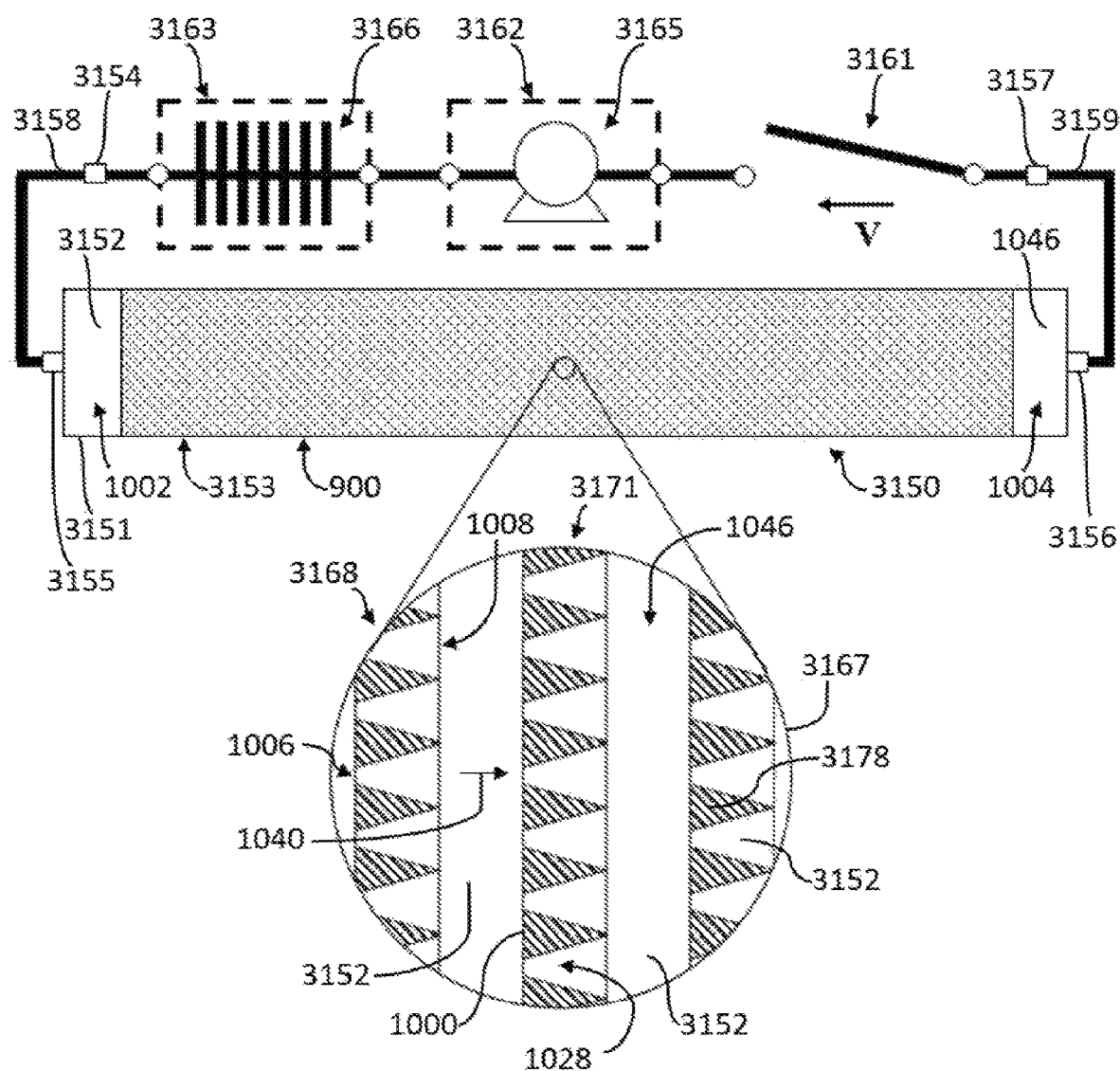
FIG. 14 is a cross-sectional view of an application of an embodiment of the invention in an electrical current source.

FIG. 14 is a cross-sectional view of an application of an embodiment of the invention in an electrical power supply.

A filtering apparatus 3153 is embedded within a conductor 3151 and configured to interact with electrons as objects of interest. The bulk material 3178 of the filtering apparatus can be a material with a lower electrical conductivity compared to bulk material 3152 of the conductor 3151, i.e. the medium in which the electrons are moving primarily. As shown by enlargement 3167, the filtering apparatus comprises several layers of filtering apparatuses arranged in series, such as layer 3171 or layer 3168, where each layer comprises a filtering apparatus configured in a similar manner as the filtering apparatus shown in FIG. 11, where each layer comprises channels, such as channel 1028. In other embodiments, a filtering apparatus in a layer, such as layer 3171, can be configured in a manner described in the context of FIGS. 1-10. In such layers, second reservoir of a first filtering apparatus or filtering system can be identical to the first reservoir of a second filtering apparatus located downstream of the first filtering apparatus for a dynamic boundary condition, for example. In some embodiments, electrical conductor 3151 can comprise a liquid, such as an electrolyte, which can comprise impurities, such as electrically insulating particles, where the impurities correspond to the filtered objects, such as filtered object 136 in FIG. 10A. In some embodiments, the electrical charge carriers can also comprise ions, such as Lithium ions or Sodium ions, which are configured to diffuse through a gas, a liquid, or a solid medium and through a filtering apparatus. The direction of bulk flow 1040 of electrons is in the positive X-direction, towards the right side of the page, for a dynamic boundary condition.

The filtering apparatus 3150 can be considered to be a current source, and electrical contacts 3154 and 3157 can be considered to form the terminals of the current source. Filtering apparatus 3150 can also be considered to be a battery. The energy for the current source, i.e. for the flow of electrons or the accumulation of electrons at the terminals of the current source is provided by the thermal energy of the electrons and any material in thermal contact with the electrons, such as bulk material 3152 of conductor 3151. Note that bulk material 3152 is in thermal contact with the electrons contained within bulk material 3152 via phonon-electron collisions, i.e. collisions between electrons and the atoms of the lattice of the bulk material 3152. The electrical contacts are connected to the conductor by electrical conductors, such as electrical conductors 3158, 3159, and contacts 3155 and 3156.

In the particular application shown, there is a switch 3161 which can also be used to regulate the current flow of the current source using pulse width modulation, for example. In some embodiments the switch 3161 comprises transistors or other electronic devices suitable for modulating or regulating current or voltage.

In a static boundary condition, i.e. when the switch 3161 is in an open position, there is a larger concentration of electrons at station 3184 and contact 3156 than at station 3181 and contact 3155 due to the action of the filtering apparatus. Within the filtering apparatus, the concentration of electrons at station 3183 is larger than the concentration at station 3182. This is due to the high transmissivity of electrons diffusing from station 3182 to station 3183 through the channels of the filtering apparatus in the positive X-direction, and the comparatively lower transmissivity of electrons diffusing from station 3183 to station 3182, as discussed in the context of FIG. 14. Thus there is a voltage difference "V" across the terminals of the open circuit.

In a dynamic boundary condition, the circuit is closed and electrons are allowed to flow through a load 3162. The load 3162 can be a resistor, a computer, a smartphone, or other device which nominally consumes electrical power, for example. In the embodiment shown, the load 3162 is an electric motor 3165 configured to do mechanical work. Since the energy associated with the bulk flow of electrons through the conductors is provided by the thermal energy of the electrons, the thermal energy needs to be replenished for continuous, steady state operation. Due to the electrons doing external work, i.e. work on the environment, in load 3162, the temperature of the electrons having flown through the load 3162 is lower than the nominal temperature at station 3181 for the corresponding static boundary condition. The replenishment of electron thermal energy can be enhanced by a heat exchanger 3163, which, in the depicted embodiment comprises several metal plates 3166 configured to extract heat from the environment, such as the atmosphere, or the room in which the heat exchanger 3163 is located. The heat exchanger 3163 can recover thermal energy from the environment via conduction, forced or natural convection, or thermal radiation, for example.

In some embodiments, the load 3162 and the heat exchanger 3163 are identical. For example consider a simplified scenario in which no work is done by the electrons on the environment, and no energy is transferred from the environment to the electrical circuit, and vice versa. In this example, the load resistor can be thermally insulated, for example. The electrons within the circuit can be considered to be in an isolated system. In this system the electrons diffusing from station 3181 to station 3184 will experience a reduction in temperature and an increase in electrical potential energy. The higher electrical potential at station 3184 is due to a larger concentrations of electrons at station 3184 than at station 3181. In other words, the thermal energy of the electrons is converted into electrical potential energy. When the electrons subsequently flow from station 3184 to station 3181 through the load resistor, the electrical potential energy is converted into thermal energy due to Joule heating. This thermal energy is returned to the electrons in the load resistor and at station 3181 via thermal conduction. In the steady state, all of the electrical potential energy per unit time transferred by the electrons to a load resistor in the form of Joule heating is returned to the electrons via thermal conduction in this simplified example. In this simplified example, therefore, the circuit comprising the filtering apparatus 3151 will comprise a finite current which will continue to flow continuously in the steady state.

Note that, in some embodiments the diffusion of electrons from station 3181 to station 3184 of larger electron concentration and larger electrical potential energy is not adiabatic, and thermal energy will be conducted to the electrons at station 3184 from other portions of the electrical circuit, such as the load resistor. The thermal energy can be conducted via conductor 3159 or conductor 3154 for example. In some embodiments, the increase in concentration of electrons at station 3184 compared to station 3181 is an isothermal process as opposed to an adiabatic process being discussed in the aforementioned simplified example. The general principles remain unchanged, however.

Figure 15:
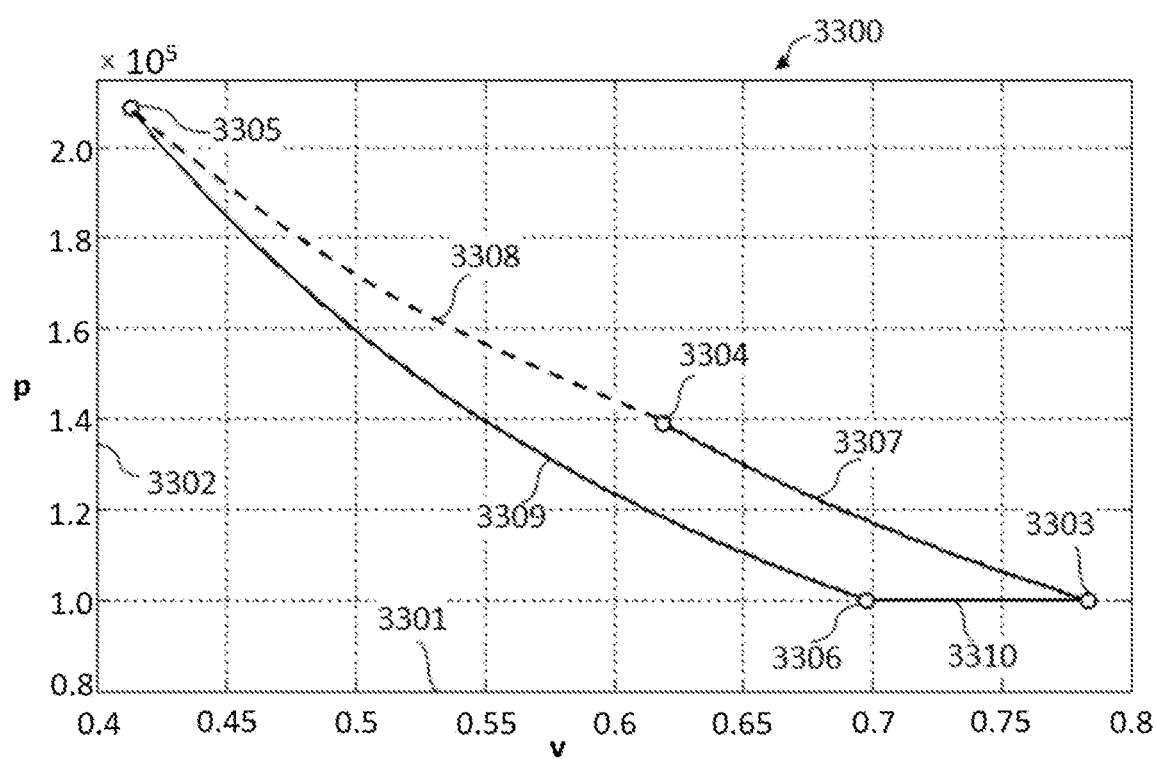
FIG. 15 is a plot of the value of pressure versus specific volume of air which passes through an example embodiment of the invention, such as the example embodiment shown in FIG. 12.

FIG. 15 is a plot of the value of pressure 3302 versus specific volume 3301 of air which passes through an example embodiment of the invention, such as the example embodiment shown in FIG. 12.

The thermodynamic cycle in plot 3300 shows a first point 3303, a second point 3304, a third point 3305, and a fourth point 3306. The fifth point and the first point are coincident. Following an adiabatic compression 3307, a gas at free stream condition 3303 encounters a filtering apparatus configured in accordance with the invention, within which the gas is compressed isothermally, as shown by dashed line 3308. Note that this isothermal compression occurs passively, and does not extract work from, or deliver work to, the gas, in this particular example. The gas is subsequently expanded adiabatically 3309. At station 3306, the gas is expelled into the free stream at free stream pressure. In the free stream the gas is heated isobarically 3310. The gas at station 3306 is colder than at station 3303, and the net mechanical work produced by the cooling of the gas is the difference in the work of adiabatic expansion 3309 and adiabatic compression 3307.

Stations 3303, 3304, 3305, and 3306 can be considered to correspond to stations 3012, 3014, 3015, and 3017, respectively, in FIG. 12 for a subset of embodiments.

Other thermodynamic cycles, such as closed cycles or cycles involving isochoric or isothermal compression or expansion as opposed to adiabatic compression or expansion, employing filtering apparatuses configured in accordance with the invention can be readily constructed by those with ordinary skill in the art. The values of the pressures for this cycle are arbitrary and chosen for illustrative purposes, and are not intended to limit the scope of the invention.

Aspects of the Invention

The invention is further defined by the following aspects.

Aspect 1. A filtration apparatus, wherein the filtration apparatus comprises: a channel system, wherein the channel system is configured to interact with objects of interest in a medium in a manner in which the component of transmissivity of objects of interest in a first direction is larger than the component of transmissivity of the same objects of interest in a second direction, wherein the difference in transmissivity is provided by a smaller effective aperture on the side of a filtering surface facing in the first direction compared to the effective aperture on the side of the filtering surface facing in the second direction, wherein the difference in the effective apertures is provided by the geometry of a channel system within the filtering apparatus Aspect 2. The filtration apparatus of aspect 1, wherein the medium can be a solid, or a fluid, such as a gas, liquid, or plasma Aspect 3. The filtration apparatus of aspect 1, wherein the set of objects of interest comprise an atom, a molecule, a dust particle, an aerosol, a charged particle, such as a proton, an electron, or a positively or negatively charged ion Aspect 4. The filtration apparatus of aspect 1, wherein the set of objects can comprise a wave or wavelike particles, such as photons, phonons, electrons, or acoustic waves Aspect 5. The filtration apparatus of aspect 1, wherein the set of objects of interest can comprise virtual particles, such as a virtual photon, virtual electron, or virtual positron Aspect 6. The filtration apparatus of any one of aspects 1 to 5, for preferentially transmitting objects of interest, wherein the filtration apparatus comprises: a channel system comprising at least one channel; a channel disposed within the channel system, extending from at least one first opening at a first reservoir to at least one second opening at a second reservoir, and facilitating the diffusion of objects of interest through the channel from the first reservoir to the second reservoir; a region of reduced cross-sectional area disposed within the channel, wherein the cross-sectional area is viewed along the length of the channel; and wherein the minimum characteristic width of the reduced cross-sectional area is measured perpendicular to the length of the channel and is less than 1000 times the mean free path of objects of interest at that location; a first gradient segment disposed within the channel, wherein the first gradient segment extends from the region of reduced cross-sectional area towards a region of increased cross-sectional area in the direction of the first reservoir; and a second gradient segment disposed within the channel, wherein the second gradient segment extends from the region of reduced cross-sectional area towards a region of increased cross-sectional area in the direction of the second reservoir, and wherein the increase in the cross-sectional area of the channel per unit length of the channel in the second gradient segment is less than the increase in the cross-sectional area of the channel per unit length of the channel in the first gradient segment Aspect 7. The filtration apparatus of aspect 6, wherein at least a portion of the interactions between the objects of interest and the interior boundary surfaces of the channel system or force fields of the filtration apparatus comprise, or can be described as, diffuse reflections or scattering events Aspect 8. The filtration apparatus of aspect 7, wherein the majority of interactions between the objects of interest and the interior boundary surfaces of the channel system or force fields of the filtration apparatus comprise, or can be described as, diffuse reflections or scattering events Aspect 9. The filtration apparatus of aspect 6, wherein at least a portion of the interactions between the objects of interest and the interior boundary surfaces of the channel system or force fields of the filtration apparatus comprise, or can be described as, specular reflections Aspect 10. The filtration apparatus of aspect 9, wherein the majority of interactions between the objects of interest and the interior boundary surfaces of the channel system or force fields of the filtration apparatus comprise, or can be described as, specular reflections Aspect 11. The filtration apparatus of aspect 6, wherein the region of reduced cross-sectional area comprises a channel of constant cross-sectional area Aspect 12. The filtration apparatus of aspect 6, wherein the increase in the cross-sectional area of the channel per unit length of the channel in the first gradient segment is infinite Aspect 13. The filtration apparatus of aspect 6, wherein the increase in the cross-sectional area of the channel per unit length of the channel in the first gradient segment is finite Aspect 14. The filtration apparatus of aspect 6, wherein the length of the second gradient segment along the length of the channel is larger than one thousandth of the mean free path of objects of interest in an adjacent reservoir Aspect 15. The filtration apparatus of aspect 14, wherein the length of the second gradient segment along the length of the channel is larger than 1000 times the mean free path of objects of interest in an adjacent reservoir Aspect 16. The filtration apparatus of aspect 6, wherein the surface normal of the surface of the filtering apparatus facing a first reservoir adjacent to a first opening is directed away from the first opening Aspect 17. The filtration apparatus of aspect 6, wherein the width of the reduced cross-sectional area is less than 100 times the collisional diameter of an object of interest Aspect 18. The filtration apparatus of aspect 17, wherein the width of the reduced cross-sectional area is less than 5 times the collisional diameter of an object of interest Aspect 19. The filtration apparatus of aspect 17, wherein the width of the reduced cross-sectional area is less than 2 times the collisional diameter of an object of interest Aspect 20. The filtration apparatus of aspect 6, wherein the second gradient segment can comprise segments of constant cross-sectional area along the length of the channel, wherein the width of at least one segment of constant cross-sectional area along the length of a channel is less than 1000 times the mean free path of an object of interest within the channel Aspect 21. The filtration apparatus of aspect 21, wherein the length of a segment of constant cross-sectional area along the length of a channel is less than 1000 times the mean free path of an object of interest within the channel Aspect 22. The filtration apparatus of aspect 6, wherein the first gradient segment can comprise segments of constant cross-sectional area along the length of the channel Aspect 23. The filtration apparatus of aspect 6, wherein the first and second reservoir are identical Aspect 24. The filtration apparatus of aspect 6, wherein adjacent channels in a channel system are arranged in parallel and in a planar array, the filtering apparatus thereby comprising a filtering surface Aspect 25. The filtration apparatus of aspect 24, wherein adjacent filtering surfaces are arranged in series, the filtering apparatus thereby comprising layers of filtering surfaces, wherein the layers are located sequentially between the first and second reservoirs Aspect 226. The filtration apparatus of aspect 25, wherein adjacent channels in a channel system are arranged in series Aspect 26. The filtration apparatus of any one of aspects 6 to 25, and 226, wherein the filtering apparatus comprises a porous bulk material, wherein the regions within the porous material which are accessible to the objects of interest provide a network of interconnected channels, and wherein a single channel describes the shortest path of an object of interest between the first and second reservoirs through the filtering apparatus for a given location within the filtering apparatus, the channels thereby forming a channel system Aspect 27. The filtration apparatus of aspect 26, wherein a filtering surface, such as a filtering plate, or a filtering membrane, is located between the porous bulk material and the first reservoir Aspect 28. The filtration apparatus of aspect 27, wherein the width of a channel of the filtering surface is smaller than the average width of a channel in the porous bulk material, the transition from the filtering surface to the porous bulk material thereby forming a second gradient segment Aspect 29. The filtration apparatus of aspect 27, wherein the filtering surface comprises several channels arranged in parallel in planar fashion Aspect 30. The filtration apparatus of aspect 29, wherein the channels are of substantially constant cross-sectional area along the length of the channels Aspect 31. The filtration apparatus of aspect 29, wherein the cross-sectional area of the channels along the length of the channels increases in the direction of the second reservoir, thereby forming a second gradient segment within the filtering surface Aspect 32. The filtration apparatus of aspect 27, wherein the average width of a channel in the porous bulk material is constant throughout the porous bulk material Aspect 33. The filtration apparatus of aspect 26, wherein a filtering surface is located between the porous bulk material and the second reservoir Aspect 34. The filtration apparatus of aspect 33, wherein the width of a channel of the filtering surface is larger than the average width of a channel in the porous bulk material, the transition from the porous bulk material to the filtering surface thereby forming a second gradient segment Aspect 35. The filtration apparatus of aspect 33, wherein the filtering surface comprises several channels arranged in parallel in planar fashion Aspect 36. The filtration apparatus of aspect 35, wherein the channels are of substantially constant cross-sectional area along the length of the channels Aspect 37. The filtration apparatus of aspect 35, wherein the cross-sectional area of the channels along the length of the channels increases in the direction of the second reservoir, thereby forming a second gradient segment within the filtering surface Aspect 38. The filtration apparatus of aspect 33, wherein the average width of a channel in the porous bulk material is approximately constant throughout the porous bulk material Aspect 39. The filtration apparatus of aspect 26, wherein the average width of a channel in the porous bulk material increases throughout at least a portion of the porous bulk material in the direction of the second reservoir, thereby forming a second gradient segment within the porous bulk material Aspect 40. The filtration apparatus of any one of aspects 6 to 25, and 226, wherein the filtering apparatus comprises an interior region comprising filtered objects, wherein the portions of volume within the interior region which are accessible to the objects of interest provide the channel system, and wherein a single channel describes the shortest path of an object of interest between the first and second reservoirs through the interior region for a given location within the interior region Aspect 41. The filtration apparatus of aspect 40, wherein the filtered objects are at least partially contained by a body force generating system, wherein the body force generating system is configured to generate a field within which a force is acting on the filtered objects Aspect 42. The filtration apparatus of aspect 41, wherein the body force per unit mass acting on the filtered objects is electrical in nature Aspect 43. The filtration apparatus of aspect 42, wherein the body force per unit mass generating apparatus comprises collections of charge Aspect 44. The filtration apparatus of aspect 42, wherein the filtered objects carry a net charge Aspect 45. The filtration apparatus of aspect 42, wherein the filtered objects carry an induced or permanent electric dipole Aspect 46. The filtration apparatus of aspect 41, wherein the body force per unit mass acting on the filtered objects is magnetic in nature Aspect 47. The filtration apparatus of aspect 46, wherein the body force per unit mass generating apparatus comprises permanent magnets Aspect 48. The filtration apparatus of aspect 46, wherein the body force per unit mass generating apparatus comprises current carrying conductors configured to generate a magnetic field and a magnetic force acting on the filtered objects Aspect 49. The filtration apparatus of aspect 48, wherein the conductors are superconducting Aspect 50. The filtration apparatus of aspect 46, wherein the filtered objects carry a permanent or induced magnetic dipole Aspect 51. The filtration apparatus of aspect 41, wherein the body force per unit mass acting on the filtered objects is gravitational or inertial in nature Aspect 52. The filtration apparatus of aspect 51, wherein the specific heat capacity at constant pressure of the filtered objects is different to the specific heat capacity at constant pressure of the objects of interest Aspect 53. The filtration apparatus of aspect 40, wherein the filtered objects are at least partially contained by a filtering membrane, a filtering surface, or a filtering plate Aspect 54. The filtration apparatus of aspect 53, wherein a filtering surface is located between the interior region and the first reservoir, and configured to reduce the passage of filtered objects from the interior region into the first reservoir Aspect 55. The filtration apparatus of aspect 54, wherein the width of a channel of the filtering surface is smaller than the average width of a channel in the interior region, the transition from the filtering surface to the interior region thereby forming a second gradient segment Aspect 56. The filtration apparatus of aspect 54, wherein the filtering surface comprises several channels arranged in parallel in planar fashion Aspect 57. The filtration apparatus of aspect 56, wherein the channels are of substantially constant cross-sectional area along the length of the channels Aspect 58. The filtration apparatus of aspect 56, wherein the cross-sectional area of the channels along the length of the channels increases in the direction of the second reservoir, thereby forming a second gradient segment within the filtering surface Aspect 59. The filtration apparatus of aspect 54, wherein the average width of a channel in the interior region is constant throughout the interior region Aspect 60. The filtration apparatus of aspect 53, wherein a filtering surface is located between the interior region and the second reservoir, and configured to reduce the passage of filtered objects from the interior region into the second reservoir Aspect 61. The filtration apparatus of aspect 60, wherein the width of a channel of the filtering surface is larger than the average width of a channel in the interior region, the transition from the interior region to the filtering surface thereby forming a second gradient segment Aspect 62. The filtration apparatus of aspect 61, wherein filtering surface comprises several protrusions directed towards the interior region, wherein the spacing between the protrusions is configured to reduce the rate of flow of filtered objects from the interior regions into the second reservoir Aspect 63. The filtration apparatus of aspect 60, wherein the filtering surface comprises several channels arranged in parallel in planar fashion Aspect 64. The filtration apparatus of aspect 63, wherein the channels are of substantially constant cross-sectional area along the length of the channel Aspect 65. The filtration apparatus of aspect 63, wherein the cross-sectional area of the channels along the length of the channels increases in the direction of the second reservoir, thereby forming a second gradient segment within the filtering surface Aspect 66. The filtration apparatus of aspect 60, wherein the average width of a channel in the interior region is constant throughout the interior region Aspect 67. The filtration apparatus of aspect 40, wherein the average width of a channel in the interior region increases throughout at least a portion of the interior region in the direction of the second reservoir, thereby forming a second gradient segment within the interior region Aspect 68. The filtration apparatus of any one of aspects 6 to 25, and 226, wherein a first channel opening and a second channel opening are exclusively diffusively connected by a single, continuous channel Aspect 69. The filtration apparatus of aspect 68, wherein a channel is disposed within a bulk material Aspect 70. The filtration apparatus of any one of aspects 6 to 25, and 226, wherein the filtering apparatus comprises a first filter surface, a filtering membrane, or a filtering plate, wherein the first filter surface comprises a first surface directed towards a first reservoir, and a second surface directed towards a second reservoir, and at least a second filter surface, wherein the second filter surface comprises a first surface directed towards a first reservoir, and a second surface directed towards a second reservoir, wherein the second surface of the first filter surface and the first surface of the second filter surface are facing each other, thereby forming an interior volume, and wherein the separation distance between these two surfaces is less than 1000 times the mean free path of an object of interest at that location, wherein the channels within the filtering surfaces and the interior volume form a channel system Aspect 71. The filtration apparatus of aspect 70, wherein the width of a channel of the second filtering surface is larger than width of a channel in the first filtering surface, the transition from the interior volume through a channel in the second filtering surface and into an adjacent volume or reservoir thereby forming a second gradient segment Aspect 72. The filtration apparatus of aspect 70, wherein the distance of separation between the second surface of the first filter surface and the first surface of the second filter surface is larger than the width of a channel in the first filtering surface, the transition from the channel in a first filtering surface to the interior volume thereby forming a second gradient segment Aspect 73. The filtration apparatus of aspect 70, wherein the distance of separation between the second surface of the first filter surface and the first surface of the second filter surface is smaller than the width of a channel in the second filtering surface, the transition from the interior volume to a channel in a second filtering surface thereby forming a second gradient segment Aspect 74. The filtration apparatus of aspect 70, wherein a first or second filtering surface comprises several channels arranged in parallel in planar fashion Aspect 75. The filtration apparatus of aspect 74, wherein the channels are of substantially constant cross-sectional area along the length of the channels Aspect 76. The filtration apparatus of aspect 74, wherein the cross-sectional area of the channels along the length of the channels increases in the direction of the second reservoir, thereby forming a second gradient segment within the filtering surface Aspect 77. The filtration apparatus of any one of aspects 70 to 76, wherein the interactions between the objects of interest and the filtering surfaces comprise diffuse reflections Aspect 78. A force generating system, comprising a filtering apparatus, such as a filtering apparatus of any one of aspects 1 to 77, wherein the filtering apparatus is configured to induce a bulk flow of objects of interest, wherein a resulting force is acting on the filtering apparatus Aspect 79. The force generating system of aspect 78, wherein the force generating system is mechanically coupled to a spacecraft Aspect 80. The force generating system of aspect 80, wherein the objects of interest are virtual particles, such as virtual photons, virtual electrons, or virtual positrons Aspect 81. The force generating system of aspect 78, wherein the force generating system is mechanically coupled to an aircraft Aspect 82. The force generating system of aspect 81, wherein the objects of interest are air molecules Aspect 83. The force generating system of aspect 82, wherein the objects of interest are virtual particles, such as virtual photons, virtual electrons, or virtual positrons Aspect 84. The force generating system of aspect 78, wherein the force generating system is mechanically coupled to a ship Aspect 85. The force generating system of aspect 84, wherein the objects of interest are water molecules Aspect 86. The force generating system of aspect 84, wherein the objects of interest are air molecules Aspect 87. The force generating system of aspect 84, wherein the objects of interest are virtual particles, such as virtual photons, virtual electrons, or virtual positrons Aspect 88. The force generating system of aspect 78, wherein the force generating system is mechanically coupled to a land vehicle Aspect 89. The force generating system of aspect 88, wherein the objects of interest are air molecules Aspect 90. The force generating system of aspect 88, wherein the objects of interest are virtual particles, such as virtual photons, virtual electrons, or virtual positrons Aspect 91. The force generating system of aspect 78, wherein the force generating system is mechanically coupled to the drive shaft of an electric generator, wherein the electric generator is configured to convert mechanical work of the motion of the force generating system into electricity Aspect 92. The force generating system of aspect 78, wherein the force generating system also comprises a casing apparatus, and a valve, wherein the casing apparatus encloses the volume between the valve the filtering apparatus, wherein the valve is configured to regulate the bulk flow rate of objects of interest through the filtering apparatus, and thereby regulate the net force acting on the filtering apparatus Aspect 93. The force generating system of aspect 78, wherein at least a portion of the power applied to the bulk flow as a result of the force acting on the bulk flow and the motion of the bulk flow is provided by the thermal energy of the objects of interest Aspect 94. The force generating system of aspect 78 and aspect 93, wherein the objects of interest are electrons, wherein the force generating system applies a force to electrons, and wherein the bulk flow of electrons forms an electrical current, and wherein the force generating system is part of a current source Aspect 95. The force generating system of aspect 94, wherein the current source also comprises a heat exchanger Aspect 96. The force generating system of aspect 95, wherein the heat exchanger is configured to absorb heat from the environment and transfer the heat to the electrons which interact with the filtering apparatus Aspect 97. The force generating system of aspect 94, wherein the current source also comprises a voltage or current regulator, such as a switch or a variable resistor, wherein the voltage or current regulator can be employed to regulate the current flow rate Aspect 98. A concentration modification system, comprising: a filtering apparatus, such as a filtering apparatus of any one of aspects 1 to 97; and a casing apparatus, wherein the casing apparatus is configured to contain at least a portion of objects of interest located in an interior volume on at least one side of a filtering apparatus, and wherein the filtering apparatus is configured to induce a difference in the concentration of objects of interest in the interior volume relative to the concentration of objects of interest on the other side of the filtering apparatus Aspect 99. The concentration modification system of aspect 98, wherein the objects of interest are virtual particles, such as virtual photons, virtual electrons, or virtual positrons Aspect 100. The concentration modification system of aspect 99, wherein the concentration difference is associated with a difference in the zero point energy of the quantum vacuum.

Aspect 101. The concentration modification system of aspect 98, wherein the objects of interest are electrons Aspect 102. The concentration modification system of aspect 101, wherein the concentration difference is associated with a voltage difference Aspect 103. The concentration modification system of aspect 98, wherein the objects of interest are atoms of a fluid, such as a liquid, a gas, or a plasma Aspect 104. The concentration modification system of aspect 103, wherein the concentration difference is associated with a pressure difference Aspect 105. A method of transmitting objects of interest from a first reservoir to a second reservoir, comprising: providing the filtering apparatus of any one of aspects 1 to 77, wherein objects of interest are able to diffuse through the filtering apparatus from the first reservoir to the second reservoir Aspect 106. The method of transmitting objects of interest from a first reservoir to a second reservoir of aspect 105 comprising generating a bulk flow of objects of interest through the filtering apparatus Aspect 107. The method of transmitting objects of interest from a first reservoir to a second reservoir of aspect 106, wherein the bulk flow is from the first reservoir into the second reservoir Aspect 108. The method of transmitting objects of interest from a first reservoir to a second reservoir of aspect 105 comprising generating a difference in concentration of objects of interest between the first reservoir and the second reservoir Aspect 109. The method of transmitting objects of interest from a first reservoir to a second reservoir of aspect 108, wherein the concentration of objects of interest in the second reservoir is larger than in the first reservoir.

Aspect 110. A system comprising two or more of the filtering apparatuses of any one of aspects 1 to 77.

Aspect 111. The system of aspect 110, wherein the system comprises a planar array of the filtering apparatuses of any one of aspects 1 to 77.

Aspect 112. The system of aspect 111, wherein the system comprises a plurality of planar arrays, wherein at least one of the planar arrays are disposed in a direction normal to another planar array Aspect 113. The system of any one of aspects 110 to 112, further comprising two or more of the filtering apparatuses coupled in series Aspect 114. The system of any one of aspects 110 to 113, wherein a second opening of a first filtering apparatus is diffusively coupled to an separating volume, wherein the separating volume is diffusively coupled to the first opening of a second filtering apparatus Aspect 115. A method of transmitting objects of interest from a first reservoir to a second reservoir, comprising: providing the system of any one of aspects 110 to 114

Aspect 116. The method of transmitting objects of interest from a first reservoir to a second reservoir of aspect 115 comprising generating a bulk flow of objects of interest through the filtering apparatus Aspect 117. The method of transmitting objects of interest from a first reservoir to a second reservoir of aspect 116, wherein the bulk flow is from the first reservoir into the second reservoir Aspect 118. The method of transmitting objects of interest from a first reservoir to a second reservoir of aspect 115 comprising generating a difference in concentration of objects of interest between the first reservoir and the second reservoir Aspect 119. The method of transmitting objects of interest from a first reservoir to a second reservoir of aspect 118, wherein the concentration of objects of interest in the second reservoir is larger than in the first reservoir.

Aspect 120. The method of generating a bulk flow of objects of interest and generating a resulting force, comprising: providing the force generating system of any one of aspects 78 to 97.

Aspect 121. The method of concentrating objects of interest, comprising: providing the concentration modification system of any one of aspects 98 to 104.

Aspect 122. The filtration apparatus of any one of aspects 1 to 5, wherein a channel system comprises at least one channel which is configured to facilitate the diffusion of objects of interest from a first reservoir to a second reservoir, wherein the channel comprises: a first opening to the first reservoir; a second opening to the second reservoir; and a region of reduced cross-sectional area measured along the length of the channel, wherein the region of reduced cross-sectional area diffusively couples a first gradient segment facing the first reservoir with a second gradient segment facing the second reservoir, and wherein the increase in the cross-sectional area of the channel per unit length of the channel relative to the region of reduced cross-sectional area in the second gradient segment is less than the corresponding increase in the cross-sectional area of the channel per unit length of the channel relative to the same region of reduced cross-sectional area in the first gradient segment, and wherein the minimum characteristic width of the reduced cross-sectional area is less than 1000 times the mean free path of objects of interest in an adjacent reservoir.

Aspect 123. The filtration apparatus of any one of aspects 6 to 25, and 226, wherein at least a portion of the interactions between the objects of interest and the boundaries of the channel system comprise diffuse reflections, or scattering events Aspect 124. The filtration apparatus of aspect 123, wherein the majority of interactions between the objects of interest and the boundaries of the channel system or comprise diffuse reflections, or scattering events Aspect 125. The filtration apparatus of any one of aspects 6 to 25, and 226, wherein the majority of interactions between the objects of interest and the boundaries of the channel system comprise specular reflections, or do not comprise scattering events Aspect 126. The filtration apparatus of any one of aspects 6 to 25, and 226, wherein the increase in the cross-sectional area of the channel per unit length of the channel in the first gradient segment is infinite Aspect 127. The filtration apparatus of any one of aspects 6 to 25, and 226, wherein the first or second gradient segment can comprise segments of constant cross-sectional area along the length of the channel, wherein the characteristic width of at least one segment of constant cross-sectional area along the length of a channel is less than 1000 times the mean free path of an object of interest within the channel Aspect 128. The filtration apparatus of any one of aspects 6 to 25, and 226, wherein a channel is disposed within a bulk material, and exclusively diffusively connects one first opening to one second opening Aspect 129. The filtration apparatus of any one of aspects 6 to 25, and 226, wherein at least a portion of a channel is disposed within an interior region comprising filtered objects, wherein the channel describes the shortest path of an object of interest between the first and second reservoirs through the filtering apparatus for a given location within the filtering apparatus, and wherein the channel comprises regions within the interior region which are accessible to the objects of interest, and wherein the concentration of filtered objects within the interior region is greater than the concentration of filtered objects outside of the interior region Aspect 130. The filtration apparatus of aspect 129, wherein a filtering surface is located between the interior region and the first reservoir Aspect 131. The filtration apparatus of aspect 130, wherein the characteristic width of a channel in the filtering surface is smaller than the average characteristic width of a channel in the interior region, the transition from the filtering surface to the interior region thereby forming a second gradient segment Aspect 132. The filtration apparatus of aspect 130, wherein the cross-sectional area of a channel in the filtering surface along the length of the channel increases in the direction of the second reservoir, thereby forming a second gradient segment within the filtering surface Aspect 133. The filtration apparatus of aspect 129, wherein a filtering surface is located between the interior region and the second reservoir Aspect 134. The filtration apparatus of aspect 133, wherein the characteristic width of a channel in the filtering surface is larger than the average characteristic width of a channel in the interior region, the transition from the interior region to the filtering surface thereby forming a second gradient segment Aspect 135. The filtration apparatus of aspect 133, wherein the cross-sectional area of a channel in the filtering surface along the length of the channel increases in the direction of the second reservoir, thereby forming a second gradient segment within the filtering surface Aspect 136. The filtration apparatus of aspect 129, wherein the average width of a channel in the interior region increases throughout at least a portion of the interior region in the direction of the second reservoir, thereby forming a second gradient segment within the interior region Aspect 137. The filtration apparatus of aspect 129, wherein the filtered objects are at least partially contained by a force field, wherein a body force per unit mass acts on at least a portion of the filtered objects, and wherein the force field is provided by a body force per unit mass generating apparatus Aspect 138. The filtration apparatus of aspect 137, wherein the body force per unit mass is electromagnetic in nature Aspect 139. The filtration apparatus of aspect 137, wherein the body force per unit mass is gravitational or inertial in nature Aspect 140. The filtration apparatus of aspect 129, wherein at least a portion of the filtered objects are subject to attractive forces between neighboring filtered objects, the filtered objects thereby contributing to the bulk of a porous bulk material, and wherein the channel comprises regions within the porous bulk material which are accessible to the objects of interest Aspect 141. The filtration apparatus of any one of aspects 6 to 25, and 226, wherein a portion of the length of a channel is perpendicular to another portion of the length of the same channel Aspect 142. The filtration apparatus of any one of aspects 6 to 25, and 226, wherein the objects of interest comprise an atom, a molecule, a dust particle, an aerosol, a proton, an electron, or a positively or negatively charged ion, photons, phonons, or acoustic waves, or combinations of any of the foregoing Aspect 143. The filtration apparatus of any one of aspects 6 to 25, and 226, wherein the objects of interest comprise virtual particles, virtual photons, virtual electrons, or virtual positrons, or variations thereof, or combinations of any of the foregoing Aspect 144. The filtering apparatus of any one of aspects 6 to 25, and 226, wherein a channel system comprises a planar array of channels Aspect 145. A system comprising two or more of the filtering apparatuses of any one of aspects 6 to 25, and 226

Aspect 146. The system of aspect 145, wherein at least one of filtering apparatuses is coupled in series with another filtering apparatus Aspect 147. A method of preferentially transmitting objects of interest from a first reservoir to a second reservoir, comprising: providing a filtering apparatus of any one of aspects 6 to 25, and 226, wherein a first opening of a channel is diffusively coupled to the first reservoir, and a second opening of a channel is diffusively coupled to the second reservoir; and to thereby preferentially transmit objects of interest from the first reservoir to the second reservoir Unless specified or clear from context, the term "or" is equivalent to "and/or" throughout this paper.

The embodiments and methods described in this paper are only meant to exemplify and illustrate the principles of the invention. This invention can be carried out in several different ways and is not limited to the examples, embodiments, arrangements, configurations, or methods of operation described in this paper or depicted in the drawings. This also applies to cases where just one embodiments is described or depicted. Those skilled in the art will be able to devise numerous alternative examples, embodiments, arrangements, configurations, or methods of operation, that, while not shown or described herein, embody the principles of the invention and thus are within its spirit and scope.

What is claimed is:

1. A filtration apparatus for preferentially transmitting objects of interest, the filtration apparatus comprising:
    a channel system comprising at least one channel extending from at least one first opening at a first reservoir to at least one second opening at a second reservoir, the at least one channel configured to facilitate diffusion of objects of interest through the at least one channel from the first reservoir to the second reservoir and through the at least one channel from the second reservoir to the first reservoir;
    a particular channel of the at least one channel having a region of reduced cross-sectional area disposed along a length of the particular channel, the reduced cross-sectional area having a minimum characteristic width perpendicular to the length and having less than 1000 times a mean free path of an object of interest;
    the particular channel having a first gradient segment extending from the region of reduced cross-sectional area towards a first region of increased cross-sectional area in a direction of the first reservoir, the first gradient having a first increase in cross-sectional area per unit length;
    the particular channel having a second gradient segment extending from the region of reduced cross-sectional area towards a second region of increased cross-sectional area in a direction of the second reservoir, the second gradient segment having a second increase in cross-sectional area per unit length less than the first increase in cross-sectional area per unit length in the first gradient segment;
    the first reservoir having a first number density of objects of interest, the second reservoir having a second number density of objects of interest, the second number density being different than the first number density for a static boundary condition, at least a portion of a difference between the first number density and the second number density being a result of interaction of objects of interest with boundaries of the particular channel.

2. The filtration apparatus of claim 1, wherein at least a portion of interactions between the objects of interest and the boundaries of the particular channel comprise diffuse reflections or scattering events.

3. The filtration apparatus of claim 2, wherein a majority of interactions between the objects of interest and the boundaries of the particular channel comprise diffuse reflections or scattering events.

4. The filtration apparatus of claim 1, wherein a majority of interactions between the objects of interest and the boundaries of the particular channel comprise specular reflections or do not comprise scattering events.

5. The filtration apparatus of claim 1, wherein the first increase in cross-sectional area per unit length in the first gradient segment is infinite.

6. The filtration apparatus of claim 1, wherein the first gradient segment or the second gradient segment has one or more segments of substantially constant cross-sectional area, a characteristic width of at least one segment of the one or more segments of substantially constant cross-sectional area being less than 1000 times the mean free path of an object of interest.

7. The filtration apparatus of claim 1, wherein a channel is disposed within a bulk material.

8. The filtration apparatus of claim 1, wherein at least a portion of the particular channel is disposed within an interior region comprising filtered objects, wherein the particular channel provides a shortest diffusive path of an object of interest between the first reservoir and the second reservoir, and wherein the particular channel comprises subregions within the interior region that are accessible to the objects of interest, and wherein a concentration of filtered object within an available volume within the interior region is greater than a concentration of filtered objects outside of the interior region.

9. The filtration apparatus of claim 8, further comprising a filtering surface located between the interior region and the first reservoir.

10. The filtration apparatus of claim 9, wherein the filtering surface has a characteristic width that is smaller than an average characteristic width of the particular channel in the interior region, a transition from the filtering surface to the interior region forming at least a portion of the second gradient segment.

11. The filtration apparatus of claim 9, wherein the cross-sectional area of the particular channel in the filtering surface along the length of the channel increases in the direction of the second reservoir, thereby forming at least a portion of the second gradient segment within the filtering surface.

12. The filtration apparatus of claim 8, wherein a filtering surface is located between the interior region and the second reservoir.

13. The filtration apparatus of claim 12, wherein the characteristic width of a channel in the filtering surface is larger than the average characteristic width of a channel in the interior region, the transition from the interior region to the filtering surface thereby forming at least a portion of the second gradient segment.

14. The filtration apparatus of claim 12, wherein the cross-sectional area of a channel in the filtering surface along the length of the channel increases in the direction of the second reservoir, thereby forming at least a portion of the second gradient segment within the filtering surface.

15. The filtration apparatus of claim 8, wherein the average width of a channel in the interior region increases throughout at least a portion of the interior region in the direction of the second reservoir, thereby forming at least a portion of the second gradient segment within the interior region.

16. The filtration apparatus of claim 8, further comprising a force-generating apparatus configured to provide a force capable of at least partially containing the filtered objects, and which applies the force on at least a portion of the filtered objects.

17. The filtration apparatus of claim 16, wherein the force generating apparatus comprises a body force generating apparatus configured to provide a body force per unit mass capable of at least partially containing the filtered objects, and which applies the force on at least a portion of the filtered objects.

18. The filtration apparatus of claim 17, wherein the body force per unit mass is electromagnetic.

19. The filtration apparatus of claim 18, wherein the body force per unit mass is electric.

20. The filtration apparatus of claim 18, wherein the body force per unit mass is magnetic.

21. The filtration apparatus of claim 17, wherein the body force per unit mass is gravitational or inertial.

22. The filtration apparatus of claim 8, wherein at least a portion of the filtered objects are subject to attractive forces between neighboring filtered objects, at least a portion of the filtered objects thereby contributing to a bulk of a porous bulk material, and wherein the particular channel comprises regions within the porous bulk material which are accessible to the objects of interest.

23. The filtration apparatus of claim 22, wherein the porous material comprises an unstructured or structured lattice.

24. The filtration apparatus of claim 22, wherein the porous material comprises a textile.

25. The filtration apparatus of claim 22, wherein the porous material comprises layers of tubular structures.

26. The filtration apparatus of claim 8, wherein the objects of interest and the filtered objects do not form an ideal solution or an ideal gas.

27. The filtration apparatus of claim 8, wherein the average width of the particular channel in the interior region decreases throughout at least a portion of the interior region in the direction of the second reservoir, thereby forming at least a portion of the first gradient segment within the interior region.

28. The filtration apparatus of claim 1, wherein a portion of the length of the particular channel is perpendicular to another portion of the length of the particular channel.

29. The filtration apparatus of claim 1, wherein the objects of interest comprise an atom, a molecule, a dust particle, an aerosol, a proton, an electron, or a positively or negatively charged ion, photons, phonons, acoustic waves, or combination of any of the foregoing.

30. The filtration apparatus of claim 1, wherein the objects of interest comprise virtual particles, virtual photons, virtual electrons, virtual positrons, or combination of any of the foregoing.

31. The filtration apparatus of claim 1, wherein the channel system comprises a planar array of substantially parallel channels.

32. A system comprising two or more of the filtration apparatuses of claim 1.

33. The system of claim 32, wherein at least one of the two or more filtration apparatuses is coupled in series with another of the two or more filtration apparatuses.

34. The system of claim 32, wherein at least one of the two or more filtration apparatuses is coupled in parallel with another of the two or more filtration apparatuses.

35. The system of claim 34, wherein at least one of the two or more filtration apparatuses is coupled in series with another of the two or more filtration apparatuses.

36. The filtration apparatus of claim 1, wherein the particular channel is configured such that the second number density of objects of interest in the second reservoir is larger than the first number density of objects of interest in the first reservoir for a static boundary condition, and at least a portion of the difference in the first number density and the second number density is a result of interaction of objects of interest with the channel boundaries.

37. The filtration apparatus of claim 1, wherein the first reservoir has a first pressure of objects of interest, the second reservoir has a second pressure of objects of interest, the second pressure is larger than the first pressure for the static boundary condition, and at least a portion of a difference between the first pressure and the second pressure is a result of the interaction of the objects of interest with the channel boundaries.

38. The filtration apparatus of claim 1, wherein the first reservoir has a first temperature of objects of interest, the second reservoir has a second temperature of objects of interest, and the second temperature is substantially identical to the first temperature for the static boundary condition.

39. The filtration apparatus of claim 1, wherein a smallest dimension of the first reservoir and the second reservoir is larger than 1000 times the mean free path of objects of interest.

40. The filtration apparatus of claim 1, wherein a bulk flow of objects of interest from the first reservoir through the particular channel to the second reservoir is induced by the filtration apparatus for a dynamic boundary condition, and at least a portion of energy delivered to the bulk flow is provided by thermal energy of objects of interest during the interaction of the objects of interest with the channel boundaries.

41. The filtration apparatus of claim 40, wherein the interactions comprise a collision between an object of interest and one of the boundaries of the particular channel.

42. The filtration apparatus of claim 40, wherein at least a portion of the bulk flow of objects of interest through the particular channel for the dynamic boundary condition is a result of the interaction of the objects of interest with one of the channel boundaries.

43. The filtration apparatus of claim 40, wherein a free stream bulk flow of objects of interest relative to the particular channel for the dynamic boundary condition is zero.

44. The filtration apparatus of claim 40, wherein a stagnation pressure of the bulk flow at a first point is smaller than a stagnation pressure of the bulk flow at a second point for the dynamic boundary condition, the first point being located in the particular channel or in the first reservoir at a distance of 1000 mean free paths from the region of reduced cross-sectional area in the direction of the first reservoir, the second point being located in the particular channel or in the second reservoir at a distance of 1000 mean free paths from the region of reduced cross-sectional area in the direction of the second reservoir, the direction being measured along the length of the particular channel.

45. The filtration apparatus of claim 40, wherein a temperature of objects of interest at a first point is higher than a temperature of objects of interest at a second point for the dynamic boundary condition, the first point being located in the particular channel or in the first reservoir at a distance of 1000 mean free paths from the region of reduced cross-sectional area in the direction of the first reservoir, the second point being located in the particular channel or in the second reservoir at a distance of 1000 mean free paths from the region of reduced cross-sectional area in the direction of the second reservoir, the direction being measured along the length of the particular channel.

46. The filtration apparatus of claim 40, wherein there is a net thrust force on at least a portion of the filtration apparatus with a non-zero component in the direction from the second reservoir to the first reservoir for the dynamic boundary condition.

47. The filtration apparatus of claim 1, wherein there is a bulk flow of objects of interest from the second reservoir through the particular channel to the first reservoir.

48. The filtration apparatus of claim 1, wherein the particular channel exclusively diffusively connects the at least one first opening to the at least one second opening.

* * * * *